US012707080B2

(12) United States Patent
Zhang et al.

(10) Patent No.: US 12,707,080 B2
(45) Date of Patent: Aug. 11, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Na Zhang, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 65 days.

(21) Appl. No.: 18/649,741

(22) Filed: Apr. 29, 2024

(65) Prior Publication Data

US 2024/0283969 A1 Aug. 22, 2024

Related U.S. Application Data

(63) Continuation of application No. PCT/CN2022/128653, filed on Oct. 31, 2022.

(30) Foreign Application Priority Data

Oct. 29, 2021 (WO) ................ PCT/CN2021/127722

(51) Int. Cl.

| | |
|---|---|
| ***H04N 19/52*** | (2014.01) |
| ***G06V 10/75*** | (2022.01) |
| ***H04N 19/139*** | (2014.01) |
| ***H04N 19/159*** | (2014.01) |
| ***H04N 19/176*** | (2014.01) |

(52) U.S. Cl.
CPC ........... *H04N 19/52* (2014.11); *G06V 10/751* (2022.01); *H04N 19/139* (2014.11); *H04N 19/159* (2014.11); *H04N 19/176* (2014.11)

(58) Field of Classification Search
CPC .. H04N 19/139; H04N 19/159; H04N 19/176; H04N 19/52; H04N 19/751
See application file for complete search history.

(56) References Cited

U.S. PATENT DOCUMENTS

| | | | | |
|---|---|---|---|---|
| 2020/0221109 | A1* | 7/2020 | Xu | H04N 19/44 |
| 2020/0275120 | A1* | 8/2020 | Lin | H04N 19/105 |

(Continued)

FOREIGN PATENT DOCUMENTS

| | | | |
|---|---|---|---|
| CN | 110574377 | A | 12/2019 |
| WO | 2020007261 | A1 | 1/2020 |
| WO | 2020228836 | A1 | 11/2020 |

OTHER PUBLICATIONS

International Search Report in PCT/CN2022/128653, mailed Jan. 18, 2023, 2 pages.

*Primary Examiner* — Jeremiah C Hallenbeck-Huber
(74) *Attorney, Agent, or Firm* — Astute IP Law Group

(57) ABSTRACT

Embodiments of the present disclosure provide a solution for video processing. A method for video processing is proposed. The method comprises: applying, during a conversion between a target block of a video and a bitstream of the target block, a reordering or refined process to motion candidates during constructing a motion candidate list based on the motion candidates; and performing the conversion based on the constructed motion candidate list.

17 Claims, 35 Drawing Sheets

(56) References Cited

U.S. PATENT DOCUMENTS

| | | | | |
|---|---|---|---|---|
| 2020/0374513 | A1* | 11/2020 | Xiu | H04N 19/64 |
| 2020/0382808 | A1* | 12/2020 | Mullakhmetov | H04N 19/567 |
| 2021/0250580 | A1* | 8/2021 | Chen | H04N 19/105 |
| 2022/0201290 | A1* | 6/2022 | Xiu | H04N 19/159 |
| 2022/0239899 | A1* | 7/2022 | Zhang | H04N 19/46 |

* cited by examiner

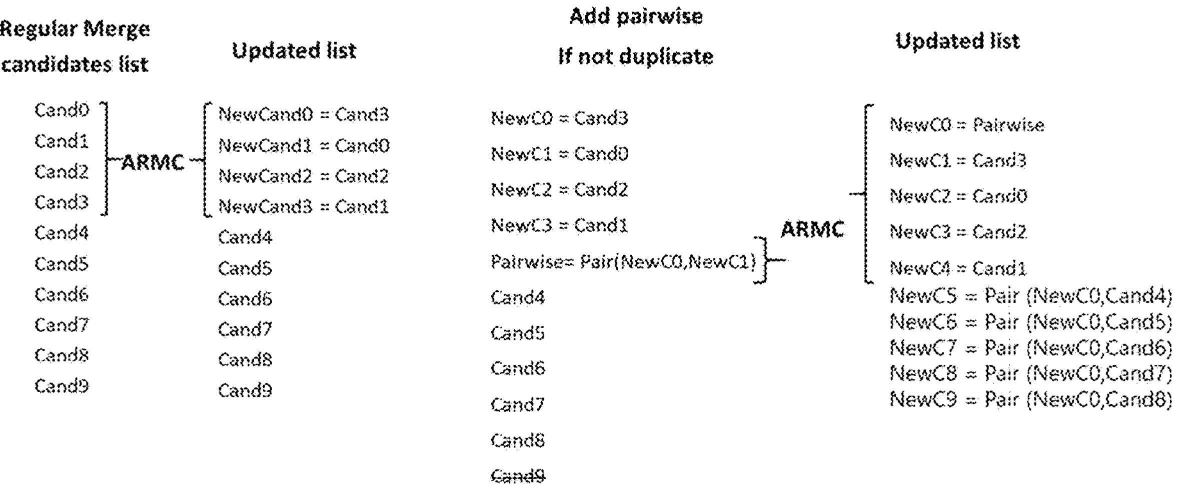
Fig. 29
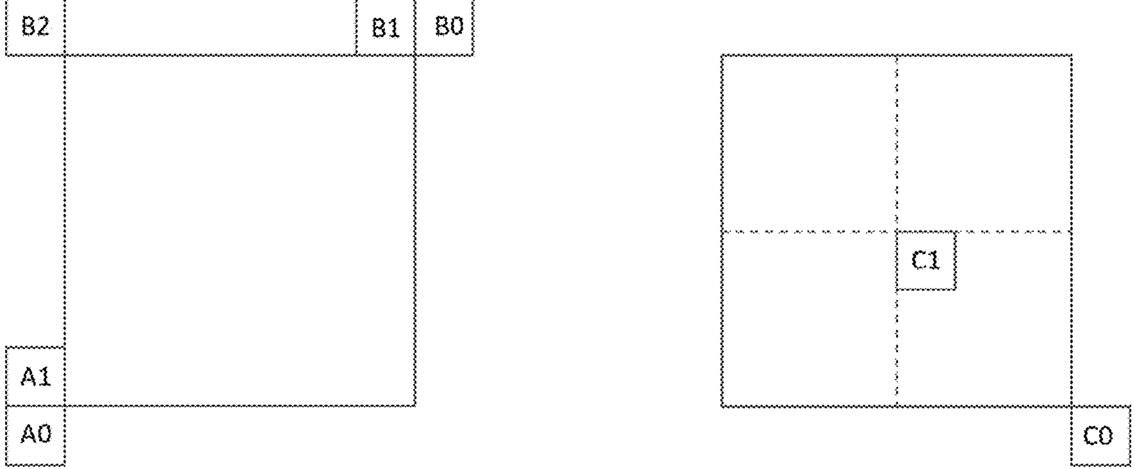
Fig. 30a
Fig. 30b

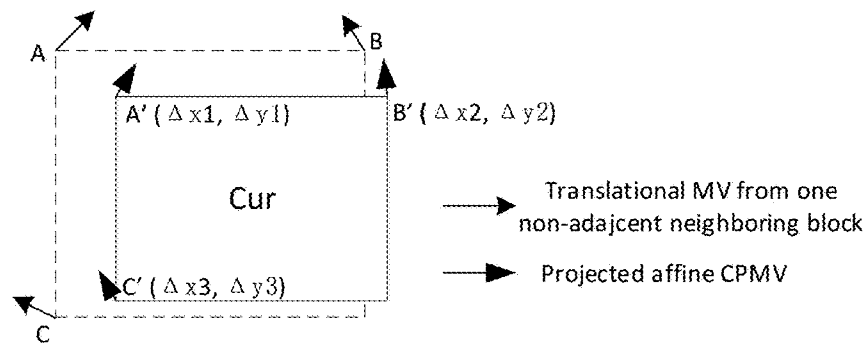
Fig. 40
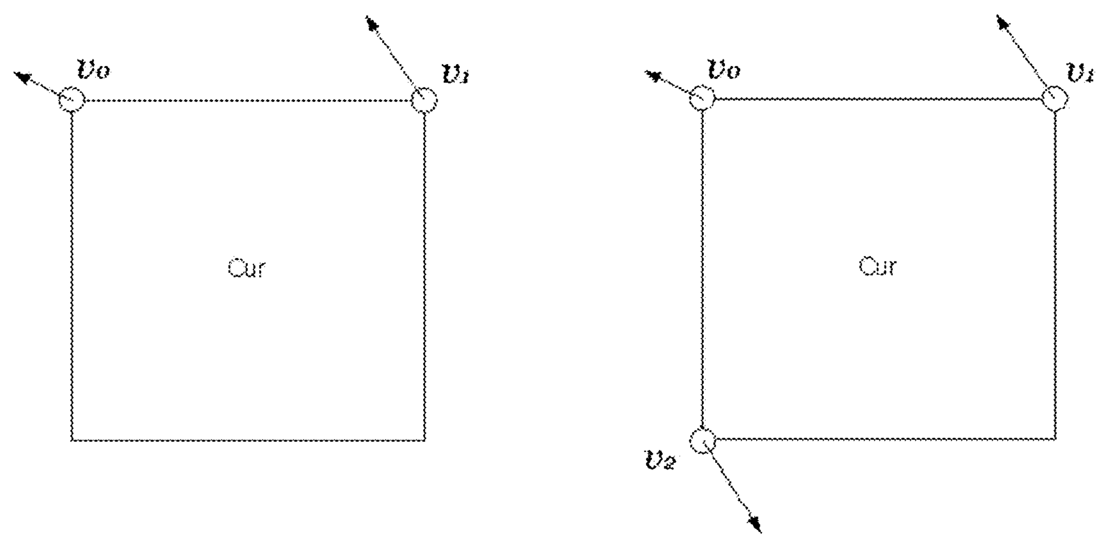
Fig. 41a
Fig. 41b
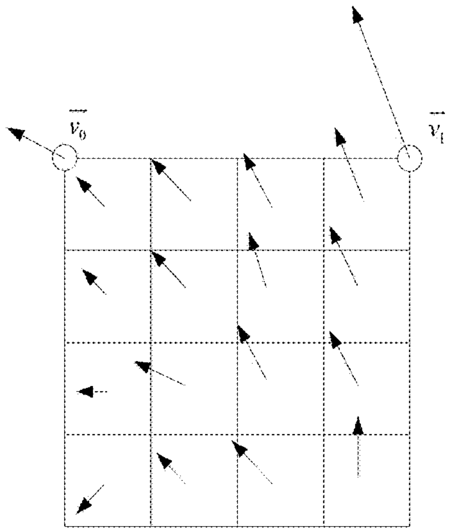
Fig. 42

$R_{x,-1}$ $R_{x,0}$ $P_{x,1}$ $P_{x,2}$ $R_{-1,y}$ $R_{0,y}$ $P_{1,y}$ $P_{2,y}$

NEIGHBORING RECONSTRUCTED BLOCK

CURRENT PREDICTION BLOCK

METHOD, APPARATUS, AND MEDIUM FOR VIDEO PROCESSING

CROSS-REFERENCE TO RELATED APPLICATIONS

This application is a continuation of International Application No. PCT/CN2022/128653, filed on Oct. 31, 2022, which claims the benefit of International Application No. PCT/CN2021/127722, filed on Oct. 29, 2021. The entire contents of these applications are hereby incorporated by reference in their entireties.

FIELD

Embodiments of the present disclosure relates generally to video coding techniques, and more particularly, to motion candidate list reordering.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of video coding techniques is generally expected to be further improved.

SUMMARY

Embodiments of the present disclosure provide a solution for video processing.

In a first aspect, a method for video processing is proposed. The method comprises: applying, during a conversion between a target block of a video and a bitstream of the target block, a reordering or refined process to motion candidates during constructing a motion candidate list based on the motion candidates; and performing the conversion based on the constructed motion candidate list. Compared with conventional technologies, a reordering of motion candidates can be improved. Furthermore, coding efficiency can be improved.

In a second aspect, another method for video processing is proposed. The method comprises: determining, during a conversion between a target block of a video and a bitstream of the target block, a motion candidate list for the target block; applying a reordering or refined process to the motion candidate list according to at least one criterion; and performing the conversion based on the reordered or refined motion candidate list. Compared with conventional technologies, a reordering of motion candidates can be improved. Furthermore, coding efficiency can be improved.

In a third aspect, an apparatus for processing video data is proposed. The apparatus for processing video data comprising a processor and a non-transitory memory with instructions thereon. The instructions upon execution by the processor, cause the processor to perform a method in accordance with the first aspect.

In a fourth aspect, an apparatus for processing video data is proposed. The apparatus for processing video data comprising a processor and a non-transitory memory with instructions thereon. The instructions upon execution by the processor, cause the processor to perform a method in accordance with the second aspect.

In a fifth aspect, a non-transitory computer-readable recording medium is proposed. The non-transitory computer-readable recording medium stores a bitstream of a video which is generated by a method performed by a video processing apparatus. The method comprises: applying a reordering or refined process to motion candidates during constructing a motion candidate list for a target block of the video based on the motion candidates; and generating a bitstream of the target block based on the constructed motion candidate list.

In a sixth aspect, a method for storing bitstream of a video, comprises: applying a reordering or refined process to motion candidates during constructing a motion candidate list for a target block of the video based on the motion candidates; generating a bitstream of the target block based on the constructed motion candidate list; and storing the bitstream in a non-transitory computer-readable recording medium.

In a seventh aspect, another non-transitory computer-readable recording medium is proposed. The non-transitory computer-readable recording medium stores a bitstream of a video which is generated by a method performed by a video processing apparatus. The method comprises: determining a motion candidate list for a target block of the video; applying a reordering or refined process to the motion candidate list according to at least one criterion; and generating a bitstream of the target block based on the reordered or refined motion candidate list.

In an eighth aspect, a method for storing bitstream of a video, comprises: determining a motion candidate list for a target block of the video; applying a reordering or refined process to the motion candidate list according to at least one criterion; generating a bitstream of the target block based on the reordered or refined motion candidate list; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 11A illustrates spatial neighboring blocks used by SbTMVP and FIG. 11B illustrates deriving sub-CU motion field by applying a motion shift from spatial neighbor and scaling the motion information from the corresponding collocated sub-CUs;

FIG. 29 shows pairwise in the merge candidate reordering ARMC-TM and additional pairwise candidates after reordering;

FIG. 30*a* shows candidate positions for spatial candidate and FIG. 30*b* shows candidate positions for temporal candidate;

FIG. 40 shows a schematic diagram of from non-adjacent neighbors to constructed affine merge candidates;

FIGS. 41*a* and 41*b* shows control point based affine motion model, where FIG. 41*a* shows 4 parameter affine model and FIG. 41*b* shows 6 parameter affine model;

FIG. 42 shows affine MVF per subblock;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
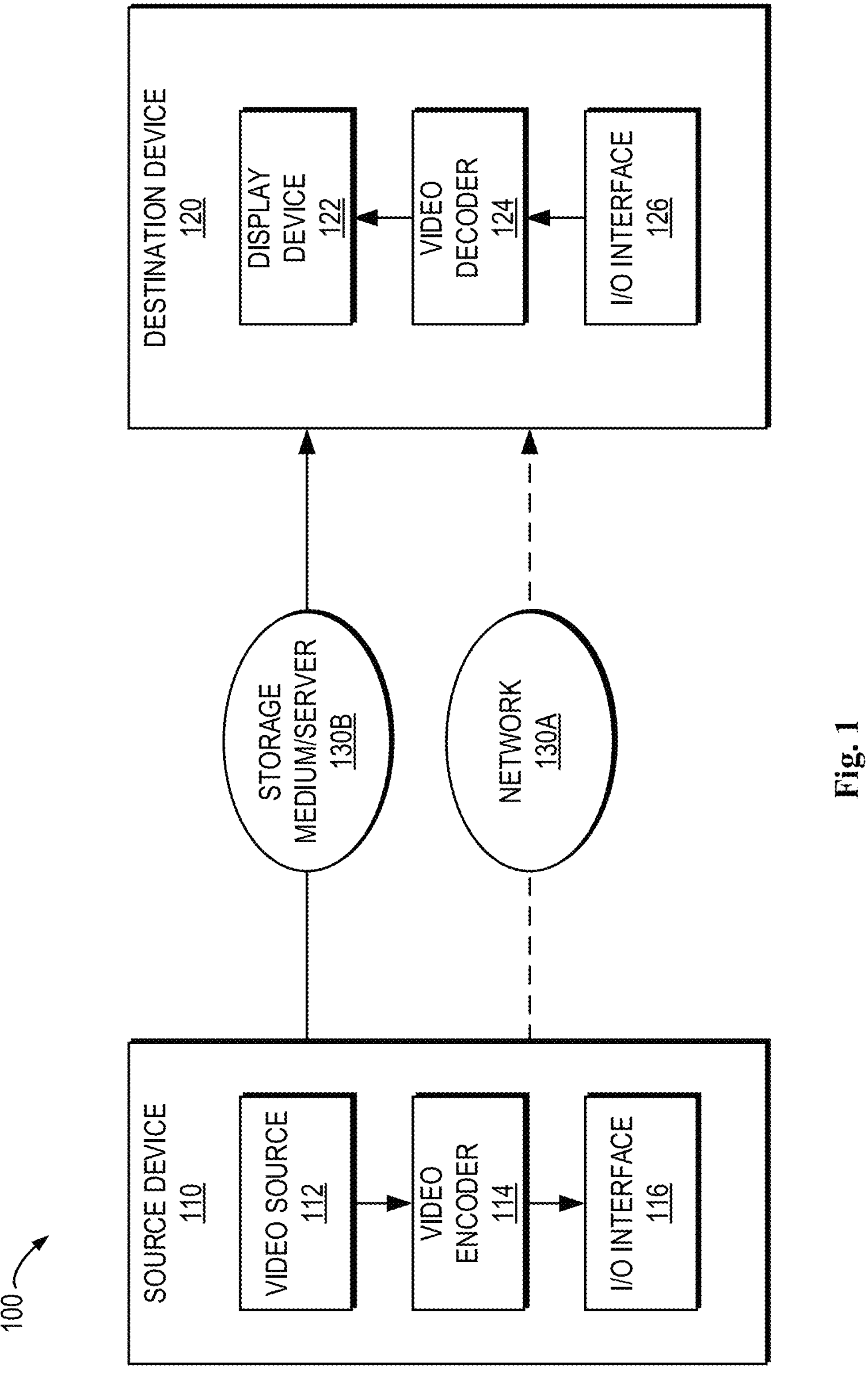
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
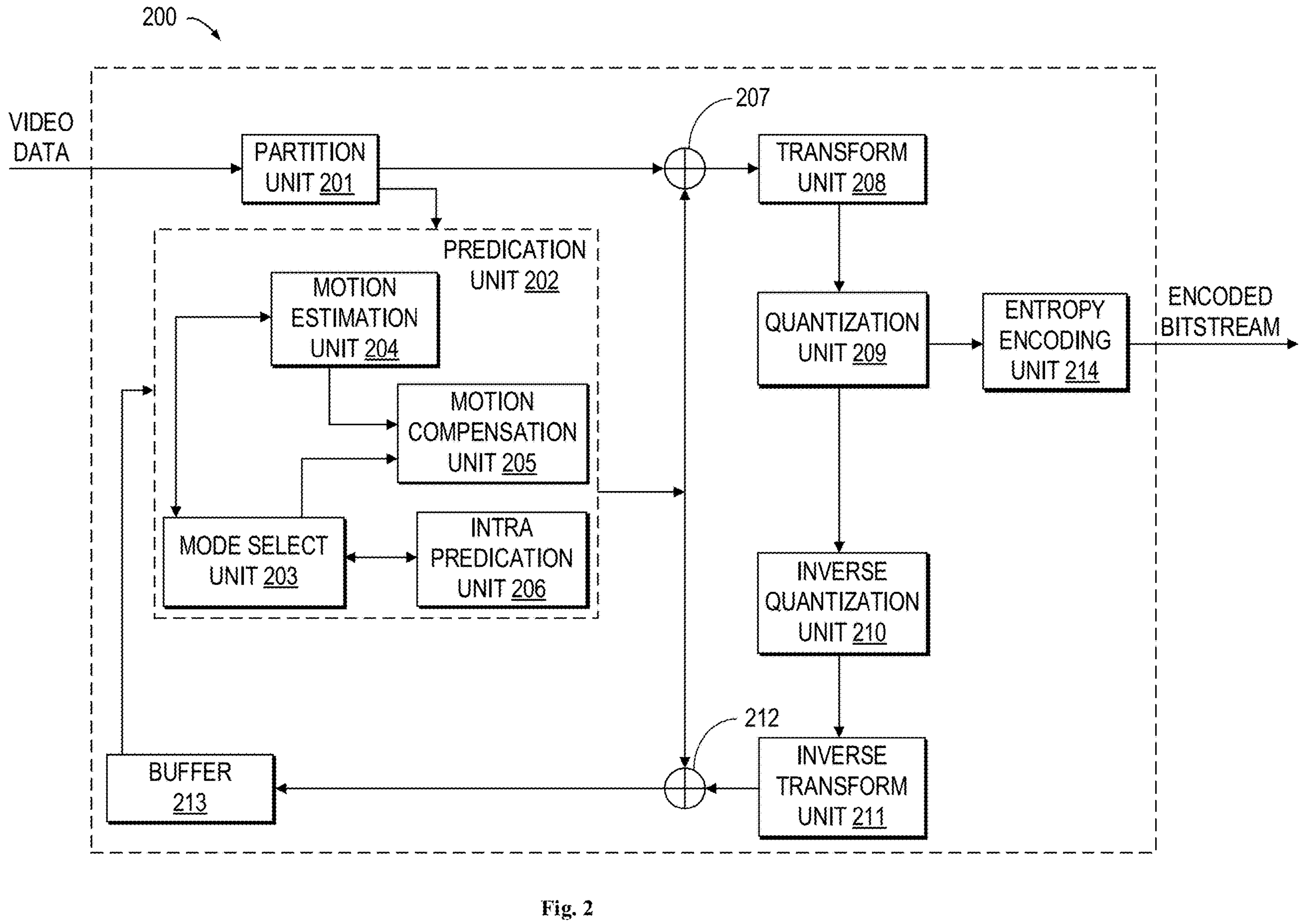
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
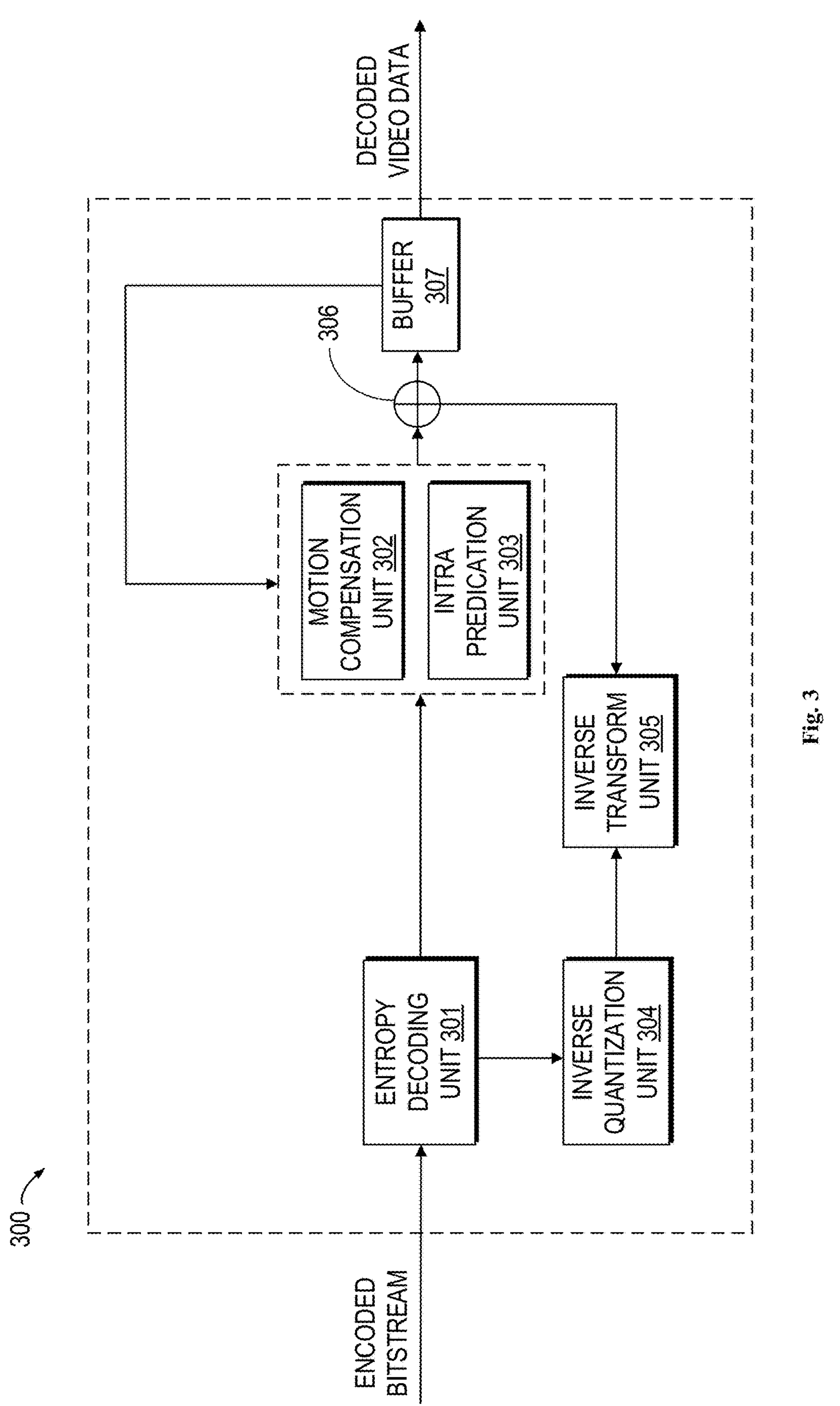
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate case of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

Embodiments of the present disclosure are related to video coding technologies. Specifically, it is about IBC prediction and related techniques in video coding. It may be applied to the existing video coding standard like HEVC, VVC, etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

2.1 Extended Merge Prediction

In VVC, the merge candidate list is constructed by including the following five types of candidates in order:

1) Spatial MVP from spatial neighbour CUs
2) Temporal MVP from collocated CUs
3) History-based MVP from an FIFO table
4) Pairwise average MVP
5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1.1 Spatial Candidates Derivation

Figure 4:
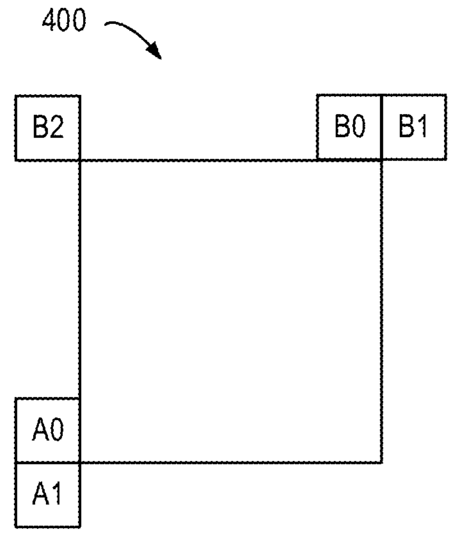
FIG. 4 illustrates a schematic diagram of positions of spatial merge candidate.
Figure 5:
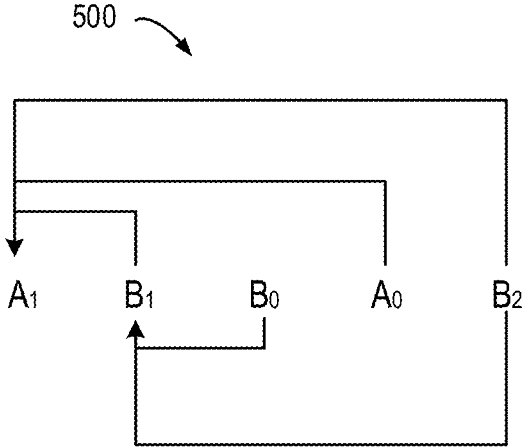
FIG. 5 illustrates candidate pairs considered for redundancy check of spatial merge candidates.

The derivation of spatial merge candidates in VVC is same to that in HEVC except the positions of first two merge candidates are swapped. FIG. 4 is a schematic diagram 400 illustrating positions of a spatial merge candidate. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 5 is a schematic diagram 500 illustrating candidate pairs considered for redundancy check of spatial merge candidates. Instead only the pairs linked with an arrow in FIG. 5 are considered and a candidate is only added to the list if the corresponding candidate used for redundancy check has not the same motion information.

2.1.2 Temporal Candidates Derivation

Figure 6:
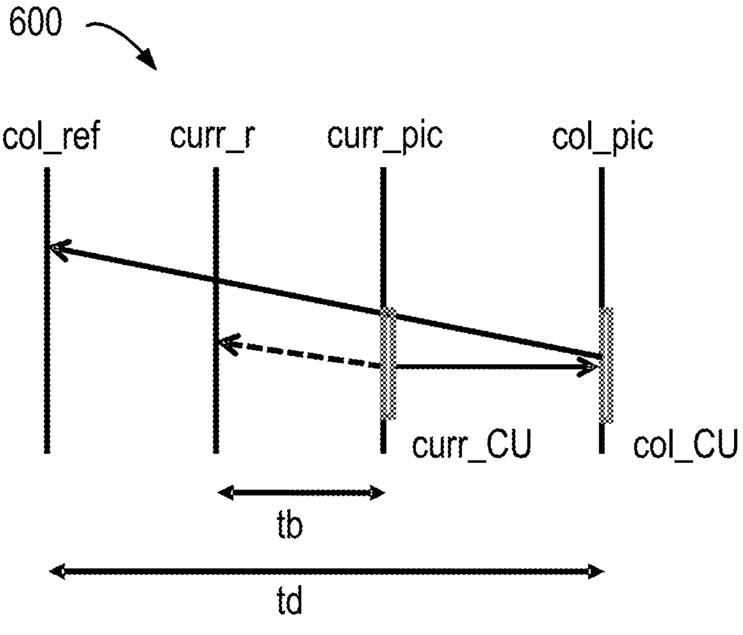
FIG. 6 illustrates an illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in the diagram 600 of FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
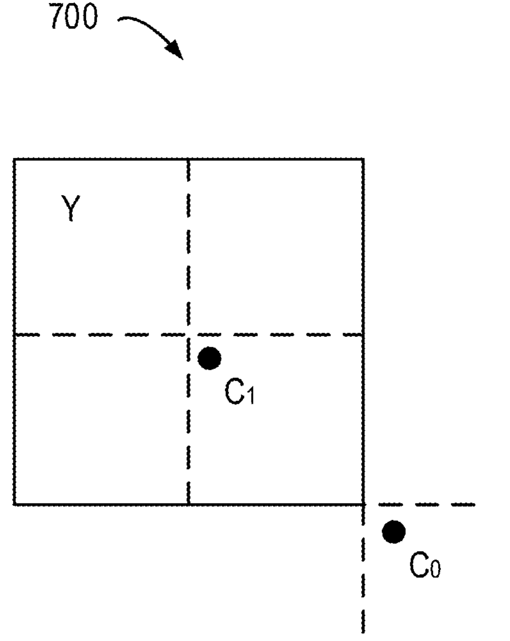
FIG. 7 illustrates candidate positions for temporal merge candidate, C0 and C1.

FIG. 7 is a schematic diagram 700 illustrating candidate positions for temporal merge candidate, $C_0$ and $C_1$. The position for the temporal candidate is selected between candidates $C_0$ and $C_1$, as depicted in FIG. 7. If CU at position $C_0$ is not available, is intra coded, or is outside of the current row of CTUs, position $C_1$ is used. Otherwise, position $C_0$ is used in the derivation of the temporal merge candidate.

2.1.3 History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)?M: (8−N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

2.1.4 Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

2.2 New Merge Candidates 2.2.1 Non-Adjacent Merge Candidates Derivation

Figure 8:
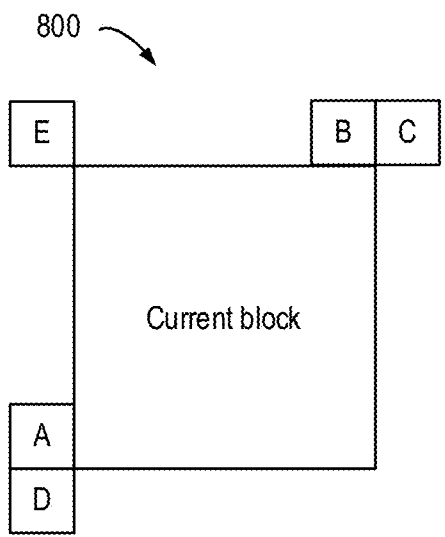
FIG. 8 illustrates VVC spatial neighboring blocks of the current block.

FIG. 8 illustrates a schematic diagram 800 of VVC spatial neighboring blocks of the current block. In VVC, five spatially neighboring blocks shown in FIG. 8 as well as one temporal neighbor are used to derive merge candidates.

It is proposed to derive the additional merge candidates from the positions non-adjacent to the current block using the same pattern as that in VVC. To achieve this, for each search round i, a virtual block is generated based on the current block as follows:

First, the relative position of the virtual block to the current block is calculated by:

$$\text{Offset}x=-i\times \text{grid}X, \text{Offset}y=-i\times \text{grid}Y$$

where the Offsetx and Offsety denote the offset of the top-left corner of the virtual block relative to the top-left corner of the current block, gridX and gridY are the width and height of the search grid. Second, the width and height of the virtual block are calculated by:

$$\text{newWidth}=i\times 2\times \text{grid}X+\text{currWidth}\ \text{newHeight}=i\times 2\times \text{grid}Y+\text{currHeight}.$$

where the currWidth and currHeight are the width and height of current block. The newWidth and newHeight are the width and height of new virtual block.

gridX and gridY are currently set to currWidth and currHeight, respectively.

Figure 9:
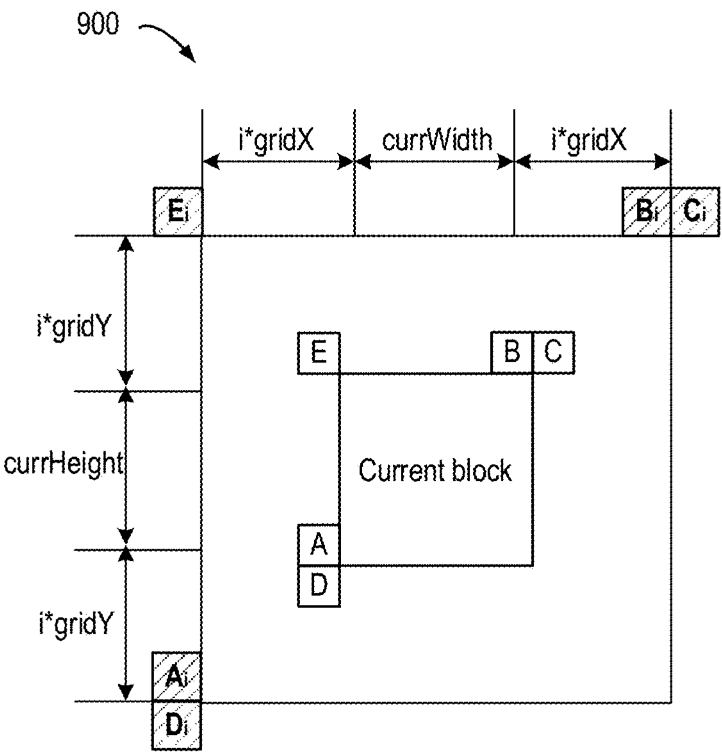
FIG. 9 illustrates an illustration of virtual block in the ith search round.

FIG. 9 illustrates a schematic diagram of a virtual block in the ith search round, which shows the relationship between the virtual block and the current block.

After generating the virtual block, the blocks $A_i$, $B_i$, $C_i$, $D_i$ and $E_i$ can be regarded as the VVC spatial neighboring blocks of the virtual block and their positions are obtained with the same pattern as that in VVC. Obviously, the virtual block is the current block if the search round i is 0. In this case, the blocks $A_i$, $B_i$, $C_i$, $D_i$ and E; are the spatially neighboring blocks that are used in VVC merge mode.

When constructing the merge candidate list, the pruning is performed to guarantee each element in merge candidate list to be unique. The maximum search round is set to 1, which means that five non-adjacent spatial neighbor blocks are utilized.

Non-adjacent spatial merge candidates are inserted into the merge list after the temporal merge candidate in the order of $B_1 \rightarrow A_1 \rightarrow C_1 \rightarrow D_1 \rightarrow E_1$.

2.2.2 Non-Adjacent Spatial Candidate

Figure 10:
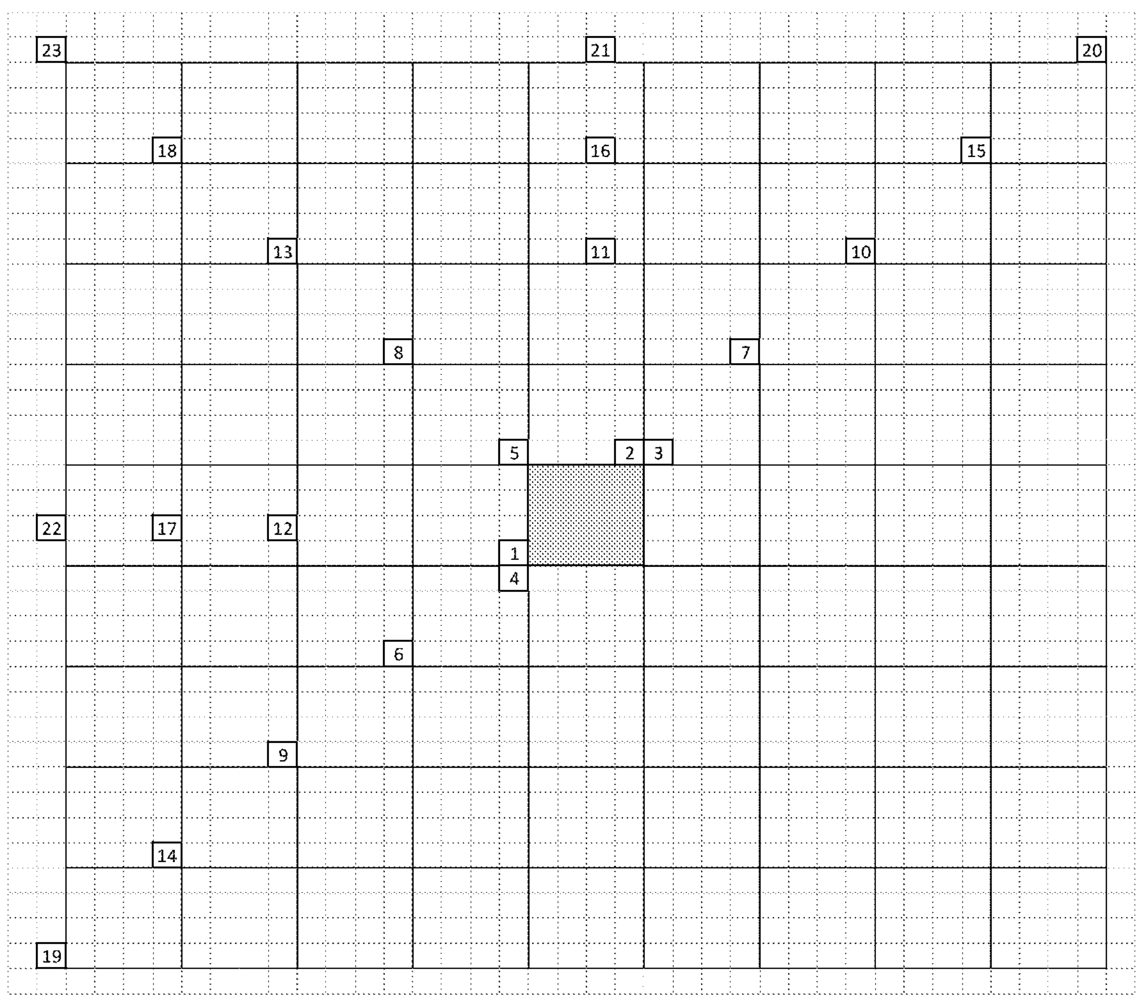
FIG. 10 shows spatial neighboring blocks used to derive the spatial merge candidates.

The non-adjacent spatial merge candidates as in JVET-L0399 are inserted after the TMVP in the regular merge candidate list. The pattern of spatial merge candidates is shown in FIG. 10. The distances between non-adjacent spatial candidates and current coding block are based on the width and height of current coding block. The line buffer restriction is not applied.

2.2.3 STMVP

It is proposed to derive an averaging candidate as STMVP candidate using three spatial merge candidates and one temporal merge candidate.

STMVP is inserted before the above-left spatial merge candidate.

The STMVP candidate is pruned with all the previous merge candidates in the merge list.

For the spatial candidates, the first three candidates in the current merge candidate list are used.

For the temporal candidate, the same position as VTM/HEVC collocated position is used.

For the spatial candidates, the first, second, and third candidates inserted in the current merge candidate list before STMVP are denoted as F, S, and T.

The temporal candidate with the same position as VTM/HEVC collocated position used in TMVP is denoted as Col.

The motion vector of the STMVP candidate in prediction direction X (denoted as mvLX) is derived as follows:

1) If the reference indices of the four merge candidates are all valid and are all equal to zero in prediction direction X (X=0 or 1), $$mvLX = (\mathrm{mvLX\_F} + \mathrm{mvLX\_S} + \mathrm{mvLX\_T} + \mathrm{mvLX\_Col}) >> 2$$

2) If reference indices of three of the four merge candidates are valid and are equal to zero in prediction direction X (X=0 or 1), $$mvLX = (\mathrm{mvLX\_F} \times 3 + \mathrm{mvLX\_S} \times 3 + \mathrm{mvLX\_Col} \times 2) >> 3 \text{ or}$$

$$mvLX = (\mathrm{mvLX\_F} \times 3 + \mathrm{mvLX\_T} \times 3 + \mathrm{mvLX\_Col} \times 2) >> 3 \text{ or}$$

$$mvLX = (\mathrm{mvLX\_S} \times 3 + \mathrm{mvLX\_T} \times 3 + \mathrm{mvLX\_Col}) >> 3$$

3) If reference indices of two of the four merge candidates are valid and are equal to zero in prediction direction X (X=0 or 1), $$mvLX = (\mathrm{mvLX\_F} + \mathrm{mvLX\_Col}) >> 1 \text{ or}$$

$$mvLX = (\mathrm{mvLX\_S} + \mathrm{mvLX\_Col}) >> 1 \text{ or}$$

$$mvLX = (\mathrm{mvLX\_T} + \mathrm{mvLX\_Col}) >> 1$$

Note: If the temporal candidate is unavailable, the STMVP mode is off.

2.2.4 Merge List Size

If considering both non-adjacent and STMVP merge candidates, the size of merge list is signalled in sequence parameter set header and the maximum allowed size of merge list is increased (e.g. 8).

2.3. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 11A:
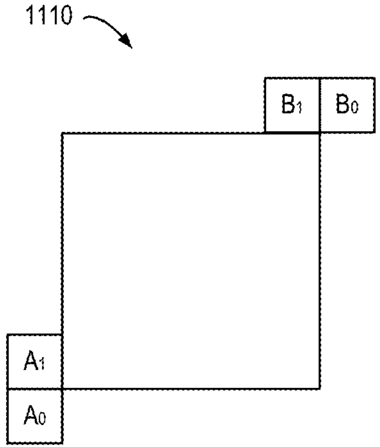
FIGS. 11A and 11B illustrate the SbTMVP process in VVC, where
Figure 11B:
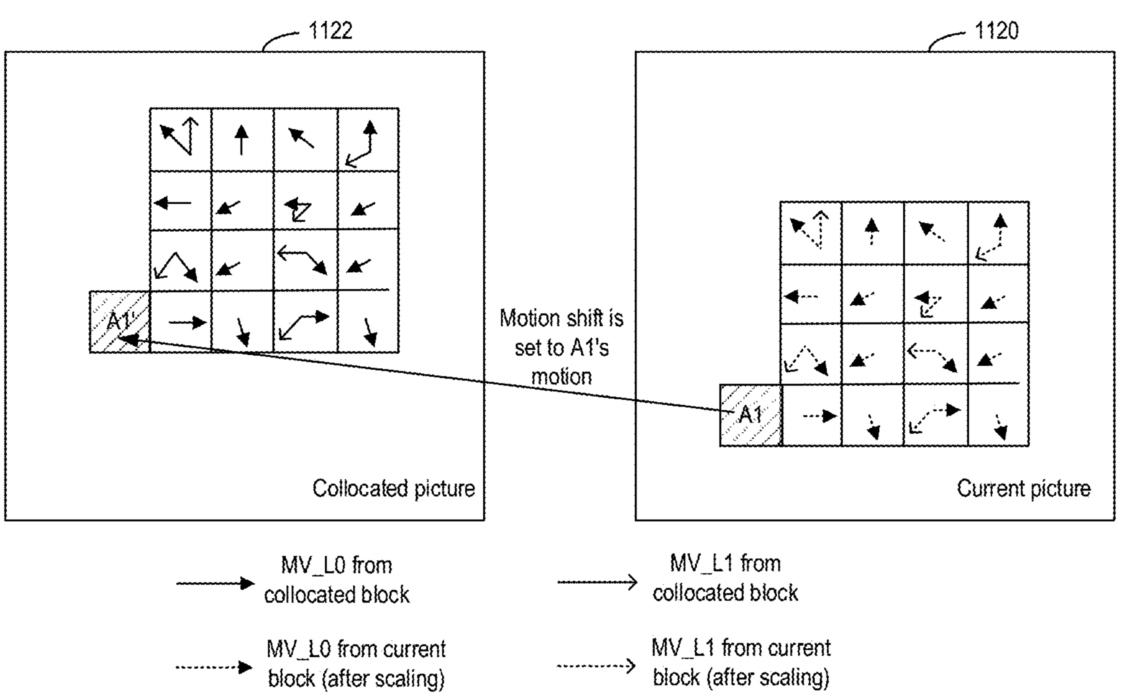

The SbTMVP process is illustrated in FIG. 11A and FIG. 11B. FIG. 11A illustrates a schemat-ic diagram 1110 of spatial neighboring blocks used by SbTMVP. SbTMVP predicts the mo-tion vectors of the sub-CUs within the current CU in two steps. In the first step, the spatial neighbor A1 in FIG. 11A is examined. If A1 has a motion vector that uses the collocated pic-ture as its reference picture, this motion vector is selected to be the motion shift to be applied. If no such motion is identified, then the motion shift is set to (0, 0).

FIG. 11B illustrates a schematic diagram of driving sub-CU motion field by applying a mo-tion shift from spatial neighbor and scaling the motion information from the corresponding collocated sub-CUs. In the second step, the motion shift identified in Step 1 is applied (i.e. added to the coordinates of the current block in the current picture 1120) to obtain sub-CU-level motion information (motion vectors and reference indices) from the collocated picture 1122 as shown in FIG. 11B. The example in FIG. 11B assumes the motion shift is set to block A1's motion. Then, for each sub-CU, the motion information of its corresponding block (the smallest motion grid that covers the center sample) in the collocated picture 1122 is used to derive the motion information for the sub-CU. After the motion information of the collocat-ed sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTMVP candidate and affine merge candidates is used for the signalling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.4. Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

- IBC skip/merge mode: a merge candidate index is used to indicate which of the block vectors in the list from neighboring candidate IBC coded blocks is used to predict the current block. The merge list consists of spatial, HMVP, and pairwise candidates.
- IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

2.4.1 Simplification of IBC Vector Prediction

The BV predictors for merge mode and AMVP mode in IBC will share a common predictor list, which consist of the following elements:

- 2 spatial neighboring positions (A0, B0 as in FIG. 4)
- 5 HMVP entries
- Zero vectors by default For merge mode, up to first 6 entries of this list will be used; for AMVP mode, the first 2 entries of this list will be used. And the list conforms with the shared merge list region requirement (shared the same list within the SMR).

2.4.2 IBC Reference Region

Figure 12:
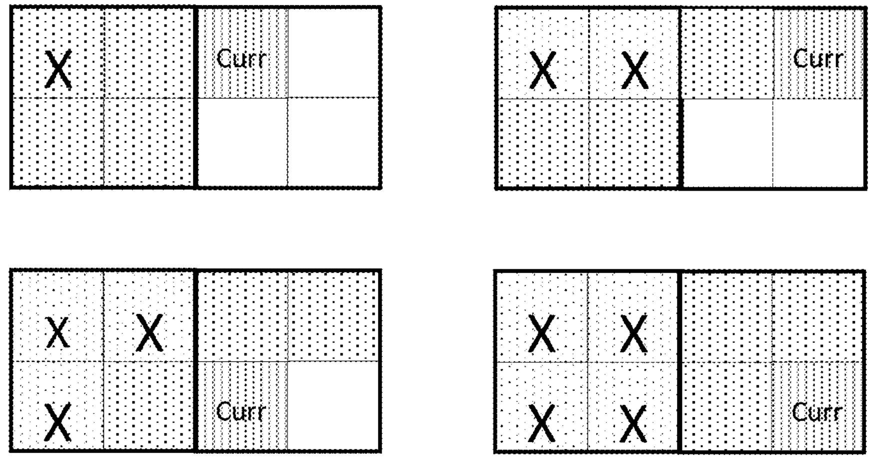
FIG. 12 shows current CTU processing order and its available reference samples in current and left CTU.

To reduce memory consumption and decoder complexity, the IBC in VVC allows only the reconstructed portion of the predefined area including the region of current CTU and some region of the left CTU. FIG. 12 illustrates the reference region of IBC Mode, where each block represents 64×64 luma sample unit.

Depending on the location of the current coding CU location within the current CTU, the following applies:

- If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.
- If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.
- If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.
- If current block falls into the bottom-right 64×64 block of the current CTU, it can only refer to the already reconstructed samples in the current CTU, using CPR mode.

This restriction allows the IBC mode to be implemented using local on-chip memory for hardware implementations.

2.4.3 IBC Interaction with Other Coding Tools

The interaction between IBC mode and other inter coding tools in VVC, such as pairwise merge candidate, history based motion vector predictor (HMVP), combined intra/inter prediction mode (CIIP), merge mode with motion vector difference (MMVD), and geometric partitioning mode (GPM) are as follows:

- IBC can be used with pairwise merge candidate and HMVP. A new pairwise IBC merge candidate can be generated by averaging two IBC merge candidates. For HMVP, IBC motion is inserted into history buffer for future referencing.
- IBC cannot be used in combination with the following inter tools: affine motion, CIIP, MMVD, and GPM.
- IBC is not allowed for the chroma coding blocks when DUAL_TREE partition is used.

Unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa. The following IBC design aspects are applied:

- IBC shares the same process as in regular MV merge including with pairwise merge candidate and history based motion predictor, but disallows TMVP and zero vector because they are invalid for IBC mode.
- Separate HMVP buffer (5 candidates each) is used for conventional MV and IBC.
- Block vector constraints are implemented in the form of bitstream conformance constraint, the encoder needs to ensure that no invalid vectors are present in the bitsream, and merge shall not be used if the merge candidate is invalid (out of range or 0). Such bitstream conformance constraint is expressed in terms of a virtual buffer as described below.

For deblocking, IBC is handled as inter mode.

If the current block is coded using IBC prediction mode, AMVR does not use quarter-pel; instead, AMVR is signaled to only indicate whether MV is inter-pel or 4 integer-pel.

The number of IBC merge candidates can be signalled in the slice header separately from the numbers of regular, subblock, and geometric merge candidates.

A virtual buffer concept is used to describe the allowable reference region for IBC prediction mode and valid block vectors. Denote CTU size as ctbSize, the virtual buffer, ibcBuf, has width being wIbcBuf=128×128/ctbSize and height hIbcBuf=ctbSize. For example, for a CTU size of 128×128, the size of ibcBuf is also 128×128; for a CTU size of 64×64, the size of ibcBuf is 256×64; and a CTU size of 32×32, the size of ibcBuf is 512×32.

The size of a VPDU is min(ctbSize, 64) in each dimension, $W_v$=min(ctbSize, 64).

The virtual IBC buffer, ibcBuf is maintained as follows.

At the beginning of decoding each CTU row, refresh the whole ibcBuf with an invalid value −1.

At the beginning of decoding a VPDU (xVPDU, yVPDU) relative to the top-left corner of the picture, set the ibcBuf[x][y]=−1, with x=xVPDU % wIbcBuf, . . . , xVPDU % wIbcBuf+$W_v$−1; y=yVPDU % ctbSize, . . . , yVPDU % ctbSize+$W_v$−1.

After decoding a CU contains (x, y) relative to the top-left corner of the picture, set $$ibcBuf[x \ \% \ wIbcBuf][y \ \% \ ctbSize] = recSample\ [x][y]$$

For a block covering the coordinates (x, y), if the following is true for a block vector bv=(bv[0], bv[1]), then it is valid; otherwise, it is not valid:

ibcBuf[(x+bv[0])% wIbcBuf] [(y+bv[1]) % ctbSize] shall not be equal to −1.

2.4.4 IBC Virtual Buffer Test

A luma block vector bvL (the luma block vector in 1/16 fractional-sample accuracy) shall obey the following constraints:

CtbSize Y is greater than or equal to ((yCb+(bvL[1]>>4)) & (CtbSizeY−1))+cbHeight.

IbcVirBuf[0][(x+(bvL[0]>>4)) & (IbcBufWidthY−1)] [(y+(bvL[1]>>4)) & (CtbSizeY−1)] shall not be equal to −1 for x=xCb . . . xCb+cbWidth−1 and y=yCb . . . yCb+cbHeight−1.

Otherwise, bvL is considered as an invalid bv.

The samples are processed in units of CTBs. The array size for each luma CTB in both width and height is CtbSizeY in units of samples.

(xCb, yCb) is a luma location of the top-left sample of the current luma coding block relative to the top-left luma sample of the current picture, cbWidth specifies the width of the current coding block in luma samples, cbHeight specifies the height of the current coding block in luma samples.

2.5. Template Matching Based Adaptive Merge Candidate Reorder

To improve the coding efficiency, after the merge candidate list is constructed, the order of each merge candidate is adjusted according to the template matching cost. The merge candidates are arranged in the list in accordance with the template matching cost of ascending order. It is operated in the form of sub-group.

Figure 13:
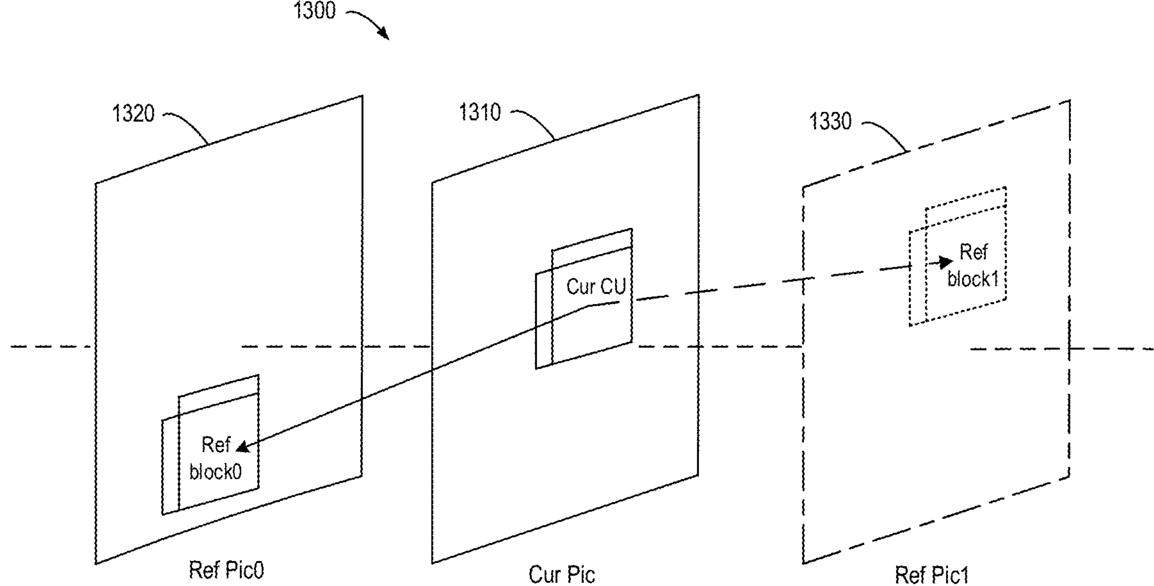
FIG. 13 illustrates neighbouring samples used for calculating SAD.
Figure 14:
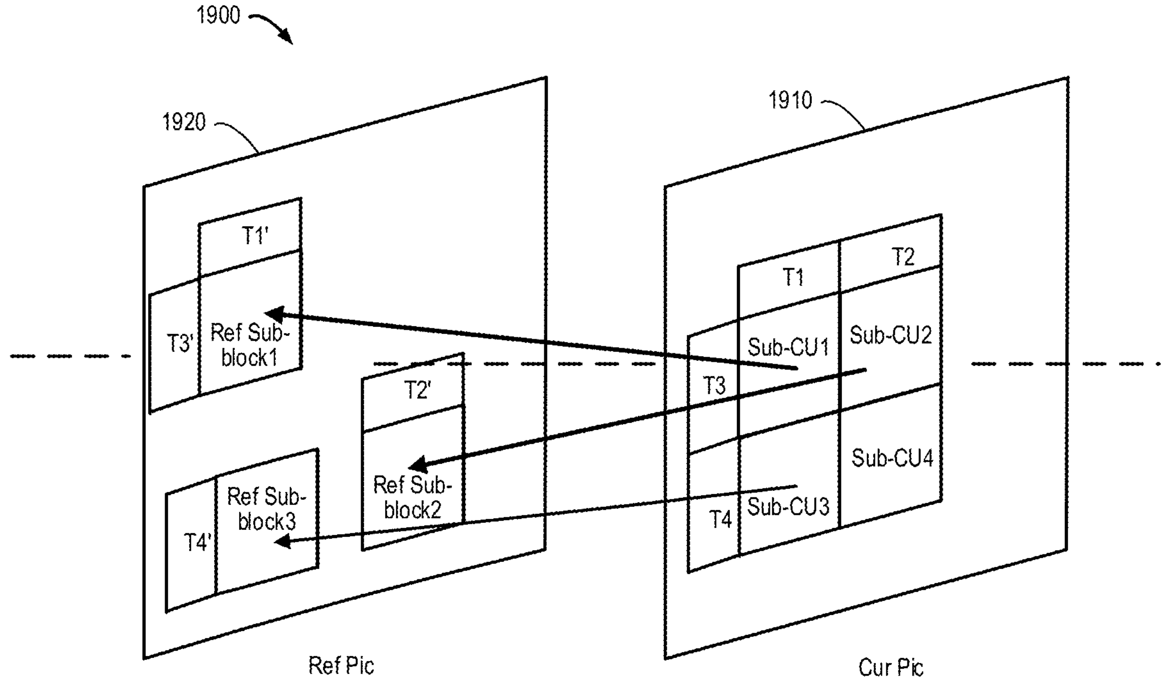
FIG. 14 illustrates neighbouring samples used for calculating SAD for sub-CU level motion information.

FIG. 13 illustrates a schematic diagram 1300 of neighboring samples used for calculating SAD (Sum of absolute differences). The template matching cost is measured by the SAD between the neighbouring samples of the current CU in the current picture 1310 and their corresponding reference samples. If a merge candidate includes bi-predictive motion information, the corresponding reference samples are the average of the corresponding reference samples in reference list0 1320 and the corresponding reference samples in reference list1 1330, as illustrated in FIG. 13. If a merge candidate includes sub-CU level motion information, the corresponding reference samples for a current CU in a current picture 1410 consist of the neighbouring samples of the corresponding reference sub-blocks in a reference picture 1420, as illustrated in FIG. 14.

Figure 15:
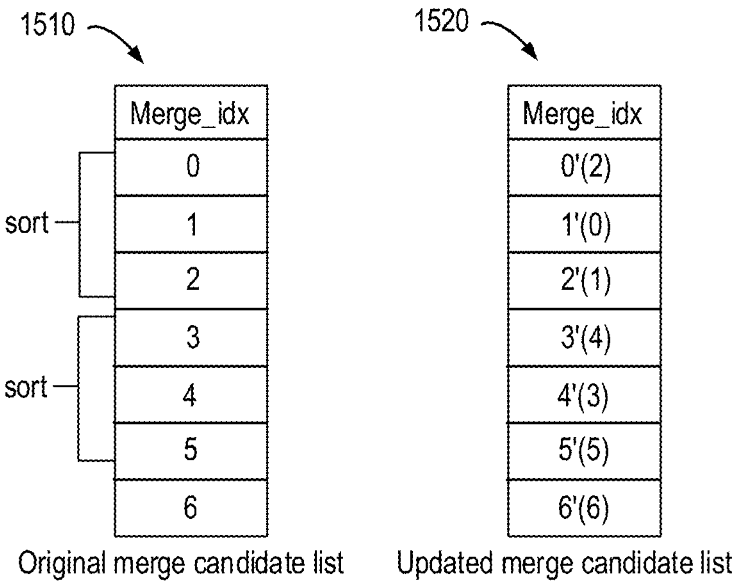
FIG. 15 illustrates the sorting process.

The sorting process is operated in the form of sub-group, as illustrated in FIG. 15. The first three merge candidates are sorted together. The following three merge candidates are sorted together. As shown in FIG. 15, an original merge candidate list 1510 is sorted to obtain an updated merge candidate list 1520. In this example, the template size (width of the left template or height of the above template) is 1, and the sub-group size is 3.

2.6. Adaptive Merge Candidate List

It is to assume the number of the merge candidates is 8. The first 5 merge candidates are taken as a first subgroup and take the following 3 merge candidates as a second subgroup (i.e. the last subgroup).

Figure 16:
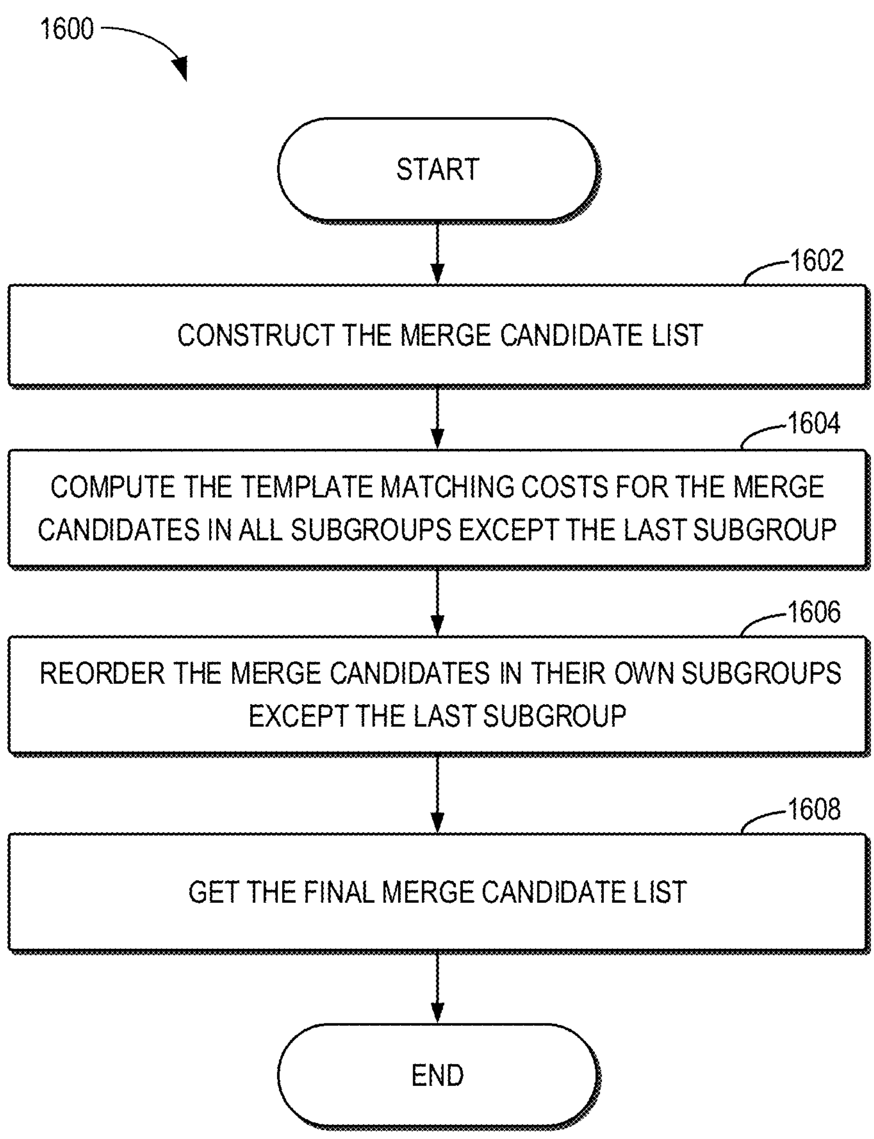
FIG. 16 illustrates reorder process in encoder.

FIG. 16 which illustrates a flowchart of a reorder process 1600 in an encoder. For the encoder, after the merge candidate list is constructed at block 1602, some merge candidates are adaptively reordered in an ascending order of costs of merge candidates as shown in FIG. 16.

More specifically, at block 1604, the template matching costs for the merge candidates in all subgroups except the last subgroup are computed; then at block 1606, the merge candidates in their own subgroups are reordered except the last subgroup; finally, at block 1608, the final merge candidate list will be got.

Figure 17:
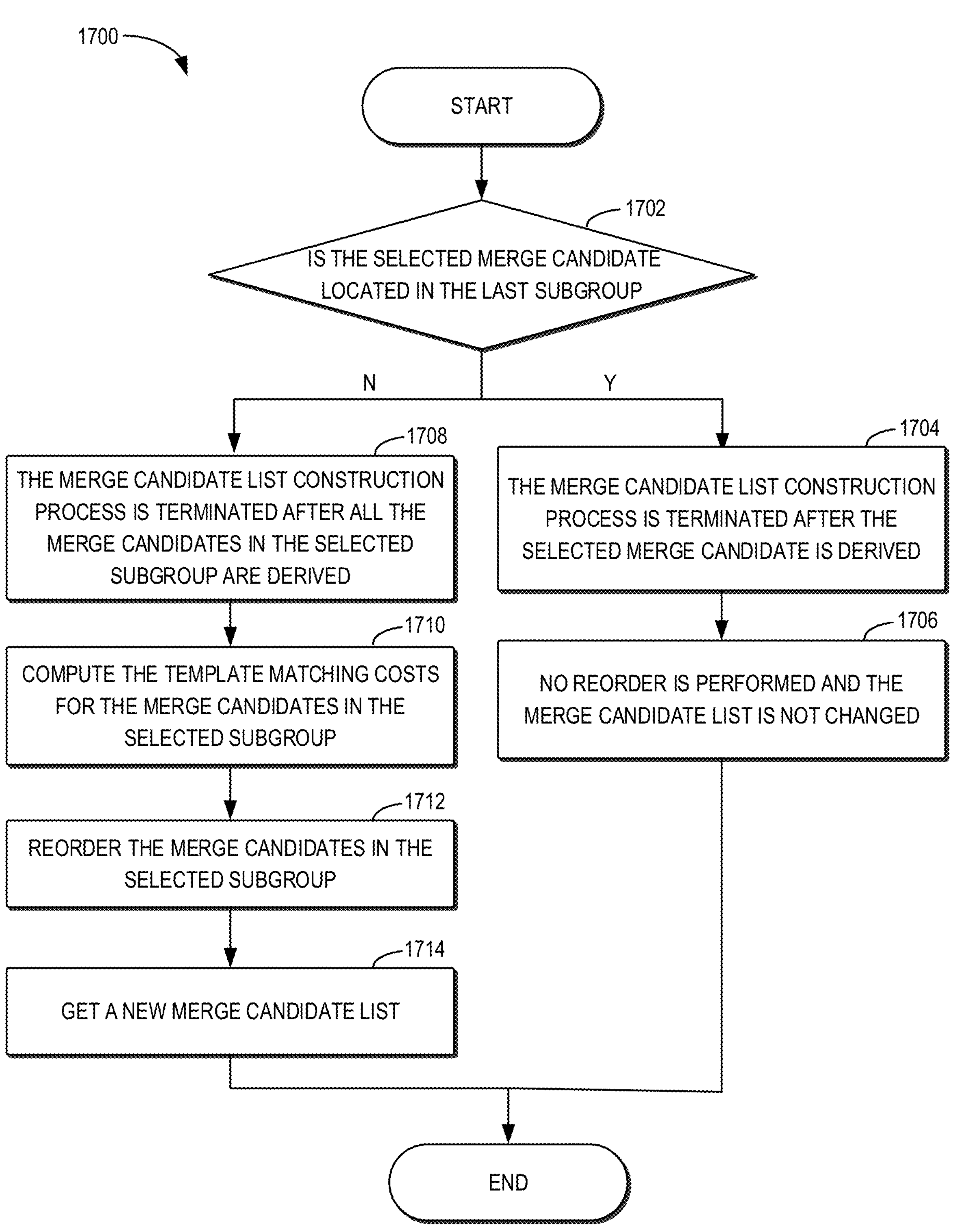
FIG. 17 illustrates reorder process in decoder.

For the decoder, after the merge candidate list is constructed, some/no merge candidates are adaptively reordered in ascending order of costs of merge candidates as shown in FIG. 17 which illustrates a flowchart of a reorder process 1700 in a decoder. In FIG. 17, the subgroup the selected (signaled) merge candidate located in is called the selected subgroup.

More specifically, at block 1702, it is determined if the selected merge candidate is located in the last subgroup. If the selected merge candidate is located in the last subgroup, at block 1704, the merge candidate list construction process is terminated after the selected merge candidate is derived, and at block 1706, no reorder is performed and the merge candidate list is not changed; otherwise, the execution process is as follows:

At block 1708, the merge candidate list construction process is terminated after all the merge candidates in the selected subgroup are derived; at block 1710, the template matching costs for the merge candidates in the selected subgroup are computed; at block 1712, the merge candidates in the selected subgroup are reordered; finally, at block 1714, a new merge candidate list will be got.

For both encoder and decoder, a template matching cost is derived as a function of T and RT, wherein T is a set of samples in the template and RT is a set of reference samples for the template.

When deriving the reference samples of the template for a merge candidate, the motion vectors of the merge candidate are rounded to the integer pixel accuracy. It can also be derived using 8 tap or 12 tap luma interpolation filter.

The reference samples of the template (RT) for bi-directional prediction are derived by weighted averaging of the reference samples of the template in reference list0 ($RT_0$) and the reference samples of the template in reference list1 ($RT_1$) as follows.

$$RT = ((8 - w) * RT_0 + w * RT_1 + 4) \gg 3$$

where the weight of the reference template in reference list0 (8-w) and the weight of the reference template in reference list1 (w) are decided by the BCW index of the merge candidate. BCW index equal to {0,1,2,3,4} corresponds to w equal to {−2,3,4,5,10}, respectively.

If the Local Illumination Compensation (LIC) flag of the merge candidate is true, the reference samples of the template are derived with LIC method.

The template matching cost is calculated based on the sum of absolute differences (SAD) of T and RT.

The template size is 1. That means the width of the left template and/or the height of the above template is 1.

If the coding mode is MMVD, the merge candidates to derive the base merge candidates are not reordered.

If the coding mode is GPM, the merge candidates to derive the uni-prediction candidate list are not reordered.

2.7. Template Matching (TM)

Figure 18:
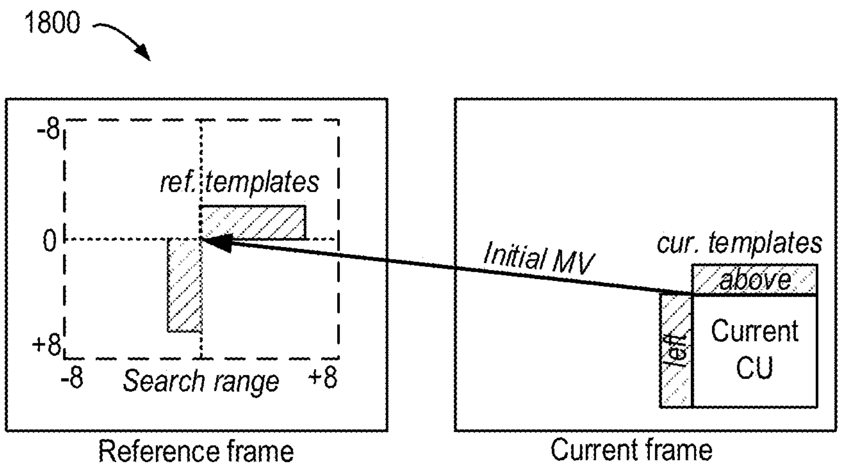
FIG. 18 illustrates template matching performs on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 18 is a schematic diagram 1800 illustrating the template matching that performs on a search area around initial MV. As illustrated in FIG. 18, a better MV is to be searched around the initial motion of the current CU within a [−8, +8]-pel search range. The template matching that was previously proposed in JVET-J0021 is adopted in this contribution with two modifications: search step size is determined based on Adaptive Motion Vector Resolution (AMVR) mode and TM can be cascaded with bilateral matching process in merge modes.

In AMVP mode, an MVP candidate is determined based on template matching error to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 3. This search process ensures that the MVP candidate still keeps the same MV precision as indicated by AMVR mode after TM process.

TABLE 3

Search patterns of AMVR and merge mode with AMVR.

| Search pattern | AMVR mode 4-pel | Full-pel | Half-pel | Quarter-pel | Merge mode AltIF = 0 | AltIF = 1 |
|---|---|---|---|---|---|---|
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 3 shows, TM may perform all the way down to 1/8-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

At encoder side, TM merge mode will do MV refinement for each merge candidate.

2.8. Intra Template Matching

Figure 19:
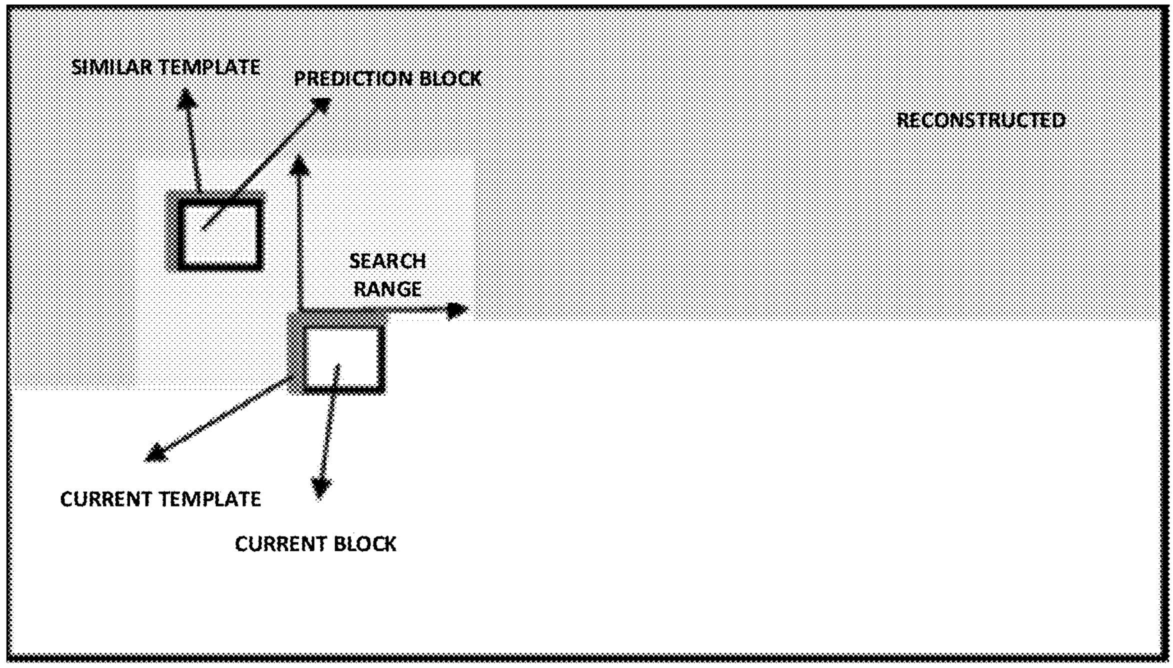
FIG. 19 illustrates template matching prediction.

Template matching prediction (TMP) is a special intra prediction mode that copies the best prediction block from the reconstructed part of the current frame, whose L-shaped templated matches the current template. This is illustrated in FIG. 19. For a predefined search range, the encoder searches for the most similar template to the current template in the reconstructed part of the current frame, and uses the corresponding block as a prediction block. The encoder then signals the usage of this mode, and the inverse operation is made at the decoder side.

Figure 20:
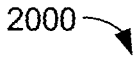
FIG. 20 shows intra template matching search area used.
Figure 20:
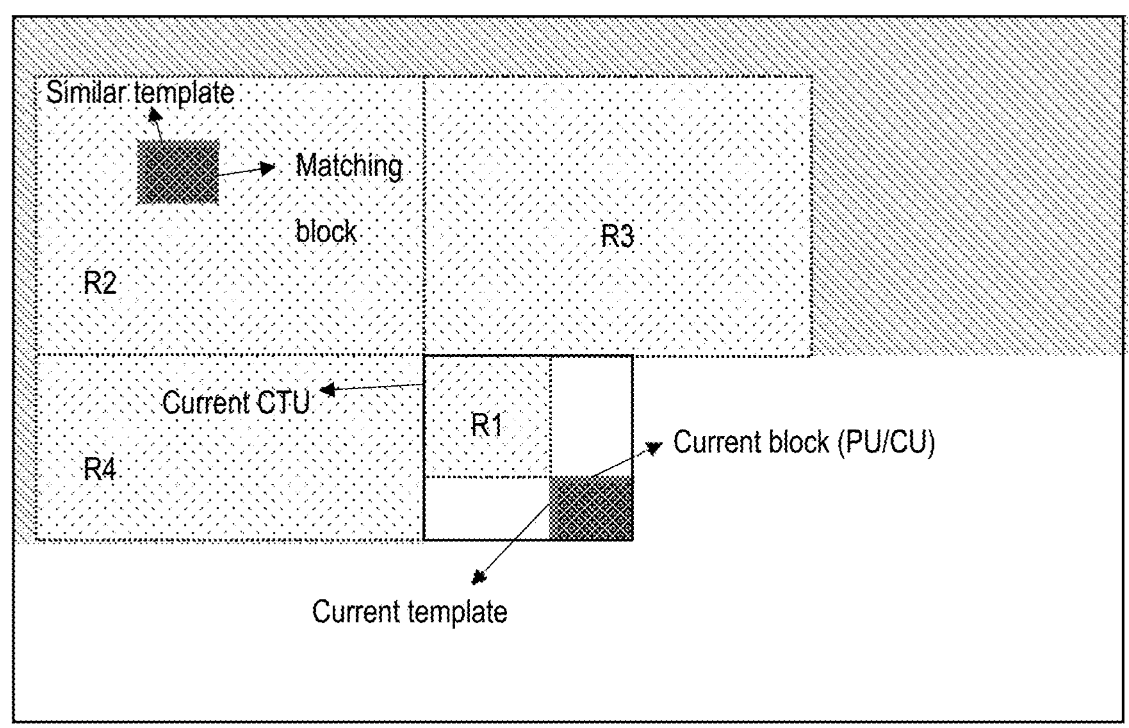

It is a coding tool that is mostly adapted for screen content coding. The prediction signal is generated at the decoder side by matching the L-shaped causal neighbor of the current block with another block in a predefined search area. FIG. 20 shows a schematic diagram 2000 of intra template matching search area used. Specifically, the search range is divided into 3 regions:

R1: within the current CTU

R2: top-left outside the current CTU

R3: above the current CTU

R4: left to the current CTU

Within each region, the decoder searches for the template the has least SAD with respect to the current one and uses its corresponding block as a prediction block.

The dimensions of all regions (SearchRange_w, SearchRange_h) are set proportional to the block dimension (BlkW, BlkH) in order to have a fixed number of SAD comparisons per pixel. That is:

$$SearchRange\_w = a * BlkW$$

$$SearchRange\_h = a * BlkH$$

Where 'a' is a constant that controls the gain/complexity trade-off.

2.9. Template-Based Intra Mode Derivation Using MPMs

Figure 21:
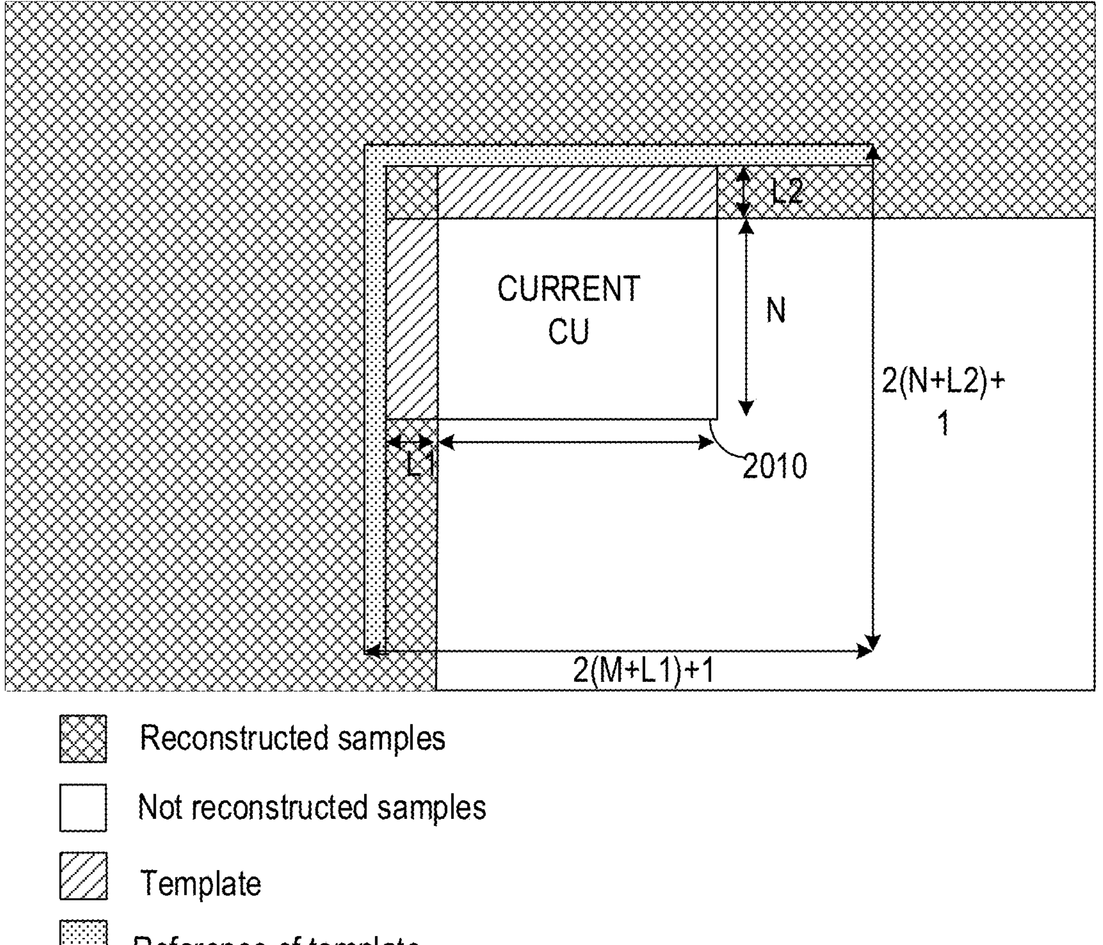
FIG. 21 shows a template and its reference samples used in TIMD.

A TIMD mode is derived from MPMs using the neighbouring template. The TIMD mode is used as an additional intra prediction method for a CU. As shown in FIG. 21, the prediction samples of the template are generated using the reference samples of the template for each candidate mode. A cost is calculated as the sum of absolute transformed differences (SATD) between the prediction and the reconstruction samples of the template. The intra prediction mode with the minimum cost is selected as the TIMD mode and used for intra prediction of the CU.

2.9.1 TIMD Mode Derivation

For each intra prediction mode in MPMs, The SATD between the prediction and reconstruction samples of the template is calculated. The intra prediction mode with the minimum SATD is selected as the TIMD mode and used for intra prediction of current CU. Position dependent intra prediction combination (PDPC) and gradient PDPC are supported in the derivation of the TIMD mode.

2.9.2 TIMD Signalling

A flag is signalled in sequence parameter set (SPS) to enable/disable TIMD. When the flag is true, a CU level flag is signalled to indicate whether TIMD is used for the CU. The TIMD flag is signalled right after the MIP flag. If the TIMD flag is equal to true, the remaining syntax elements related to luma intra prediction mode, is skipped.

2.9.3 Interaction with New Coding Tools in ECM-1.0

When DIMD flag or MIP flag is equal to true, the TIMD flag is not signalled and set equal to false. TIMD is allowed to be combined with ISP and MRL. When TIMD is combined with ISP or MRL and the TIMD flag is equal to true, the derived TIMD mode is used as the intra prediction mode for ISP or MRL.

When the secondary MPM is enabled, both the primary MPMs and the secondary MPMs are used to derive the TIMD mode.

6-tap interpolation filter is not used in the derivation of the TIMD mode.

2.9.4 Modification of MPM List Construction in the Derivation of TIMD Mode

During the construction of MPM list, intra prediction mode of a neighbouring block is derived as Planar when it is inter-coded. To improve the accuracy of MPM list, when a neighbouring block is inter-coded, a propagated intra prediction mode [3] is derived using the motion vector and reference picture and used in the construction of MPM list.

2.10. Adaptive Merge Candidate List

Figure 22:
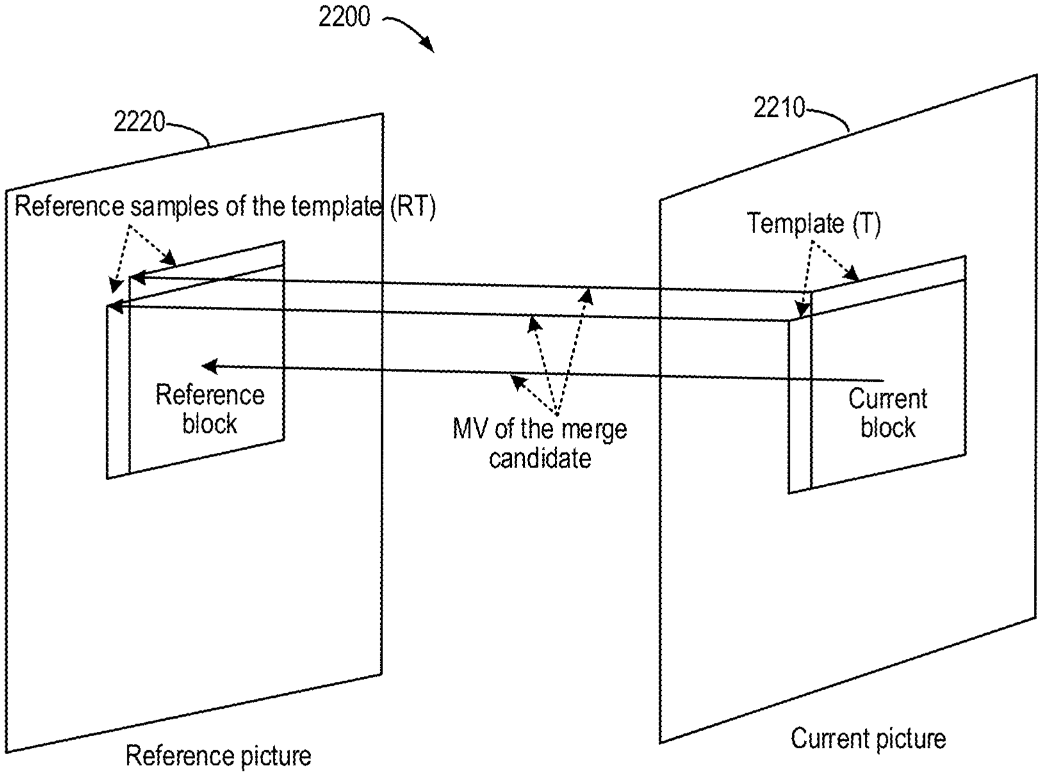
FIG. 22 illustrates template and reference samples of the template.

FIG. 22 shows a schematic diagram 2200 of template and reference samples of the template, wherein RT represents the reference samples of the template T. Hereinafter, template is a set of reconstructed samples adjacently or non-adjacently neighboring to the current block in a current picture 2210. Reference samples of the template are derived according to the same motion information of the current block. For example, reference samples of the template are mapping of the template depend on a motion information. In this case, reference samples of the template are located by a motion vector of the motion information in a reference picture 2220 indicated by the reference index of the motion information.

Figure 23:
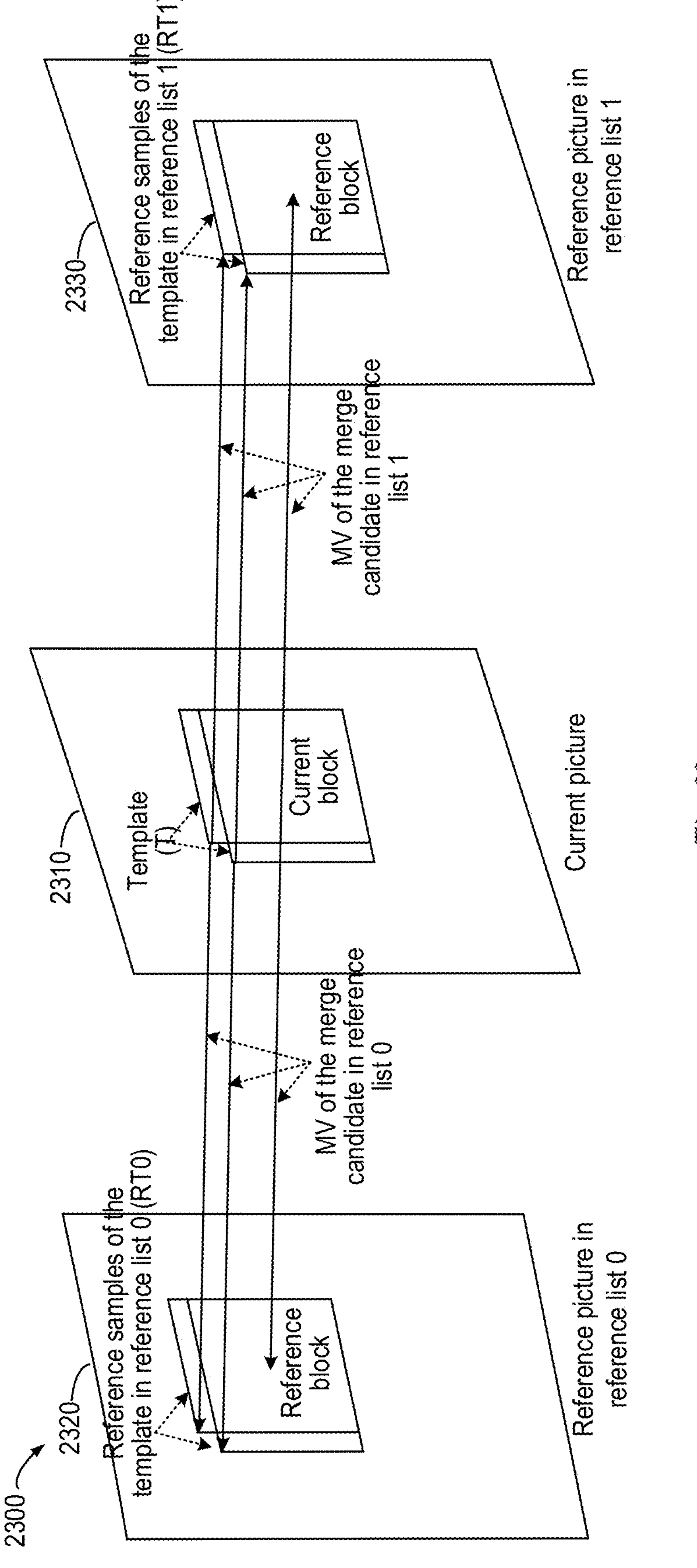
FIG. 23 illustrates template and reference samples of the template in reference list 0 and reference list 1.

FIG. 23 shows a schematic diagram 2300 of template and reference samples of the template in reference list 0 and reference list 1. When a merge candidate utilizes bi-directional prediction, the reference samples of the template of the merge candidate are denoted by RT and RT may be generated from $RT_0$ which are derived from a reference picture 2320 in reference picture list 0 and $RT_1$ derived from a reference picture 2330 in reference picture list 1. In one example, $RT_0$ includes a set of reference samples on the reference picture 2320 of the current block in the current picture 2310 indicated by the reference index of the merge candidate referring to a reference picture in reference list 0 with the MV of the merge candidate referring to reference list 0, In one example, $RT_1$ includes a set of reference samples on the reference picture 2330 of the current block indicated by the reference index of the merge candidate referring to a reference picture in reference list 1 with the MV of the merge candidate referring to reference list 1.

In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$$RT = (RT_0 + RT_1 + 1) \gg 1$$

In one example, the reference samples of the template ($RT_{bi\text{-}pred}$) for bi-directional prediction are derived by weighted averaging of the reference samples of the template in reference list0 ($RT_0$) and the reference samples of the template in reference list1 ($RT_1$). One example is as follows:

$$RT = \left((2^N - w) * RT_0 + w * RT_1 + 2^{N-1}\right) \gg N,$$

In one example, the weight of the reference template in reference list0 such as (8−w) and the weight of the reference template in reference list1 such as (w) maybe decided by the BCW index of the merge candidate.

The merge candidates can be divided to several groups according to some criterions. Each group is called a subgroup. For example, we can take adjacent spatial and temporal merge candidates as a first subgroup and take the remaining merge candidates as a second subgroup; In another example, we can also take the first N (N>2) merge candidates as a first subgroup, take the following M (M≥2) merge candidates as a second subgroup, and take the remaining merge candidates as a third subgroup. Note that the proposed methods may be applied to merge candidate list construction process for inter coded blocks (e.g., translational motion), affine coded blocks; or other motion candidate list construction process (e.g., AMVP list; IBC AMVP list; IBC merge list).

W and H are the width and height of current block (e.g., luma block). Taking merge candidate list construction process as an example in the following descriptions:

1. The merge candidates can be adaptively rearranged in the final merge candidate list according to one or some criterions.

a. In one example, partial or full process of current merge candidate list construction process is firstly invoked, followed by the reordering of candidates in the list.

i. Alternatively, candidates in a first subgroup may be reordered and they should be added before those candidates in a second subgroup wherein the first subgroup is added before the second subgroup.

(i) In one example, multiple merge candidates for a first category may be firstly derived and then reordered within the first category; then merge candidates from a second category may be determined according to the reordered candidates in the first category (e.g., how to apply pruning).

ii. Alternatively, a first merge candidate in a first category may be compared to a second merge candidate in a second category, to decide the order of the first or second merge candidate in the final merge candidate list.

b. In one example, the merge candidates may be adaptively rearranged before retrieving the merge candidates.

i. In one example, the procedure of arranging merge candidates adaptively may be processed before the obtaining the merge candidate to be used in the motion compensation process.

c. In one example, if the width of current block is larger than the height of current block, the above candidate is added before the left candidate.

d. In one example, if the width of current block is smaller than the height of current block, the above candidate is added after the left candidate.

e. Whether merge candidates are rearranged adaptively may depend on the selected merging candidate or the selected merging candidate index.

i. In one example, if the selected merging candidate is in the last sub-group, the merge candidates are not rearranged adaptively.

f. In one example, a merge candidate is assigned with a cost, the merge candidates are adaptively reordered in an ascending order of costs of merge candidates.

i. In one example, the cost of a merge candidate may be a template matching cost.

ii. In one example, template is a set of reconstructed samples adjacently or non-adjacently neighboring to the current block.

iii. A template matching cost is derived as a function of T and RT, wherein T is a set of samples in the template and RT is a set of reference samples for the template.

(i) How to obtain the reference samples of the template for a merge candidate may depend on the motion information of the merge candidate a) In one example, when deriving the reference samples of the template, the motion vectors of the merge candidate are rounded to the integer pixel accuracy, where the integer motion vector may be its nearest integer motion vector.

b) In one example, when deriving the reference samples of the template, N-tap interpolation filtering is used to get the reference samples of the template at sub-pixel positions. For example, N may be 2, 4, 6, or 8.

c) In one example, when deriving the reference samples of the template, the motion vectors of the merge candidates may be scaled to a given reference picture (e.g., for each reference picture list if available).

d) For example, the reference samples of the template of a merge candidate are obtained on the reference picture of the current block indicated by the reference index of the merge candidate with the MVs or modified MVs (e.g., according to bullets a)-b)) of the merge candidate as shown in FIG. 22.

e) For example, when a merge candidate utilizes bi-directional prediction, the reference samples of the template of the merge candidate are denoted by RT and RT may be generated from $RT_0$ which are derived from a reference picture in reference picture list 0 and $RT_1$ derived from a reference picture in reference picture list 1.

[1] In one example, $RT_0$ includes a set of reference samples on the reference picture of the current block indicated by the reference index of the merge candidate referring to a reference picture in reference list 0 with the MV of the merge candidate referring to reference list 0),

[2] In one example, $RT_1$ includes a set of reference samples on the reference picture of the current block indicated by the reference index of the merge candidate referring to a reference picture in reference list 1 with the MV of the merge candidate referring to reference list 1).

[3] An example is shown in FIG. 23.

f) In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$$RT = (RT_0 + RT_1 + 1) \gg 1$$

g) In one example, the reference samples of the template ($RT_{bi\text{-}pred}$) for bi-directional prediction are derived by weighted averaging of the reference samples of the template in reference list0 ($RT_0$) and the reference samples of the template in reference list1 ($RT_1$). One example is as follows:

$$RT = ((2^N - w) * RT_0 + w * RT_1 + 2^{N-1}) \gg N,$$

h) In one example, the weight of the reference template in reference list0 such as (8-w) and the weight of the reference template in reference list1 such as (w) maybe decided by the BCW index of the merge candidate.

[1] In one example, BCW index is equal to 0, w is set equal to −2.

[2] In one example, BCW index is equal to 1, w is set equal to 3.

[3] In one example, BCW index is equal to 2, w is set equal to 4.

[4] In one example, BCW index is equal to 3, w is set equal to 5.

[5] In one example, BCW index is equal to 4, w is set equal to 10 i) In one example, if the Local Illumination Compensation (LIC) flag of the merge candidate is true, the reference samples of the template are derived with LIC method.

(ii) The cost may be calculated based on the sum of absolute differences (SAD) of T and RT.

a) Alternatively, the cost may be calculated based on the sum of absolute transformed differences (SATD) of T and RT.

b) Alternatively, the cost may be calculated based on the sum of squared differences (SSD) of T and RT.

c) Alternatively, the cost may be calculated based on weighted SAD/weighted SATD/weighted SSD.

(iii) The cost may consider the continuity (Boundary_SAD) between RT and reconstructed samples adjacently or non-adjacently neighboring to T in addition to the SAD calculated in (ii). For example, reconstructed samples left and/or above adjacently or non-adjacently neighboring to T are considered.

a) In one example, the cost may be calculated based on SAD and Boundary_SAD

[1] In one example, the cost may be calculated as (SAD+w*Boundary_SAD). w may be pre-defined, or signaled or derived according to decoded information.

2. Whether to and/or how to reorder the merge candidates may depend on the category of the merge candidates.
   a. In one example, only adjacent spatial and temporal merge candidates can be reordered.
   b. In one example, only adjacent spatial, STMVP, and temporal merge candidates can be reordered.
   c. In one example, only adjacent spatial, STMVP, temporal and non-adjacent spatial merge candidates can be reordered.
   d. In one example, only adjacent spatial, STMVP, temporal, non-adjacent spatial and HMVP merge candidates can be reordered.
   e. In one example, only adjacent spatial, STMVP, temporal, non-adjacent spatial, HMVP and pair-wise average merge candidates can be reordered.
   f. In one example, only adjacent spatial, temporal, HMVP and pair-wise average merge candidates can be reordered.
   g. In one example, only adjacent spatial, temporal, and HMVP merge candidates can be reordered.
   h. In one example, only adjacent spatial merge candidates can be reordered.
   i. In one example, only the first subgroup can be reordered.
   j. In one example, the last subgroup can not be reordered.
   k. In one example, only the first N merge candidates can be reordered.
      i. In one example, N is set equal to 5.
   l. In one example, for the candidates not to be reordered, they will be arranged in the merge candidate list according to the initial order.
   m. In one example, candidates not to be reordered may be put behind the candidates to be reordered.
   n. In one example, candidates not to be reordered may be put before the candidates to be reordered.
   o. In one example, a combination of some of the above items (a~k) can be reordered.
   p. Different subgroups may be reordered separately.
   q. Two candidates in different subgroups cannot be compared and/or reordered.
   r. A first candidate in a first subgroup must be put ahead of a second candidate in a second subgroup after reordering if the first subgroup is ahead of a second subgroup.
3. Whether to and/or how to reorder the merge candidates may depend on the coding mode.
   a. In one example, if the coding mode is regular merge mode, the merge candidates can be reordered.
   b. In one example, if the coding mode is MMVD, the merge candidates to derive the base merge candidates are not reordered.
      i. Alternatively, the reordering method may be different for the MMVD mode and other merge modes.
   c. In one example, if the coding mode is CIIP, the merge candidates used for combination with intra prediction are based on the reordered merge candidates.
      i. Alternatively, the reordering method may be different for the CIIP mode and other merge modes.
   d. In one example, if the coding mode is GPM, the merge candidates to derive the uni-prediction candidate list are not reordered.
      i. Alternatively, the reordering method may be different for the GPM mode and other merge modes.
   e. In one example, if the coding mode is a triangle partition mode, the merge candidates to derive the uni-prediction candidate list are not reordered.
      i. Alternatively, the reordering method may be different for the triangular mode and other merge modes.
   f. In one example, if the coding mode is a subblock based merge mode, partial or full subblock based merge candidates are reordered.
      i. Alternatively, the reordering method may be different for the subblock based merge mode and other merge modes
      ii. In one example, the uni-prediction subblock based merge candidates are not reordered.
      iii. In one example, the SbTMVP candidate is not reordered.
      iv. In one example, the constructed affine candidates are not reordered.
      v. In one example, the zero padding affine candidates are not reordered.
4. Whether to and/or how to reorder the merge candidates may depend on the available number of adjacent spatial and/or STMVP and/or temporal merge candidates.
5. Whether the merge candidates need to be reordered or not may depend on decoded information (e.g., the width and/or height of the CU).
   a. In one example, if the height is larger than or equal to M, the width is larger than or equal to N, and width*height is larger than or equal to R, the merge candidates can be reordered.
      i. In one example, M, N, and R are set equal to 8, 8, and 128.
      ii. In one example, M, N, and R are set equal to 16, 16, and 512.

b. In one example, if the height is larger than or equal to M and the width is larger than or equal to N, the merge candidates can be reordered.
   i. In one example, M and N are set equal to 8 and 8.
   ii. In one example, M and N are set equal to 16 and 16.

6. The subgroup size can be adaptive.
   a. In one example, the subgroup size is decided according to the available number of adjacent spatial and/or STMVP and/or temporal merge candidates denoted as N.
      i. In one example, if N is smaller than M and larger than Q, the subgroup size is set to N;
      ii. In one example, if N is smaller than or equal to Q, no reordering is performed;
      iii. In one example, if N is larger than or equal to M, the subgroup size is set to M.
      iv. In one example, M and Q are set equal to 5 and 1, respectively.
         (i) Alternatively, M and/or Q may be pre-defined, or signaled or derived according to decoded information.
   b. In one example, the subgroup size is decided according to the available number of adjacent spatial and temporal merge candidates denoted as N.
      i. In one example, if N is smaller than M and larger than Q, the subgroup size is set to N;
      ii. In one example, if N is smaller than or equal to Q, no reorder is performed;
      iii. In one example, if N is larger than or equal to M, the subgroup size is set to M.
      iv. In one example, M and Q are set equal to 5 and 1, respectively.

7. The template shape can be adaptive.
   a. In one example, the template may only comprise neighboring samples left to the current block.
   b. In one example, the template may only comprise neighboring samples above to the current block.
   c. In one example, the template shape is selected according to the CU shape.
   d. In one example, the width of the left template is selected according to the CU height.
      i. For example, if H<=M, then the left template size is w1×H; otherwise, the left template size is w2×H.
   e. In one example, M, w1, and w2 are set equal to 8, 1, and 2, respectively.
   f. In one example, the height of the above template is selected according to the CU width.
      i. For example, if W<=N, then the above template size is W×h1; otherwise, the above template size is W×h2.
         (i) In one example, N, h1, and h2 are set equal to 8, 1, and 2, respectively.
   g. In one example, the width of the left template is selected according to the CU width.
      i. For example, if W<=N, then the left template size is w1×H; otherwise, the left template size is w2×H.
         (i) In one example, N, w1, and w2 are set equal to 8, 1, and 2, respectively.
   h. In one example, the height of the above template is selected according to the CU height.
      i. For example, if H<=M, then the above template size is W×h1; otherwise, the above template size is W×h2.
         (i) In one example, M, h1, and h2 are set equal to 8, 1, and 2, respectively.
   i. In one example, samples of the template and the reference samples of the template samples may be subsampled or downsampled before being used to calculate the cost.
      i. Whether to and/or how to do subsampling may depend on the CU dimensions.
      ii. In one example, no subsampling is performed for the short side of the CU.

8. In above examples, the merge candidate is one candidate which is included in the final merge candidate list (e.g., after pruning)
   a. Alternatively, the merge candidate is one candidate derived from a given spatial or temporal block or HMVP table or with other ways even it may not be included in the final merge candidate list.

9. The template may comprise samples of specific color component(s).
   a. In one example, the template only comprises samples of the luma component.

10. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

2.11. Adaptive Motion Candidate List Proposed

1. The motion candidates in a motion candidate list of a block can be adaptively rearranged to derive the reordered motion candidate list according to one or some criterions, and the block is encoded/decoded according to the reordered motion candidate list.
   a. The motion candidates in a motion candidate list of a block which is not a regular merge candidate list can be adaptively rearranged to derive the reordered motion candidate list according to one or some criterions.
   b. In one example, whether to and/or how to reorder the motion candidates may depend on the coding mode (e.g. affine merge, affine AMVP, regular merge, regular AMVP, GPM, TPM, MMVD, TM merge, CIIP, GMVD, affine MMVD).
   c. In one example, whether to and/or how to reorder the motion candidates may depend on the category (e.g., spatial, temporal, STMVP, HMVP, pair-wise, SbTMVP, constructed affine, inherited affine) of the motion candidates.
   d. In one example, the motion candidate list may be the AMVP candidate list.
   e. In one example, the motion candidate list may be the merge candidate list.
   f. In one example, the motion candidate list may be the affine merge candidate list.
   g. In one example, the motion candidate list may be the sub-block-based merge candidate list
   h. In one example, the motion candidate list may be the GPM merge candidate list.
   i. In one example, the motion candidate list may be the TPM merge candidate list.
   j. In one example, the motion candidate list may be the TM merge candidate list.
   k. In one example, the motion candidate list may be the candidate list for MMVD coded blocks.

l. In one example, the motion candidate list may be the candidate list for DMVR coded blocks.

2. How to adaptively rearrange motion candidates in a motion candidate list may depend on the decoded information, e.g., the category of a motion candidate, a category of a motion candidate list, a coding tool.
   a. In one example, for different motion candidate lists, different criteria may be used to rearrange the motion candidate list.
      i. In one example, the criteria may include how to select the template.
      ii. In one example, the criteria may include how to calculate the template cost.
      iii. In one example, the criteria may include how many candidates and/or how many sub-groups in a candidate list need to be reordered.
   b. In one example, the motion candidates in a motion candidate list are firstly adaptively rearranged to construct a fully rearranged candidate list or partially rearranged candidate list, and at least one motion candidate indicated by at least one index is then retrieved from the rearranged candidate list to derive the final motion information to be used by the current block.
   c. In one example, the motion candidates before refinement (e.g., using TM for TM coded blocks; adding MVD for MMVD coded blocks) are firstly adaptively rearranged to construct a fully rearranged candidate list or partially rearranged candidate list. Then at least one motion candidate indicated by at least one index is retrieved from the rearranged candidate list, and refinement (e.g., using TM for TM coded blocks; adding MVD for MMVD coded blocks) is applied to the retrieved one to derive the final motion information for the current block.
   d. In one example, refinement (e.g., using TM for TM coded blocks; adding MVD for MMVD coded blocks) is applied to at least one of the motion candidates in a motion candidate list, then they are adaptively rearranged to construct a fully rearranged candidate list or partially rearranged candidate list, and at least one motion candidate indicated by at least one index is then retrieved from the rearranged candidate list to derive final the motion information without any further refinement for the current block.

3. In one example, new MERGE/AMVP motion candidates may be generated based on the candidates reordering.
   i. For example, L0 motion and L1 motion of the candidates may be reordered separately.
   ii. For example, new bi-prediction merge candidates may be constructed by combining one from the reordered L0 motion and the other from the reordered L1 motion.
   iii. For example, new uni-prediction merge candidates may be generated by the reordered L0 or L1 motion.

2.12. Adaptive Motion Candidate List Proposed

Figure 24:
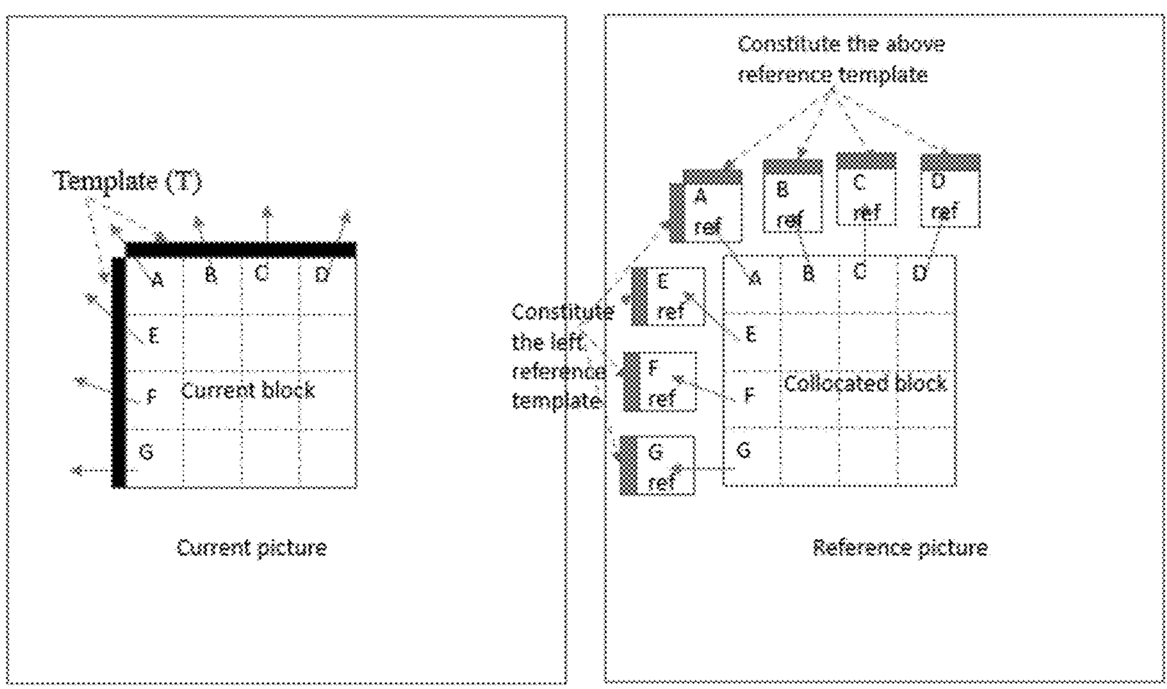
FIG. 24 shows template and reference samples of the template for block with sub-block motion using the motion information of the subblocks of current block.
Figure 25:
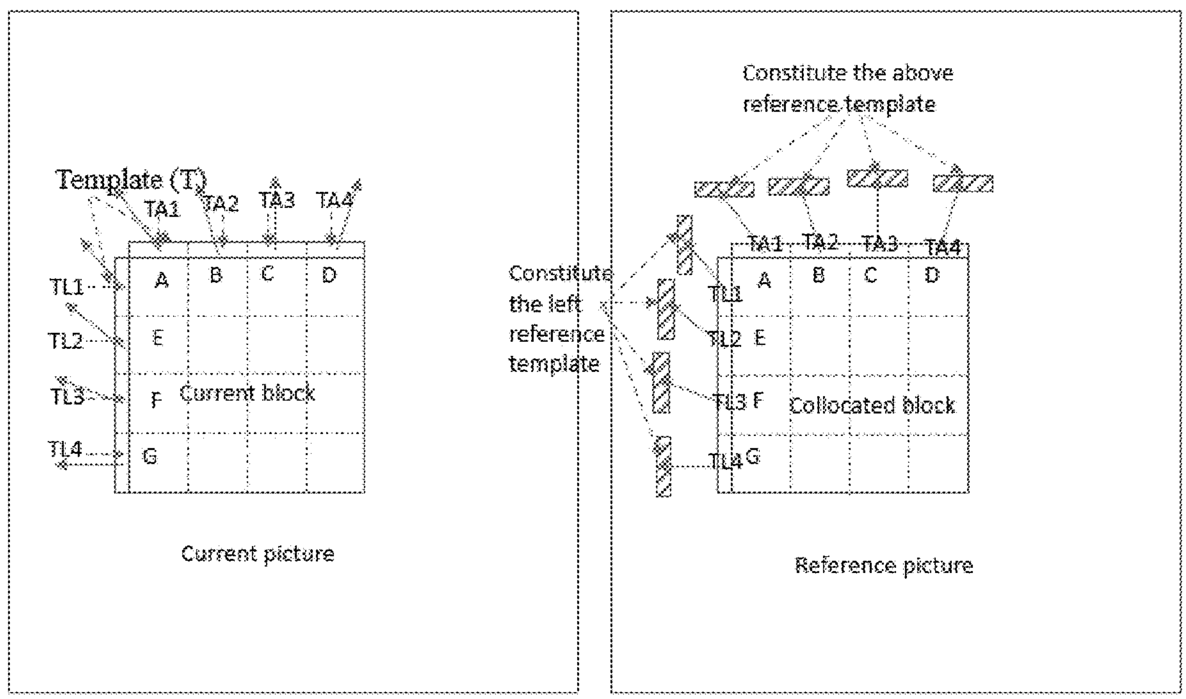
FIG. 25 shows template and reference samples of the template for block with sub-block motion using the motion information of each sub-template.

For subblock motion prediction, if the subblock size is Wsub*Hsub, the height of the above template is Ht, the width of the left template is Wt, the above template can be treated as a constitution of several sub-templates with the size of Wsub*Ht, the left template can be treated as a constitution of several sub-templates with the size of Wt*Hsub. After deriving the reference samples of each sub-template in the above similar way, the reference samples of the template are derived. Two examples are shown in FIGS. 24 and 25.

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, or IBC coded blocks; or other motion candidate list construction process (e.g., normal AMVP list; affine AMVP list; IBC AMVP list).

W and H are the width and height of current block (e.g., luma block).

1. In one example, if the coding mode is TM merge, partial or full TM merge candidates may be reordered.
   a. In one example, if the coding mode is TM merge, the partial or full original TM merge candidates may be reordered, before the TM refinement process.
   b. Alternatively, if the coding mode is TM merge, the partial or full refined TM merge candidates may be reordered, after the TM refinement process.
   c. Alternatively, if the coding mode is TM merge, the TM merge candidates may not be reordered.
   d. Alternatively, the reordering method may be different for the TM merge mode and other merge modes.

2. In one example, if the coding mode is a subblock based merge mode, partial or full subblock based merge candidates may be reordered.
   a. Alternatively, the reordering method may be different for the subblock based merge mode and other merge modes
   b. In one example, a template may be divided into sub-templates. Each sub-template may possess an individual piece of motion information.
      i. In one example, the cost used to reorder the candidates may be derived based on the cost of each sub-template. For example, the cost used to reorder the candidates may be calculated as the sum of the costs of all sub-templates. For example, the cost for a sub-template may be calculated as SAD, SATD, SSD or any other distortion measurement between the sub-template and its corresponding reference sub-template.
   c. In one example, to derive the reference samples of a sub-template, the motion information of the sub-blocks in the first row and the first column of current block may be used.
      i. In one example, the motion information of a sub-template may be derived (e.g. copied) from its adjacent sub-block in the current block. An example is shown in FIG. 24.
   d. In one example, to derive the reference samples of a sub-template, the motion information of the sub-template may be derived without referring to motion information of a sub-block in the current block. An example is shown in FIG. 25.
      i. In one example, the motion information of each sub-template is calculated according to the affine model of current block.
         (i) In one example, the motion vector of the center sample of each subblock containing a sub-template calculated according to the affine model of current block is treated as the motion vector of the sub-template.

(ii) In one example, the motion vector of the center sample of each sub-template calculated according to the affine model of current block is treated as the motion vector of the sub-template.

(iii) For 4-parameter affine motion model, motion vector at sample location (x, y) in a block is derived as:

$$\begin{cases} mv_x = \frac{mv_{1x} - mv_{0x}}{W}x + \frac{mv_{0y} - mv_{1y}}{W}y + mv_{0x} \\ mv_y = \frac{mv_{1y} - mv_{0y}}{W}x + \frac{mv_{1x} - mv_{0x}}{W}y + mv_{0y} \end{cases}$$

(iv) For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}$$

(v) For (iii) and (iv), the coordinates of above-left, above-right, and bottom-left corner of current block are (0,0), (W,0) and (0,H), the motion vectors of above-left, above-right, and bottom-left corner of current block are ($mv_{0x}$, $mv_{0y}$), ($mv_{1x}$, $mv_{1y}$) and ($mv_{2x}$, $mv_{2y}$).

(vi) In one example, the coordinate (x, y) in the above equations may be set equal to a position in the template, or a position of a sub-template. E.g., the coordinate (x, y) may be set equal to a center position of a sub-template.

e. In one example, this scheme may be applied to affine merge candidates.

f. In one example, this scheme may be applied to affine AMVP candidates.

g. In one example, this scheme may be applied to SbTMVP merge candidate.

h. In one example, this scheme may be applied to GPM merge candidates.

i. In one example, this scheme may be applied to TPM merge candidates.

j. In one example, this scheme may be applied to TM-refinement merge candidates.

k. In one example, this scheme may be applied to DMVR-refinement merge candidates.

l. In one example, this scheme may be applied to MULTI_PASS_DMVR-refinement merge candidates.

3. In one example, if the coding mode is MMVD, the merge candidates to derive the base merge candidates may be reordered.

a. In one example, the reordering process may be applied on the merge candidates before the merge candidates is refined by the signaled or derived MVD(s).

b. For example, the reordering method may be different for the MMVD mode and other merge modes.

4. In one example, if the coding mode is MMVD, the merge candidates after the MMVD refinement may be reordered.

a. In one example, the reordering process may be applied on the merge candidates after the merge candidates is refined by the signaled or derived MVD(s).

b. For example, the reordering method may be different for the MMVD mode and other merge modes.

5. In one example, if the coding mode is affine MMVD, the merge candidates to derive the base merge candidates may be reordered.

a. In one example, the reordering process may be applied on the merge candidates before the affine merge candidates is refined by the signaled or derived MVD(s).

b. For example, the reordering method may be different for the affine MMVD mode and other merge modes.

6. In one example, if the coding mode is affine MMVD, the merge candidates after the affine MMVD refinement may be reordered.

a. In one example, the reordering process may be applied on the affine merge candidates after the merge candidates is refined by the signaled or derived MVD(s).

b. For example, the reordering method may be different for the affine MMVD mode and other merge modes.

7. In one example, if the coding mode is GMVD, the merge candidates to derive the base merge candidates may be reordered.

a. In one example, the reordering process may be applied on the merge candidates before the merge candidates is refined by the signaled or derived MVD(s).

b. For example, the reordering method may be different for the GMVD mode and other merge modes.

8. In one example, if the coding mode is GMVD, the merge candidates after the GMVD refinement may be reordered.

a. In one example, the reordering process may be applied on the merge candidates after the merge candidates is refined by the signaled or derived MVD(s).

b. For example, the reordering method may be different for the GMVD mode and other merge modes.

9. In one example, if the coding mode is GPM, the merge candidates may be reordered.

a. In one example, the reordering process may be applied on the original merge candidates before the merge candidates are used to derive the GPM candidate list for each partition (a.k.a. the uni-prediction candidate list for GPM).

b. In one example, if the coding mode is GPM, the merge candidates in the uni-prediction candidate list may be reordered.

c. In one example, the GPM uni-prediction candidate list may be constructed based on the reordering.

i. In one example, a candidate with bi-prediction (a.k.a. bi-prediction candidate) may be separated into two uni-prediction candidates.

(i) If the number of original merge candidates is M, at most 2M uni-prediction candidates may be separated from them.

ii. In one example, uni-prediction candidates separated from a bi-prediction candidate may be put into an initial uni-prediction candidate list.

iii. In one example, candidates in the initial uni-prediction candidate list may be reordered with the template matching costs.

iv. In one example, the first N uni-prediction candidates with smaller template matching costs may be used as the final GPM uni-prediction candidates. As an example, N is equal to M.

d. In one example, after deriving a GPM uni-prediction candidate list, a combined bi-prediction list for partition 0 and partition 1 is constructed, then the bi-prediction list is reordered.
   i. In one example, if the number of GPM uni-prediction candidates is M, the number of combined bi-prediction candidates is M*(M−1).
e. Alternatively, the reordering method may be different for the GPM mode and other merge modes.

2.13. Adaptive Motion Candidate List Proposed

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, or IBC coded blocks; or other motion candidate list construction process (e.g., normal AMVP list; affine AMVP list; IBC AMVP list).

W and H are the width and height of current block (e.g., luma block).

1. The reference samples of a template or sub-template (RT) for bi-directional prediction are derived by equal weighted averaging of the reference samples of the template or sub-template in reference list0 ($RT_0$) and the reference samples of the template or sub-template in reference list1 ($RT_1$). One example is as follows:

$$RT(x, y) = (RT_0(x, y) + RT_1(x, y) + 1) \gg 1$$

Figure 26:
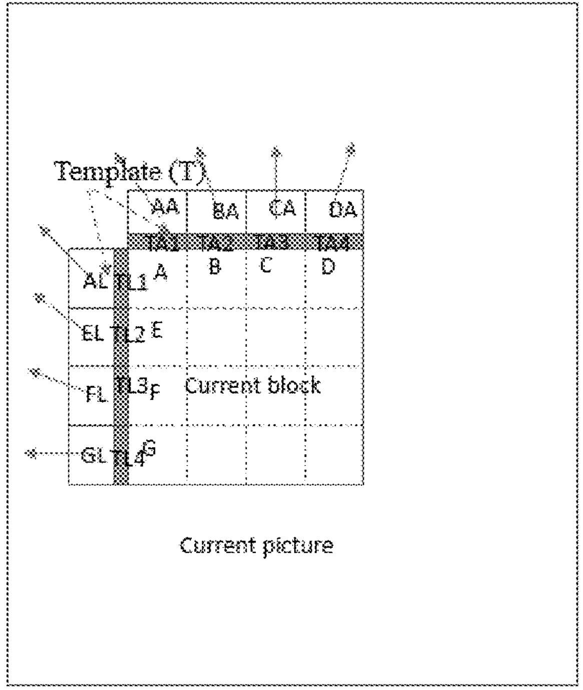
FIG. 26 shows template and reference samples of the template for block with OBMC.
Figure 26:
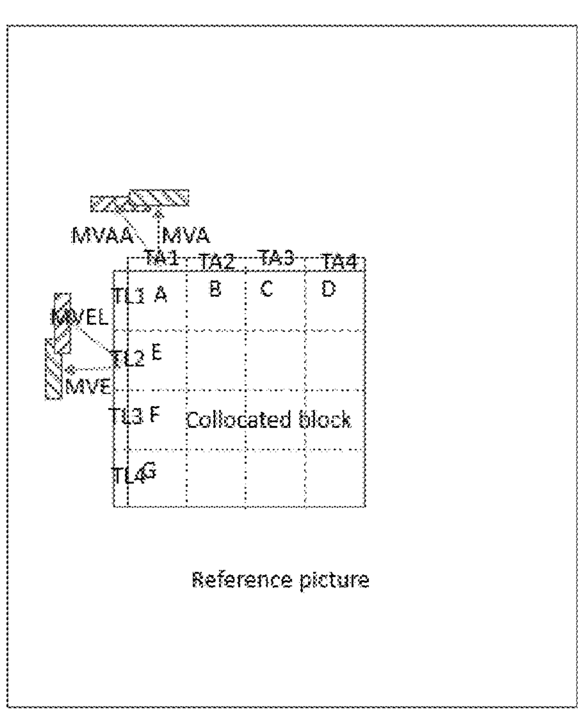

2. The reference samples of a template or sub-template (RT) for bi-directional prediction are derived by weighted averaging of the reference samples of the template or sub-template in reference list0 ($RT_0$) and the reference samples of the template or sub-template in reference list1 ($RT_1$).
   a. One example is as follows:

$$RT(x, y) = \left(\left(2^N - w\right) * RT_0(x, y) + w * RT_1(x, y) + 2^{N-1}\right) \gg N,$$

for example, N=3.
   b. The weights may be determined by the BCW index or derived on-the-fly or pre-defined or by the weights used in weighted prediction.
   c. In one example, the weight of the reference template in reference list0 such as (8-w) and the weight of the reference template in reference list1 such as (w) maybe decided by the BCW index of the merge candidate.
      i. In one example, BCW index is equal to 0, w is set equal to −2.
      ii. In one example, BCW index is equal to 1, w is set equal to 3.
      iii. In one example, BCW index is equal to 2, w is set equal to 4.
      iv. In one example, BCW index is equal to 3, w is set equal to 5.
      v. In one example, BCW index is equal to 4, w is set equal to 10.
3. It is proposed that the reference samples of the template may be derived with LIC method.
   a. In one example, the LIC parameters for both left and above templates are the same as the LIC parameters of current block.
   b. In one example, the LIC parameters for left template are derived as the LIC parameters of current block which uses its original motion vector plus a motion vector offset of (−Wt,0) as the motion vector of current block.
   c. In one example, the LIC parameters for above template are derived as the LIC parameters of current block which uses its original motion vector plus a motion vector offset of (0,−Ht) as the motion vector of current block.
   d. Alternatively, furthermore, the above bullets may be applied if the Local Illumination Compensation (LIC) flag of a merge candidate is true
4. It is proposed that the reference samples of the template or sub-template may be derived with OBMC method. In the following discussion, a "template" may refer to a template or a sub-template.
   a. In one example, to derive the reference samples of the above template, the motion information of the subblocks in the first row of current block and their above adjacent neighboring subblocks are used. And the reference samples of all the sub-templates constitute the reference samples of the above template. An example is shown in FIG. 26.
   b. In one example, to derive the reference samples of the left template, the motion information of the subblocks in the first column of current block and their left adjacent neighboring subblocks are used. And the reference samples of all the sub-templates constitute the reference samples of the left template. An example is shown in FIG. 26.
   c. In one example, the subblock size is 4×4.
   d. The reference samples of a sub-template based on motion vectors of a neighbouring subblock is denoted as $P_N$, with N indicating an index for the neighbouring above and left subblocks and the reference samples of a sub-template based on motion vectors of a subblock of current block is denoted as $P_C$. For $P_N$ generated based on motion vectors of vertically (horizontally) neighbouring sub-block, samples in the same row (column) of $P_N$ are added to $P_C$ with a same weighting factor.
      i. The reference samples of a sub-template (P) may be derived as $P=W_N*P_N+W_C*P_C$
      ii. In one example, the weighting factors {1/4, 1/8, 1/16, 1/32} are used for the {first, second, third, fourth} row (column) of $P_N$ and the weighting factors {3/4, 7/8, 15/16, 31/32} are used for the {first, second, third, fourth} row (column) of $P_C$ if the height of the above template or the width of the left template is larger than or equal to 4.
      iii. In one example, the weighting factors {1/4, 1/8} are used for the {first, second} row (column) of $P_N$ and the weighting factors {3/4, 7/8} are used for the {first, second} row (column) of $P_C$ if the height of the above template or the width of the left template is larger than or equal to 2.
      iv. In one example, the weighting factor {1/4} is used for the first row (column) of $P_N$ and the weighting factor {3/4} is used for the first row (column) of $P_C$ if the height of the above template or the width of the left template is larger than or equal to 1.

e. The above bullets may be applied if a merge candidate is assigned with OBMC enabled.

5. In one example, if a merge candidate uses multi-hypothesis prediction, the reference samples of the template may be derived with multi-hypothesis prediction method.
6. The template may comprise samples of specific color component(s).
   a. In one example, the template only comprises samples of the luma component.
   b. Alternatively, the template only comprises samples of any component such as Cb/Cr/R/G/B.
7. Whether to and/or how to reorder the motion candidates may depend on the category of the motion candidates.
   a. In one example, only adjacent spatial and temporal motion candidates can be reordered.
   b. In one example, only adjacent spatial, STMVP, and temporal motion candidates can be reordered.
   c. In one example, only adjacent spatial, STMVP, temporal and non-adjacent spatial motion candidates can be reordered.
   d. In one example, only adjacent spatial, STMVP, temporal, non-adjacent spatial and HMVP motion candidates can be reordered.
   e. In one example, only adjacent spatial, STMVP, temporal, non-adjacent spatial, HMVP and pair-wise average motion candidates can be reordered.
   f. In one example, only adjacent spatial, temporal, HMVP and pair-wise average motion candidates can be reordered.
   g. In one example, only adjacent spatial, temporal, and HMVP motion candidates can be reordered.
   h. In one example, only adjacent spatial motion candidates can be reordered.
   i. In one example, the uni-prediction subblock based motion candidates are not reordered.
   j. In one example, the SbTMVP candidate is not reordered.
   k. In one example, the inherited affine motion candidates are not reordered.
   l. In one example, the constructed affine motion candidates are not reordered.
   m. In one example, the zero padding affine motion candidates are not reordered.
   n. In one example, only the first N motion candidates can be reordered.
   i. In one example, N is set equal to 5.
8. In one example, the motion candidates may be divided into subgroups. Whether to and/or how to reorder the motion candidates may depend on the subgroup of the motion candidates.
   a. In one example, only the first subgroup can be reordered.
   b. In one example, the last subgroup can not be reordered.
   c. In one example, the last subgroup can not be reordered. But if the last subgroup also is the first subgroup, it can be reordered.
   d. Different subgroups may be reordered separately.
   e. Two candidates in different subgroups cannot be compared and/or reordered.
   f. A first candidate in a first subgroup must be put ahead of a second candidate in a second subgroup after reordering if the first subgroup is ahead of a second subgroup.
9. In one example, the motion candidates which are not included in the reordering process may be treated in specified way.
   a. In one example, for the candidates not to be reordered, they will be arranged in the merge candidate list according to the initial order.
   b. In one example, candidates not to be reordered may be put behind the candidates to be reordered.
   c. In one example, candidates not to be reordered may be put before the candidates to be reordered.
10. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

2.14. Cost Function Utilized in Coding Data Refinement in Image/Video Coding

The term ‘block’ may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

In the disclosure, the phrase “motion candidate” may represent a merge motion candidate in a regular/extended merge list indicated by a merge candidate index, or an AMVP motion candidate in regular/extended AMVP list indicated by an AMVP candidate index, or one AMVP motion candidate, or one merge motion candidate.

In the disclosure, a motion candidate is called to be “refined” if the motion information of the candidate is modified according to information signaled from the encoder or derived at the decoder. For example, a motion vector may be refined by DMVR, FRUC, TM merge, TM AMVP, TM GPM, TM CIIP, TM affine, MMVD, GMVD, affine MMVD, BDOF and so on.

In the disclosure, the phrase “coding data refinement” may represent a refinement process in order to derive or refine the signalled/decoded/derived prediction modes, prediction directions, or signalled/decoded/derived motion information, prediction and/or reconstruction samples for a block. In one example, the refinement process may include motion candidate reordering.

In the following discussion, a “template-based-coded” block may refer to a block using a template matching based method in the coding/decoding process to derive or refine coded information, such as template-matching based motion derivation, template-matching based motion list reconstruction, LIC, sign prediction, template-matching based block vector (e.g., used in IBC mode) derivation, DIMD, template-matching based non-inter (e.g., intra) prediction, etc. The template-based-coded method may be combined with any other coding tools, such as MMVD, CIIP, GPM, FRUC, Affine, BDOF, DMVR, OBMC, etc. In yet another example, the “template-based-coded” block may also refer to a block which derives or refines its decoded information based on certain rules using neighboring reconstructed samples (adjacent or non-adjacent), e.g., the DIMD method in 2.27 and the TIMD method 2.29).

In the following discussion, a “bilateral-based-coded” block may refer to a block using a bilateral matching based method in the coding/decoding process to derive or refine coded information, such as bilateral-matching based motion derivation, bilateral-matching based motion list reconstruction, and etc. The bilateral-based-coded method may be combined with any other coding tools, such as MMVD, CIIP, GPM, FRUC, Affine, DMVR, and etc.

W and H are the width and height of current block (e.g., luma block). W*H is the size of current block (e.g., luma block)

In the following discussion, Shift(x, s) is defined as $$Shift(x,s)=(x+offset)>>s,$$ wherein offset is an integer such as offset=0 or offset=1<<(s−1) or offset=(1<<(s−1))−1.

In another example, offset depends on x. For example, offset=(x<0 ?(1<<(s−1)): ((1<<(s−1)−1).

1. In addition to the error measurement, it is proposed to add a regulation item in the cost calculation process.
   a) In one example, the cost is defined as: E+W*RI wherein the E represents the output of an error function, W is the weight applied to the regulation item denoted by RI.
      i. In one example, for processing the template-based-coded block/bilateral-based-coded block, the cost function is set to: E+W*RI wherein E may be SAD/MRSAD/SATD or others, RI is the estimated bits for motion vectors/motion vector differences, W is a weight, e.g., which may rely on QP/temporal layer etc. al.
      ii. Alternatively, the cost is defined as: w0*E+W1*RI wherein the E represents the output of an error function, W1 is the weight applied to the regulation item denoted by RI, w0 is the weight applied to the output of the error function.
         (i) Alternatively, furthermore, W1 may be set to 0.
   b) In one example, the regulation item is multiplied by a weighted rate.
      i. In one example, the weight is derived on-the-fly.
      ii. In one example, the weight is set to lambda used in the full RDO process
      iii. In one example, the weight is set to a square root of the lambda used in the full RDO process.
   c) In one example, the cost is calculated as E+Shift (W*RI, s), wherein s and W are integers.
      i. Alternatively, the cost is calculated as Shift ((E<<s)+W*RI, s), wherein s and W are integers.
2. It is proposed to use an error function different from SAD/MR-SAD (mean removal sum of absolute difference) for processing a template-based-coded block/bilateral-based-coded block.
   a) In one example, the error function may be
      i. SATD
      ii. MR-SATD
      iii. Gradient information
      iv. SSE/SSD
      v. MR-SSE/MR-SSD
      vi. Weighted SAD/weighted MR-SAD
      vii. Weighted SATD/weighted MR-SATD
      viii. Weighted SSD/weighted MR-SSD
      ix. Weighted SSE/weighted MR-SSE
   b) Alternatively, furthermore, it is proposed to adaptively select the error function among different cost functions such as the above mentioned error functions and SAD/MR-SAD.
      i. The selection may be determined on-the-fly.
3. When using the MR-X (e.g., X being SATD, SAD, SSE) based error function (e.g., MR-SAD/MR-SATD etc. al), the following may further apply:
   a) In one example, the mean may be calculated with all samples in a block to be compared taken into consideration.
   b) In one example, the mean may be calculated with partial samples in a block to be compared taken into consideration.
   c) In one example, the mean and the X function may depend on same samples in a block.
      i. In one example, the mean and X function may be calculated with all samples in the block.
      ii. In one example, the mean and X function may be calculated with partial samples in the block.
   d) In one example, the mean and the X function may depend on at least one different samples in a block.
      i. In one example, the mean may be calculated with all samples while the X function may depend on partial samples in the block.
      ii. In one example, the mean may be calculated with partial samples while the X function may depend on all samples in the block.
4. The template/bilateral matching cost may be calculated by applying a cost factor to the error cost function.
   a) In one example, it is proposed to favor the motion candidates ahead during the template/bilateral matching based reordering process.
      i. In one example, the motion candidate in the ith position is assigned with a smaller cost factor than the cost factor of the motion candidate in the (i+1)th position.
      ii. In one example, the motion candidates in the ith group (e.g. involve M motion candidates) are assigned with a smaller cost factor than the cost factor of the motion candidates in the (i+1)th group (e.g. involve N motion candidates).
         (i) In one example, M may be equal to N. For example, M=N=2.
         (ii) In one example, M may be not equal to N. For example, M=2, N=3.
   b) In one example, it is proposed to favor the searching MVs closer to original MV during the template/bilateral matching based refinement process
      i. In one example, each search region is assigned with a cost factor, which may be determined by the distance (e.g. delta MV in integer pixel precision) between each searching MV in the search region and the starting MV.
      ii. In one example, each search region is assigned with a cost factor, which may be determined by the distance (e.g. delta MV in integer pixel precision) between the center searching MV in the search region and the starting MV.
      iii. In one example, each searching MV is assigned with a cost factor, which may be determined by the distance (e.g. delta MV in integer pixel precision) between each searching MV and the starting MV.
5. The above methods may be applied to any coding data refinement process, e.g., for a template-based-coded block, for a bilateral-based-coded block (e.g., DMVR in VVC).
6. The template matching cost measurement may be different for different template matching refinement methods.
   a. In one example, the template matching refinement method may be template matching based motion candidate reordering.
   b. In one example, the template matching refinement method may be template matching based motion derivation.
      i. In one example, the refinement method may be TM AMVP, TM merge, and/or FRUC.

c. In one example, the template matching refinement method may be template matching based motion refinement.
   ii. In one example, the refinement method may be TM GPM, TM CIIP, and/or TM affine.
d. In one example, the template matching refinement method may be template matching based block vector derivation.
e. In one example, the template matching refinement method may be template matching based intra mode derivation.
   iii. In one example, the refinement method may be DIMD and/or TIMD.
f. In one example, the template matching cost measure may be calculated based on the sum of absolute differences (SAD) between the current and reference templates.
g. In one example, the template matching cost measure may be calculated based on the mean-removal SAD between the current and reference templates.
h. In one example, SAD and mean-removal SAD (MR-SAD) might be selectively utilized according to the size of the current block.
   i. In one example, mean-removal SAD is used for the block with size larger than M and SAD is used for the block with size smaller than or equal to M.
      (i) In one example, M is 64.
i. In one example, SAD and mean-removal SAD (MR-SAD) might be selectively utilized according to the LIC flag of the current block.
   i. In one example, the template matching cost measure may be SAD if the LIC flag of the current block is false.
   ii. In one example, the template matching cost measure may be MR-SAD if the LIC flag of the current block is true.
j. In one example, the template matching cost measure may be calculated based on the sum of absolute transformed differences (SATD) between the current and reference templates.
k. In one example, the template matching cost measure may be calculated based on the mean-removal SATD between the current and reference templates.
l. In one example, SATD and mean-removal SATD (MR-SATD) might be selectively utilized according to the size of the current block.
   i. In one example, mean-removal SATD is used for the block with size larger than M and SATD is used for the block with size smaller than or equal to M.
      (i) In one example, M is 64.
m. In one example, SATD and mean-removal SATD (MR-SATD) might be selectively utilized according to the LIC flag of the current block.
   i. In one example, the template matching cost measure may be SATD if the LIC flag of the current block is false.
   ii. In one example, the template matching cost measure may be MR-SATD if the LIC flag of the current block is true.
n. In one example, the template matching cost measure may be calculated based on the sum of squared differences (SSD) between the current and reference templates.
o. In one example, the template matching cost measure may be calculated based on the mean-removal SSD between the current and reference templates.
p. In one example, SSD and mean-removal SSD (MR-SSD) might be selectively utilized according to the size of the current block.
   i. In one example, mean-removal SSD is used for the block with size larger than M and SSD is used for the block with size smaller than or equal to M.
      (i) In one example, M is 64.
q. In one example, the template matching cost measure may be the weighted SAD/weighted MR-SAD/selectively weighted MR-SAD and SAD/weighted SATD/weighted MR-SATD/selectively weighted MR-SATD and SATD/weighted SSD/weighted MR-SSD/selectively weighted MR-SSD and SSD between the current and reference templates.
   i. In one example, the weighted means applying different weights to each sample based on its row and column indices in template block when calculating the distortion between the current and reference templates.
   ii. In one example, the weighted means applying different weights to each sample based on its positions in template block when calculating the distortion between the current and reference templates.
   iii. In one example, the weighted means applying different weights to each sample based on its distances to current block when calculating the distortion between the current and reference templates.
r. In one example, the template matching cost may be calculated as a form of tplCost=w1*mvDistanceCost+w2*distortionCost.
   i. In one example, distortionCost may be weighted SAD/weighted MR-SAD/weighted SATD/weighted MR-SATD/weighted SSD/weighted MR-SSD/SAD/MR-SAD/SATD/MR-SATD/SSD/MR-SSD between the current and reference templates.
   ii. In one example, mvDistanceCost may be the sum of absolute mv differences of searching point and starting point in horizontal and vertical directions.
   iii. In one example, w1 and w2 may be pre-defined, or signaled or derived according to decoded information.
      (i) In one example, w1 is a weighting factor set to 4, w2 is a weighting factor set to 1
s. The cost may consider the continuity (Boundary_SAD) between reference template and reconstructed samples adjacently or non-adjacently neighboring to current template in addition to the SAD calculated in (f). For example, reconstructed samples left and/or above adjacently or non-adjacently neighboring to current template are considered.
   i. In one example, the cost may be calculated based on SAD and Boundary_SAD
      (i) In one example, the cost may be calculated as (SAD+w*Boundary_SAD). w may be pre-defined, or signaled or derived according to decoded information.

7. The bilateral matching cost measurement may be different for different bilateral matching refinement methods.
   a) In one example, the bilateral matching refinement method may be bilateral matching based motion candidate reordering.

b) In one example, the bilateral matching refinement method may be bilateral matching based motion derivation.
   i. In one example, the refinement method may be BM merge and/or FRUC.
c) In one example, the bilateral matching refinement method may be bilateral matching based motion refinement.
   i. In one example, the refinement method may be BM GPM, BM CIIP, and/or BM affine.
d) In one example, the bilateral matching refinement method may be bilateral matching based block vector derivation.
e) In one example, the bilateral matching refinement method may be bilateral matching based intra mode derivation.
f) In one example, the bilateral matching cost measure may be calculated based on the sum of absolute differences (SAD) between the two reference blocks/subblocks.
g) In one example, the bilateral matching cost measure may be calculated based on the mean-removal SAD between the two reference blocks/subblocks.
h) In one example, SAD and mean-removal SAD (MR-SAD) might be selectively utilized according to the size of the current block/subblock.
   i. In one example, mean-removal SAD is used for the block/subblock with size larger than M and SAD is used for the block/subblock with size smaller than or equal to M.
      (i) In one example, M is 64.
i) In one example, SAD and mean-removal SAD (MR-SAD) might be selectively utilized according to the LIC flag of the current block.
   i. In one example, the bilateral matching cost measure may be SAD if the LIC flag of the current block is false.
   ii. In one example, the bilateral matching cost measure may be MR-SAD if the LIC flag of the current block is true.
j) In one example, the bilateral matching cost measure may be calculated based on the sum of absolute transformed differences (SATD) between the two reference blocks/subblocks.
k) In one example, the bilateral matching cost measure may be calculated based on the mean-removal SATD between the two reference blocks/subblocks.
l) In one example, SATD and mean-removal SATD (MR-SATD) might be selectively utilized according to the size of the current block/subblock.
   i. In one example, mean-removal SATD is used for the block/subblock with size larger than M and SATD is used for the block/subblock with size smaller than or equal to M.
      (i) In one example, M is 64.
m) In one example, SATD and mean-removal SATD (MR-SATD) might be selectively utilized according to the LIC flag of the current block.
   i. In one example, the bilateral matching cost measure may be SATD if the LIC flag of the current block is false.
   ii. In one example, the bilateral matching cost measure may be MR-SATD if the LIC flag of the current block is true.
n) In one example, the bilateral matching cost measure may be calculated based on the sum of squared differences (SSD) between the two reference blocks/subblocks.
o) In one example, the bilateral matching cost measure may be calculated based on the mean-removal SSD between the two reference blocks/subblocks.
p) In one example, SSD and mean-removal SSD (MR-SSD) might be selectively utilized according to the size of the current block/subblock.
   i. In one example, mean-removal SSD is used for the block/subblock with size larger than M and SSD is used for the block/subblock with size smaller than or equal to M.
      (i) In one example, M is 64.
q) In one example, SSD and mean-removal SSD (MR-SSD) might be selectively utilized according to the LIC flag of the current block.
   i. In one example, the bilateral matching cost measure may be SSD if the LIC flag of the current block is false.
   ii. In one example, the bilateral matching cost measure may be MR-SSD if the LIC flag of the current block is true.
r) In one example, the bilateral matching cost measure may be the weighted SAD/weighted MR-SAD/selectively weighted MR-SAD and SAD/weighted SATD/weighted MR-SATD/selectively weighted MR-SATD and SATD/weighted SSD/weighted MR-SSD/selectively weighted MR-SSD and SSD between the two reference blocks/subblocks.
   i. In one example, the weighted means applying different weights to each sample based on its row and column indices in reference block/subblock when calculating the distortion between the two reference blocks/subblocks.
   ii. In one example, the weighted means applying different weights to each sample based on its positions in reference block/subblock when calculating the distortion between the two reference blocks/subblocks.
   iii. In one example, the weighted means applying different weights to each sample based on its distances to center position of reference block/subblock when calculating the distortion between the two reference blocks/subblocks.
s) In one example, if MR-SAD/MR-SATD/MR-SSD is used for the bilateral matching cost measure, LIC may be not used when deriving the reference blocks/subblocks.
t) In one example, the bilateral matching cost may be calculated as a form of bilCost=w1*mvDistanceCost+w2*distortionCost.
   i. In one example, distortionCost may be weighted SAD/weighted MR-SAD/weighted SATD/weighted MR-SATD/weighted SSD/weighted MR-SSD/SAD/MR-SAD/SATD/MR-SATD/SSD/MR-SSD between the two reference blocks/subblocks.
   ii. In one example, mvDistanceCost may be the sum of absolute mv differences of searching point and starting point in horizontal and vertical directions.
   iii. In one example, w1 and w2 may be pre-defined, or signaled or derived according to decoded information.
      (i) In one example, w1 is a weighting factor set to 4, w2 is a weighting factor set to 1.

8. The bilateral or template matching cost may be calculated based on prediction/reference samples which are modified by a function.
   a) In one example, the prediction/reference samples may be filtered before being used to calculate the bilateral or template matching cost.
   b) In one example, a prediction/reference sample S may be modified to be a*S+b before being used to calculate the bilateral or template matching cost.
   c) In one example, the modification may depend on the coding mode of the block, such as whether the block is LIC-coded or BCW-coded.

2.15. Usage of Multiple Cost Functions in Coding Data Refinement in Image/Video Coding The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

In the disclosure, the phrase "motion candidate" may represent a merge motion candidate in a regular/extended merge list indicated by a merge candidate index, or an AMVP motion candidate in regular/extended AMVP list indicated by an AMVP candidate index, or one AMVP motion candidate, or one merge motion candidate.

In the disclosure, a motion candidate is called to be "refined" if the motion information of the candidate is modified according to information signaled from the encoder or derived at the decoder. For example, a motion vector may be refined by DMVR, FRUC, TM merge, TM AMVP, TM GPM, TM CIIP, TM affine, MMVD, GMVD, affine MMVD, BDOF and so on.

In the disclosure, the phrase "coding data refinement" may represent a refinement process in order to derive or refine the signalled/decoded/derived prediction modes, prediction directions, or signalled/decoded/derived motion information, prediction and/or reconstruction samples for a block. In one example, the refinement process may include motion candidate reordering.

In the following discussion, a "template-based-coded" block may refer to a block using a template matching based method in the coding/decoding process to derive or refine coded information, such as template-matching based motion derivation, template-matching based motion list reconstruction, LIC, sign prediction, template-matching based block vector (e.g., used in IBC mode) derivation, DIMD, template-matching based non-inter (e.g., intra) prediction, etc. The template-based-coded method may be combined with any other coding tools, such as MMVD, CIIP, GPM, FRUC, Affine, BDOF, DMVR, OBMC, etc. In yet another example, the "template-based-coded" block may also refer to a block which derives or refines its decoded information based on certain rules using neighboring reconstructed samples (adjacent or non-adjacent), e.g., the DIMD method in 2.27 and the TIMD method 2.29).

In the following discussion, a "bilateral-based-coded" block may refer to a block using a bilateral matching based method in the coding/decoding process to derive or refine coded information, such as bilateral-matching based motion derivation, bilateral-matching based motion list reconstruction, and etc. The bilateral-based-coded method may be combined with any other coding tools, such as MMVD, CIIP, GPM, FRUC, Affine, DMVR, and etc.

W and H are the width and height of current block (e.g., luma block). W*H is the size of current block (e.g., luma block)

1. The cost definition may rely on outputs of multiple errors functions (e.g., distortion measurement methods) regarding the error/difference of two samples/blocks to be evaluated in one coding data refinement process of a current block.
   a) In one example, the error function may be:
      i. SAD
      ii. SATD
      iii. MR-SAD
      iv. MR-SATD
      v. Gradient information
      vi. SSE/SSD
      vii. MR-SSE/MR-SSD
      viii. Weighted SAD/weighted MR-SAD
      ix. Weighted SATD/weighted MR-SATD
      x. Weighted SSD/weighted MR-SSD
      xi. Weighted SSE/weighted MR-SSE
   b) In one example, the error function may be performed in block level or sub-block level.
      i. Alternatively, furthermore, for two sub-blocks, the error function may be different.
      ii. Alternatively, furthermore, the final output of the evaluated error of a block may be based on the outputs of sub-blocks, e.g., sum of outputs of error functions applied to each sub-block.
2. When the cost definition relies on outputs of multiple functions, the following may further apply:
   a) In one example, the cost function may rely on a linear weighted sum of multiple error functions.
   b) In one example, the cost function may rely on a non-linear weighted sum of multiple error functions.
   c) In one example, the cost function may further rely on estimated bits for side information.
   d) In one example, the cost function may be defined as:

$$C = R + \sum_{i=0}^{N-1} W_i * E_i$$

wherein R denotes the estimated bits for side information, $W_i$ and $E_i$ represent the weight applied to the i-th error function and output of the i-th error function, respectively.
3. Multiple refinement processes may be applied to one block with at least more than two different cost functions applied to at least two refinement processes.
   a) In one example, a first refinement process may be invoked with a first cost function. Based on the output of the first refinement process, a second cost function is further applied to the second refinement process.
   b) The above methods may be applied to the template-based-coded blocks.
4. Whether to use multiple refinement process, and/or how to select one or multiple error function and/or how to define the cost function and/or which samples to be involved in the error function may depend on the decoded information of a current block and/or its neighboring (adjacent or non-adjacent) blocks.
   a) In one example, how to select one or multiple error function and/or how to define the cost function may depend on the coding tool applied to current block and/or its neighboring blocks.

i. In one example, the coding tool is the LIC.

(i) In one example, SSD and mean-removal SSD (MR-SSD) might be selectively utilized according to the LIC flag of the current block.

a) In one example, the template matching cost measure may be SSD if the LIC flag of the current block is false.

b) In one example, the template matching cost measure may be MR-SSD if the LIC flag of the current block is true.

(ii) In one example, if MR-SAD/MR-SATD/MR-SSD is used for the template matching cost measure, the linear function used in LIC process may be not used when deriving the reference template.

(iii) In one example, if MR-SAD/MR-SATD/MR-SSD is used for the bilateral matching cost measure, the linear function used in LIC process may be not used when deriving the reference block.

b) In one example, it may depend on block dimension, temporal layer, low delay check flag, etc. al.

c) In one example, it may depend on whether the motion information of current and neighboring block is similar/identical.

d) In one example, it may depend on reference picture list and/or reference picture information.

i. In one example, for list X, a first error function (e.g., SAD/SSE) may be used, and for list Y (Y=1−X), a second error function (e.g., MR-SAD/MR-SSE) may be used.

ii. Alternatively, furthermore, the final cost may be based on the costs of each reference picture list.

5. The above methods may be applied to any coding data refinement process, e.g., for a template-based-coded block, for a bilateral-based-coded block (e.g., DMVR in VVC).

2.16. Samples Utilized in Coding Data Refinement for Image/Video Coding

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

In the disclosure, the phrase "motion candidate" may represent a merge motion candidate in a regular/extended merge list indicated by a merge candidate index, or an AMVP motion candidate in regular/extended AMVP list indicated by an AMVP candidate index, or one AMVP motion candidate, or one merge motion candidate.

In the disclosure, a motion candidate is called to be "refined" if the motion information of the candidate is modified according to information signaled from the encoder or derived at the decoder. For example, a motion vector may be refined by DMVR, FRUC, TM merge, TM AMVP, TM GPM, TM CIIP, TM affine, MMVD, GMVD, affine MMVD, BDOF and so on.

In the disclosure, the phrase "coding data refinement" may represent a refinement process in order to derive or refine the signalled/decoded/derived prediction modes, prediction directions, or signalled/decoded/derived motion information, prediction and/or reconstruction samples for a block. In one example, the refinement process may include motion candidate reordering.

In the following discussion, a "template-based-coded" block may refer to a block using a template matching based method in the coding/decoding process to derive or refine coded information, such as template-matching based motion derivation, template-matching based motion list reconstruction, LIC, sign prediction, template-matching based block vector (e.g., used in IBC mode) derivation, DIMD, template-matching based non-inter (e.g., intra) prediction, etc. The template-based-coded method may be combined with any other coding tools, such as MMVD, CIIP, GPM, FRUC, Affine, BDOF, DMVR, OBMC, etc. In yet another example, the "template-based-coded" block may also refer to a block which derives or refines its decoded information based on certain rules using neighboring reconstructed samples (adjacent or non-adjacent), e.g., the DIMD method in 2.27 and the TIMD method 2.29).

In the following discussion, a "bilateral-based-coded" block may refer to a block using a bilateral matching based method in the coding/decoding process to derive or refine coded information, such as bilateral-matching based motion derivation, bilateral-matching based motion list reconstruction, and etc. The bilateral-based-coded method may be combined with any other coding tools, such as MMVD, CIIP, GPM, FRUC, Affine, DMVR, and etc.

W and H are the width and height of current block (e.g., luma block). W*H is the size of current block (e.g., luma block)

1. The error/cost evaluation in the coding data refinement process may depend on both reference samples corresponding to current block (e.g., the reference blocks used in bilateral matching) and reference samples corresponding to a template of current block.

a) Alternatively, it may depend on both reference samples corresponding to current block and samples in a template of current block.

b) In one example, the template may be neighboring samples (adjacent or non-adjacent) of current block.

2. Multiple refinement processes may be applied to one block with different templates applied to at least two refinement processes.

a) In one example, a first refinement process may be invoked with a first template. Based on the output of the first refinement process, a second template is further utilized in the second refinement process.

b) In one example, the first template may contain more samples compared to the second template.

c) In one example, the first and second template may contain at least one different sample.

d) In one example, the first and second refinement process may use different cost/error functions.

3. Whether to use multiple refinement process, and/or how to select one or multiple error function and/or how to define the cost function and/or which samples to be involved in the error function may depend on the decoded information of a current block and/or neighboring (adjacent or non-adjacent) blocks.

a) In one example, how to select one or multiple error function and/or how to define the cost function may depend on the coding tool applied to current block and/or neighboring blocks.

i. In one example, the coding tool is the LIC.

(i) In one example, SSD and mean-removal SSD (MR-SSD) might be selectively utilized according to the LIC flag of the current block.

a) In one example, the template matching cost measure may be SSD if the LIC flag of the current block is false.

b) In one example, the template matching cost measure may be MR-SSD if the LIC flag of the current block is true.

(ii) In one example, if MR-SAD/MR-SATD/MR-SSD is used for the template matching cost measure, the linear function used in LIC process may be not used when deriving the reference template.

(iii) In one example, if MR-SAD/MR-SATD/MR-SSD is used for the bilateral matching cost measure, the linear function used in LIC process may be not used when deriving the reference block.

b) In one example, it may depend on block dimension (e.g., W, H), temporal layer, low delay check flag, etc. al.

c) In one example, it may depend on whether the motion information of current and neighboring block is similar/identical.

d) In one example, it may depend on reference picture list and/or reference picture information.

i. In one example, for list X, a first error function (e.g., SAD/SSE) may be used, and for list Y (Y=1−X), a second error function (e.g., MR-SAD/MR-SSE) may be used.

ii. Alternatively, furthermore, the final cost may be based on the costs of each reference picture list.

4. In one example, LIC may be enabled for reference list X and disabled for reference list Y.

a) In one example, the final prediction of current block may be weighted average of LIC prediction from reference List X and regular prediction from reference List Y.

5. The above methods may be applied to any coding data refinement process, e.g., for a template-based-coded block, for a bilateral-based-coded block (e.g., DMVR in VVC).

2.17. Adaptive Motion Candidate List

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, TM coded blocks, or IBC coded blocks; or other motion candidate list construction process (e.g., normal AMVP list; affine AMVP list; IBC AMVP list; HMVP table).

The cost function excepting the template matching cost is also applicable for motion candidate reordering.

W and H are the width and height of current block (e.g., luma block).

1. The template/bilateral matching cost C may be calculated to be f(C) before it is used to be compared with another template matching cost.

a. In one example, f(C)=w*C, wherein w is denoted as a cost factor.

b. In one example, f(C)=w*C+u.

c. In one example, f(C)=Shift((w*C), s).

d. In one example, w and/or u and/or s are integers.

e. In one example, a first template matching cost for a first motion candidate may be multiplied by a cost factor before it is compared with a second template matching cost for a second motion candidate.

f. In one example, it is proposed the cost factor for a motion candidate may depend on the position of the candidate before reordering.

i. In one example, the motion candidate at the i-th position may be assigned with a smaller cost factor than the cost factor of the motion candidate at the j-th position, wherein j>i, e.g. j=i+1.

(i) In one example, the cost factor of the motion candidate at the i-th position is 4 and the cost factor of the motion candidate at the j-th position is 5.

(ii) In one example, the cost factor of the motion candidate at the i-th position is 1 and the cost factor of the motion candidate at the j-th position is 5.

ii. In one example, the motion candidate at the i-th position may be assigned with a larger cost factor than the cost factor of the motion candidate at the j-th position, wherein j>i, e.g. j=i+1.

iii. In one example, the motion candidates in the p-th group (e.g. including M motion candidates) may be assigned with a smaller cost factor than the cost factor of the motion candidates in the q-th group (e.g. including N motion candidates), wherein q>p, e.g. q=p+1.

(i) Alternatively, the motion candidates in the p-th group (e.g. including M motion candidates) may be assigned with a larger cost factor than the cost factor of the motion candidates in the q-th group (e.g. including N motion candidates), wherein q>p, e.g. q=p+1.

(ii) In one example, M may be equal to N. For example, M=N=2.

(iii) In one example, M may be not equal to N. For example, M=2, N=3.

(iv) In one example, the cost factor of the motion candidates at the p-th group is 4 and the cost factor of the motion candidates at the q-th group is 5.

(v) In one example, the cost factor of the motion candidates at the p-th group is 1 and the cost factor of the motion candidates at the q-th group is 5.

iv. In one example, the cost factor may be not applied to subblock motion candidates.

v. In one example, the cost factor may be not applied to affine motion candidates.

vi. In one example, the cost factor may be not applied to SbTMVP motion candidates.

g. In one example, the cost factor of the motion candidates in one group/position may be adaptive.

i. In one example, the cost factor of the motion candidates in one group/position may be dependent on the coding mode of neighbor coded blocks.

(i) In one example, the cost factor of SbTMVP merge candidate may be dependent on the number of neighbor affine coded blocks.

(ii) In one example, the neighbor coded blocks may include at least one of the five spatial neighbor blocks (shown in FIG. 4) and/or the temporal neighbor block(s) (shown in FIG. 7).

(iii) In one example, the cost factor of SbTMVP merge candidate may be 0.2 when the number of spatial neighbor affine coded blocks (shown in FIG.

4) is 0; the cost factor of SbTMVP merge candidate may be 0.5 when the number of spatial neighbor affine coded blocks (shown in FIG. 4) is 1; the cost factor of SbTMVP merge candidate may be 0.8 when the number of spatial neighbor affine coded blocks (shown in FIG. 4) is 2; otherwise, the cost factor of SbTMVP merge candidate may be 1 (which means keeping unchanged).

(iv) In one example, the cost factor of SbTMVP merge candidate may be 0.2 when the number of spatial neighbor affine coded blocks (shown in FIG. 4) is 0; the cost factor of SbTMVP merge candidate may be 0.5 when the number of spatial neighbor affine coded blocks (shown in FIG. 4) is 1; the cost factor of SbTMVP merge candidate may be 0.8 when the number of spatial neighbor affine coded blocks (shown in FIG. 4) is larger than or equal to 2.

(v) In one example, the cost factor of SbTMVP merge candidate may be 2 when the number of spatial neighbor affine coded blocks (shown in FIG. 4) is 0; the cost factor of SbTMVP merge candidate may be 5 when the number of spatial neighbor affine coded blocks (shown in FIG. 4) is 1; the cost factor of SbTMVP merge candidate may be 8 when the number of spatial neighbor affine coded blocks (shown in FIG. 4) is 2; otherwise, the cost factor of SbTMVP merge candidate may be 10 (wherein the cost factor of affine merge candidates is 10).

(vi) In one example, the cost factor of SbTMVP merge candidate may be 2 when the number of spatial neighbor affine coded blocks (shown in FIG. 4) is 0; the cost factor of SbTMVP merge candidate may be 5 when the number of spatial neighbor affine coded blocks (shown in FIG. 4) is 1; the cost factor of SbTMVP merge candidate may be 8 when the number of spatial neighbor affine coded blocks (shown in FIG. 4) is larger than or equal to 2 (wherein the cost factor of affine merge candidates is 10).

2. The subgroup size may be different for different coding modes.
   a. The coding modes may include regular/subblock/TM merge modes.
      i. The subgroup size may be K1 (e.g., K1=5) for regular merge mode.
      ii. The subgroup size may be K2 (e.g., K2=3) for subblock merge mode.
      iii. The subgroup size may be K3 (e.g., K3=3) for TM merge mode.
   b. The subgroup size may be larger than or equal to the maximum number of subblock merge candidates defined in sps/picture/slice header (which means reordering whole list together) for subblock merge mode.
   c. The subgroup size may be larger than or equal to the maximum number of TM merge candidates defined in sps/picture/slice header (which means reordering whole list together) for TM merge mode.
   d. The subgroup size for a coding mode may be dependent on the maximum number of motion candidates in the coding mode.
   e. The subgroup size for subblock merge mode may be adaptive dependent on the number of neighbor affine coded blocks.
      i. In one example, the neighbor coded blocks may include at least one of the five spatial neighbor blocks (shown in FIG. 4) and/or the temporal neighbor block(s) (shown in FIG. 7).
      ii. In one example, the subgroup size for subblock merge mode may be 3 when the number of spatial neighbor affine coded blocks (shown in FIG. 4) is 0 or 1; the subgroup size for subblock merge mode may be 5 when the number of spatial neighbor affine coded blocks (shown in FIG. 4) is larger than 1;
3. The template size may be different for different coding modes.
   a. The coding modes may include regular/subblock/TM merge modes.
      i. The template size may be K1 (e.g., K1=1) for regular merge mode.
      ii. The template size may be K2 (e.g., K2=1, 2, or 4) for subblock merge mode.
      iii. The template size may be K3 (e.g., K3=1) for TM merge mode.
4. Whether to and/or how to reorder the motion candidates may depend on the coding modes of neighbor coded blocks.
   a. In one example, the neighbor coded blocks may include at least one of the five spatial neighbor blocks (shown in FIG. 4) and/or the temporal neighbor block(s) (shown in FIG. 7).
   b. The regular merge candidates may be reordered when the number of spatial neighbor coded blocks with regular merge mode (shown in FIG. 4) is larger than or equal to K (e.g., K=1).
   c. The subblock merge candidates may be reordered when the number of spatial neighbor coded blocks with subblock merge mode (shown in FIG. 4) is larger than or equal to K (e.g., K=1).
   d. The affine merge candidates may be reordered when the number of spatial neighbor coded blocks with affine merge mode (shown in FIG. 4) is larger than or equal to K (e.g., K=1).
   e. The SbTMVP merge candidates may be reordered when the number of spatial neighbor coded blocks with affine merge mode (shown in FIG. 4) is larger than or equal to K (e.g., K=1, 2, or 3).
   f. The TM merge candidates may be reordered when the number of spatial neighbor coded blocks with TM merge mode (shown in FIG. 4) is larger than or equal to K (e.g., K=1).
5. The HMVP motion candidates in the HMVP table may be reordered based on template/bilateral matching etc. al.
   a. In one example, a HMVP motion candidate is assigned with a cost, the HMVP candidates are adaptively reordered in a descending order of costs of HMVP candidates.
      i. In one example, the cost of a HMVP candidate may be a template matching cost.
   b. In one example, HMVP motion candidates may be reordered before coding a block.
      i. In one example, HMVP motion candidates may be reordered before coding an inter-coded block.
   c. In one example, HMVP motion candidates may be reordered in different ways depending on coding information of the current block and/or neighbouring blocks.

General Claims

6. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.
7. Whether to and/or how to apply the disclosed methods above may be signalled at PB/TB/CB/PU/TU/CU/VPDU/CTU/CTU row/slice/tile/sub-picture/other kinds of region contains more than one sample or pixel.
8. Whether to and/or how to apply the disclosed methods above may be dependent on coded information, such as coding mode, block size, colour format, single/dual tree partitioning, colour component, slice/picture type.

2.18. Adaptive GPM Candidate List

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

It is noted that the terminologies mentioned below are not limited to the specific ones defined in existing standards. Any variance of the coding tool is also applicable. For example, the term "GPM" is used to represent any coding tool that derive two or more sets of motion information and use the derived motion information and the splitting pattern/weighting masks to get the final prediction, e.g., TPM is also treated as GPM.

Note that the proposed methods may be applied to merge candidate list construction process for inter coded blocks (e.g., translational motion), affine coded blocks, TM coded blocks, GPM coded blocks, or IBC coded blocks; or other motion candidate list construction process (e.g., normal AMVP list; affine AMVP list; IBC AMVP list; HMVP table).

The cost function excepting the template matching cost is also applicable for motion candidate reordering.

Hereinafter, template is a set of reconstructed/prediction samples adjacently or non-adjacently neighboring to the current block. Reference samples of a template (i.e. reference template) are mapping of the template in a reference picture depend on a motion information of the current block. "above template" indicates a template constructed from a set of reconstructed/prediction samples above adjacently or non-adjacently neighboring to the current block and its reference template. "left template" indicates a template constructed from a set of reconstructed/prediction samples left adjacently or non-adjacently neighboring to the current block and its reference template. "above and left template" includes both above template and left template.

In the following, in one example, a GPM candidate list where GPM candidates are directly derived from regular merge list (before or without template matching based motion refinement) is called OGPMList; a refined GPM candidate list where GPM candidates are refined by a first refining method such as template matching using the above template is called AGPMList; a refined GPM candidate list where GPM candidates are refined by a second refining method such as template matching using the left template is called LGPMList; a refined GPM candidate list where GPM candidates are refined by a third refining method such as template matching using the left and above template is called LAGPMList.

W and H are the width and height of current block (e.g., luma block).

1. It is proposed that for a GPM coded block, the coded candidate index may be corresponding to a candidate with a different candidate index in the candidate list for GPM coded blocks.
    a. Alternatively, furthermore, the candidate list constructed for the GPM coded block may be reordered before being used and the coded index is corresponding to the reordered candidate list.
    b. Alternatively, furthermore, for a first type of GPM coded block, the candidate list may be reordered, and for a second type of GPM coded block, the candidate list may not be reordered.
        i. In one example, the first type is template-based GPM coded block.
        ii. In one example, the second type is the MMVD-based GPM coded block (e.g., GMVD)
    c. Alternatively, furthermore, for a first type of GPM coded block, the candidate list may be reordered with a first rule, and for a second type of GPM coded block, the candidate list may be reordered with a second rule.
    d. The reordering method for a GPM coded block may be the same as that for a non-GPM coded block.
        i. The reordering method for a GPM coded block may be different from that for a non-GPM coded block.
2. It is proposed that for a GPM coded block, the coded candidate index may be corresponding to a candidate from a refined candidate list for GPM coded blocks.
    a. Alternatively, furthermore, the candidate list constructed for the GPM coded block may be refined firstly before being used and the coded index is corresponding to the refined candidate list.
    b. Alternatively, furthermore, for a first type of GPM coded block, the candidate list may be refined, and for a second type of GPM coded block, the candidate list may not be refined.
        i. In one example, the first type is template-based GPM coded block.
        ii. In one example, the second type is the MMVD-based GPM coded block (e.g., GMVD)
    c. Alternatively, furthermore, for a first type of GPM coded block, the candidate list may be refined with a first rule, and for a second type of GPM coded block, the candidate list may be refined with a second rule.
    d. The refined method for a GPM coded block may be the same as that for a non-GPM coded block
        i. The refined method for a GPM coded block may be different from that for a non-GPM coded block
3. In one example, the GPM candidates may be divided into subgroups. Whether to and/or how to reorder the GPM candidates may depend on the subgroup of the GPM candidates.
    a. In one example, only the first subgroup can be reordered.
    b. In one example, the last subgroup can not be reordered.
    c. In one example, the last subgroup can not be reordered. But if the last subgroup also is the first subgroup, it can be reordered.
    d. Different subgroups may be reordered separately.
    e. Two candidates in different subgroups cannot be compared and/or reordered.

f. A first candidate in a first subgroup must be put ahead of a second candidate in a second subgroup after reordering if the first subgroup is ahead of a second subgroup.

4. In one example, the GPM candidates which are not included in the reordering process may be treated in specified way.
   a. In one example, for the candidates not to be reordered, they will be arranged in the merge candidate list according to the initial order.
   b. In one example, candidates not to be reordered may be put behind the candidates to be reordered.
   c. In one example, candidates not to be reordered may be put before the candidates to be reordered.
5. A GPM candidate list to be reordered may refer to
   Case 1: a first candidate list which is prepared for the two GPM partitions and is used to derive the individual GPM candidate lists for each GPM partitions.
   Case 2: a second GPM candidate list which is used for each GPM partition. Usually the second GPM candidate is derived from the first candidate list.
   a. In one example, in case 1, the reordering method may be the same to that used for a regular merge candidate list.
   b. In one example, in case 1, the template matching approach in the reordering method may be conducted in a bi-prediction way if the corresponding candidate is bi-predicted.
   c. In one example, in case 2, the template matching approach in the reordering method cannot be conducted in a bi-prediction way.
   d. In one example, in case 2, the reordering method may be the same for all GPM partitions.
   e. In one example, in case 2, the reordering method may be different for different GPM partitions.
6. In above examples, the GPM coded block may be a GPM coded block with merge mode, a GPM coded block with AMVP mode.
   a. Alternatively, furthermore, the merge candidate mentioned above may be replaced by an AMVP candidate General Claims 7. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.
8. Whether to and/or how to apply the disclosed methods above may be signalled at PB/TB/CB/PU/TU/CU/VPDU/CTU/CTU row/slice/tile/sub-picture/other kinds of region contains more than one sample or pixel.
9. Whether to and/or how to apply the disclosed methods above may be dependent on coded information, such as coding mode, block size, colour format, single/dual tree partitioning, colour component, slice/picture type.

2.19. Adaptive GPM Candidate List

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

It is noted that the terminologies mentioned below are not limited to the specific ones defined in existing standards. Any variance of the coding tool is also applicable. For example, the term "GPM" is used to represent any coding tool that derive two or more sets of motion information and use the derived motion information and the splitting pattern/weighting masks to get the final prediction, e.g., TPM is also treated as GPM.

Note that the proposed methods may be applied to merge candidate list construction process for inter coded blocks (e.g., translational motion), affine coded blocks, TM coded blocks, GPM coded blocks, or IBC coded blocks; or other motion candidate list construction process (e.g., normal AMVP list; affine AMVP list; IBC AMVP list; HMVP table).

The cost function excepting the template matching cost is also applicable for motion candidate reordering.

Hereinafter, template is a set of reconstructed/prediction samples adjacently or non-adjacently neighboring to the current block. Reference samples of a template (i.e. reference template) are mapping of the template in a reference picture depend on a motion information of the current block. "above template" indicates a template constructed from a set of reconstructed/prediction samples above adjacently or non-adjacently neighboring to the current block and its reference template. "left template" indicates a template constructed from a set of reconstructed/prediction samples left adjacently or non-adjacently neighboring to the current block and its reference template. "above and left template" includes both above template and left template.

In the following, in one example, a GPM candidate list where GPM candidates are directly derived from regular merge list (before or without template matching based motion refinement) is called OGPMList; a refined GPM candidate list where GPM candidates are refined by a first refining method such as template matching using the above template is called AGPMList; a refined GPM candidate list where GPM candidates are refined by a second refining method such as template matching using the left template is called LGPMList; a refined GPM candidate list where GPM candidates are refined by a third refining method such as template matching using the left and above template is called LAGPMList;

Regarding the type of GPM candidates in the original GPM candidate list, the GPM candidates derived in the first step of GPM candidate list construction process in section 2.29 are called GPM-parity-based candidates; The GPM candidates derived in the second step of GPM candidate list construction process in section 2.29 are called GPM-anti-parity-based candidates; The GPM candidates derived in the third step of GPM candidate list construction process in section 2.29 are called GPM-filled candidates.

W and H are the width and height of current block (e.g., luma block).

1. In one example, if the coding mode is GPM, the merge candidates may be reordered.
   a. In one example, the merge candidates in the OGPMList may be reordered.
      i. In one example, at least two merge candidates in OGPMList may be reordered.
      ii. In one example, at least one type of template may be used for OGPMList reordering.
      iii. Alternatively, the merge candidates in the OGPMList may NOT be reordered.
      iv. In one example, a first type of template may only comprise neighboring samples left to the current block.
      v. In one example, a second type of template may only comprise neighboring samples above to the current block.
      vi. In one example, a third type of template may comprise neighboring samples left and above to the current block.

vii. The reordering process may be invoked after the parsing process but before the MV reconstruction process.

b. In one example, the merge candidates in the AGPMList may be reordered.
   i. In one example, at least two merge candidates in AGPMList may be reordered.
   ii. In one example, at least one type of template may be used for AGPMList reordering.
   iii. In one example, a first type of template may only comprise neighboring samples above to the current block.
   iv. In one example, a second type of template may comprise neighboring samples left and above to the current block.

c. In one example, the merge candidates in the LGPMList may be reordered.
   i. In one example, at least two merge candidates in LGPMList may be reordered.
   ii. In one example, at least one type of template may be used for LGPMList reordering.
   iii. In one example, a first type of template may only comprise neighboring samples left to the current block.
   iv. In one example, a second type of template may comprise neighboring samples left and above to the current block.

d. In one example, the merge candidates in the LAGPMList may be reordered.
   i. In one example, at least two merge candidates in LAGPMList may be reordered.
   ii. In one example, at least one type of template may be used for LAGPMList reordering.
   iii. In one example, a first type of the template may only comprise neighboring samples left to the current block.
   iv. In one example, a second type of the template may only comprise neighboring samples above to the current block.
   v. In one example, a third type of the template may comprise neighboring samples left and above to the current block.

e. In one example, whether to and/or how to reorder merge candidates in a GPM list may be dependent on the coding information.
   i. In one example, whether to reorder merge candidates in a GPM list may be dependent on whether a template matching based motion refinement is applied to a GPM partition or two GPM partitions (i.e. a GPM coded CU).
      (i) For example, if the motion of a GPM partition or two GPM partitions (i.e. a GPM coded CU) is NOT refined based on template matching (e.g., the template matching flag is equal to false), the corresponding GPM list may NOT be reordered.
         a) For example, if a GPM partition is coded using a merge candidate in OGPMList (e.g., no motion refinement is applied), then merge candidates in OGPMList may NOT be reordered.
      (ii) For example, if the motion of a GPM partition or two GPM partitions (i.e. a GPM coded CU) is refined based on template matching (e.g., the template matching flag is equal to true), the corresponding GPM list may be reordered.
         a) For example, if a GPM partition is coded using a merge candidate in AGPMList (e.g., template matching motion refinement method using above template is applied), then merge candidates in AGPMList may be reordered.
         b) For example, if a GPM partition is coded using a merge candidate in LGPMList (e.g., template matching motion refinement method using left template is applied), then merge candidates in LGPMList may be reordered.
         c) For example, if a GPM partition is coded using a merge candidate in LAGPMList (e.g., template matching motion refinement method using left and above template is applied), then merge candidates in LAGPMList may be reordered.
   ii. In one example, how to reorder merge candidates in a GPM list may be dependent on the GPM partition information (e.g., partition mode, partition angle, partition distance, etc.).
      (i) For example, above template may be used for the merge candidates reordering in case that the current GPM partition is split by a first partition angle (or partition mode, or partition distance, etc.).
      (ii) For example, left template may be used for the merge candidates reordering in case that the current GPM partition is split by a second partition angle (or partition mode, or partition distance, etc.).
      (iii) For example, left and above template may be used for the merge candidates reordering in case that the current GPM partition is split by a third partition angle (or partition mode, or partition distance, etc.).
      (iv) For example, a type of template may be specified corresponding to the first/second/third partition angle (or partition mode, or partition distance, etc.).
      (v) For example, at least one look-up table (i.e., mapping table) is used to map what specified partition angles (or partition modes, or partition distances, etc.) corresponding to what type of template (e.g., above template, left template, or above and left template.)

f. In one example, the merge candidates in the OGPMList may be not reordered and the merge candidates in the AGPMList and/or LGPMList and/or LAGPMList may be reordered.

2. The merge candidates can be adaptively rearranged in the final GPM candidate list according to one or some criterions.
   a. In one example, the GPM candidate list may be
      i. OGPMList
      ii. AGPMList
      iii. LGPMLIst
      iv. LAGPMList
   b. The GPM candidates may be divided into several subgroups.
      i. For example, the number of GPM candidates (such as X=3 or 5 or any other integer values) in a subgroup may be pre-defined.
   c. In one example, partial or full process of current GPM candidate list construction process is firstly invoked, followed by the reordering of candidates in the GPM list.
      i. Alternatively, candidates in a first subgroup may be reordered and they should be added before those candidates in a second subgroup wherein the first subgroup is added before the second subgroup.

ii. The construction process may include a pruning method.

d. In one example, the merge candidates may be adaptively rearranged before retrieving the merge candidates.

i. In one example, the procedure of arranging merge candidates adaptively may be processed before obtaining the merge candidate to be used in the motion compensation process.

e. The criterion may be based on template matching cost.

i. In one example, the cost function between current template and reference template may be (i) SAD/MR-SAD (ii) SATD/MR-SATD (iii) SSD/MR-SSD (iv) SSE/MR-SSE (v) Weighted SAD/weighted MR-SAD (vi) Weighted SATD/weighted MR-SATD (vii) Weighted SSD/weighted MR-SSD (viii) Weighted SSE/weighted MR-SSE (ix) Gradient information 3. When deriving the two motions for two geometric partitions, the process may be a. In one example, if TM is not applied to one partition, the motion can be derived according to the signalled merge index from the OGPMList/reordered OGPM-List.

b. In one example, if TM is applied to one partition, the motion can be derived according to the signalled merge index from the AGPMList/reordered AGPM-List or LGPMList/reordered LGPMLIst or LAGPM-List/reordered LAGPMLIst dependent on partition angle and partition index.

i. In one example, if partition angle is X (e.g., 0), for the first partition, AGPMList/reordered AGPM-List will be used; for the second partition, LAGPMList/reordered LAGPMLIst will be used.

c. In one example, if TM is applied to one partition, the motion can be derived according to the signalled merge index from the AGPMList/reordered AGPM-List.

d. In one example, if TM is applied to one partition, the motion can be derived according to the signalled merge index from the LGPMList/reordered LGPM-LIst.

e. In one example, if TM is applied to one partition, the motion can be derived according to the signalled merge index from the LAGPMList/reordered LAGPMLIst 4. Whether to and/or how to reorder the GPM candidates may depend on the category of the GPM candidates.

a. In one example, only GPM-parity-based candidates can be reordered.

b. In one example, only GPM-parity-based and GPM-anti-parity-based candidates can be reordered.

c. In one example, the GPM-filled candidates may not be reordered.

d. In one example, two candidates in different GPM lists cannot be compared and/or reordered.

e. In one example, only the first N GPM candidates can be reordered.

i. In one example, N is set equal to 5.

5. In above examples, the GPM coded block may be a GPM coded block with merge mode, a GPM coded block with AMVP mode.

a. Alternatively, furthermore, the merge candidate mentioned above may be replaced by an AMVP candidate.

General Claims

6. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

7. Whether to and/or how to apply the disclosed methods above may be signalled at PB/TB/CB/PU/TU/CU/VPDU/CTU/CTU row/slice/tile/sub-picture/other kinds of region containing more than one samples or pixels.

8. Whether to and/or how to apply the disclosed methods above may be dependent on coded information, such as coding mode, block size, GPM partition information, colour format, single/dual tree partitioning, colour component, slice/picture type.

2.20. Hash Based Motion Estimation for Screen Content Coding

The VTM reference software uses hash-based motion estimation to handle the sometimes large and irregular motion in screen content. For each reference picture, hash tables corresponding to 4×4 to 64×64 block sizes are generated using a bottom-up approach as follows:

For each 2×2 block, the block hash value is calculated directly from the original sample values (luma samples are used if 4:2:0 chroma format and both luma and chroma sample values are used if 4:4:4 chroma format). The cyclic redundancy check (CRC) value is used as the hash value.

For 4×4, 8×8, 16×16, 32×32 and 64×64 blocks, the hash value of the current block is the CRC value calculated from the CRC values of its four subblocks.

To enable efficient search for matched blocks, the structure of inverted index is used, where hash values are used as to index into a table, and the table entries contain all the blocks with the same hash value as the corresponding table index. The blocks corresponding a given table index are stored as a linked list. Two CRC values, one 16-bit hash and the other 24-bit hash, are calculated for each block. The two hash values are calculated in a similar way but using different CRC truncated polynomials.

The first 16-bit CRC value is used as the inverted index. The second 24-bit hash value is stored together with the blocks to resolve hash conflicts in the case more than one matching blocks are found. To reduce the length of the hash table, the hash values of all "simple" blocks (defined as a block with only one sample value in each row or column) are excluded from the hash table.

Figure 27:
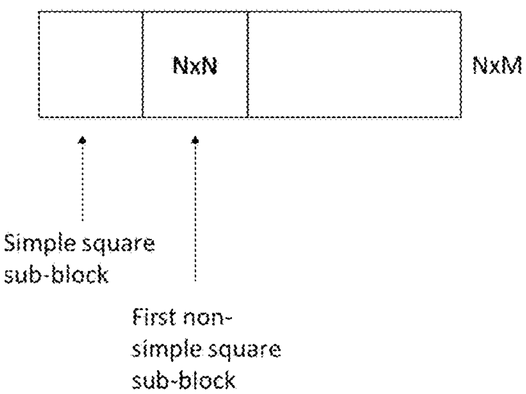
FIG. 27 shows motion estimation for rectangular block with hash values for square subblocks.

In motion estimation, if the current block is a square block (except for 128×128 blocks), its hash values are calculated. Then, the encoder queries the corresponding hash table. If hash match is found, the matched block is used as the reference. If the current block is a rectangle block of size N×M (and without loss of generality assume M>N), it will be divided into several non-overlapping square subblocks of size N×N. An example is shown in FIG. 27. The encoder will find the first non-simple square subblock and calculate its hash values. Encoder queries the hash values of this N×N square subblock on the hash table corresponding to N×N block size. The one or more matched reference blocks are considered reference block candidates. For each matched reference block candidate, encoder will continue to check whether the hash values of the remaining square subblocks (namely the white region that follows the first non-simple square subblock depicted in FIG. 27) are equal to those of the square subblocks adjacent to that reference block candidate. If the hash values of all square subblocks are matched, the reference block candidate will be regarded as a valid reference block.

For inter coding, the hash-based motion search is performed before testing all coding modes. In addition, encoder will reuse the MVs of the hash mode as the starting point candidates in the normal motion estimation process. If the hash-based motion vector exists, which indicates that the block most likely contains screen content, fractional motion estimation is skipped.

To accelerate the encoder, coding modes other than the skip and merge part of ETM_MERGE_SKIP, ETM_AFFINE, and ETM_MERGE_GPM modes and finer-granularity block splitting are skipped if all of the following conditions are satisfied:

Current block size is 64×64, 128×64 or 64×128.

An identical reference block is found in a reference picture.

The QP of reference picture is not larger than that of current picture.

2.21. Luma Mapping with Chroma Scaling (LMCS)

Figure 28:
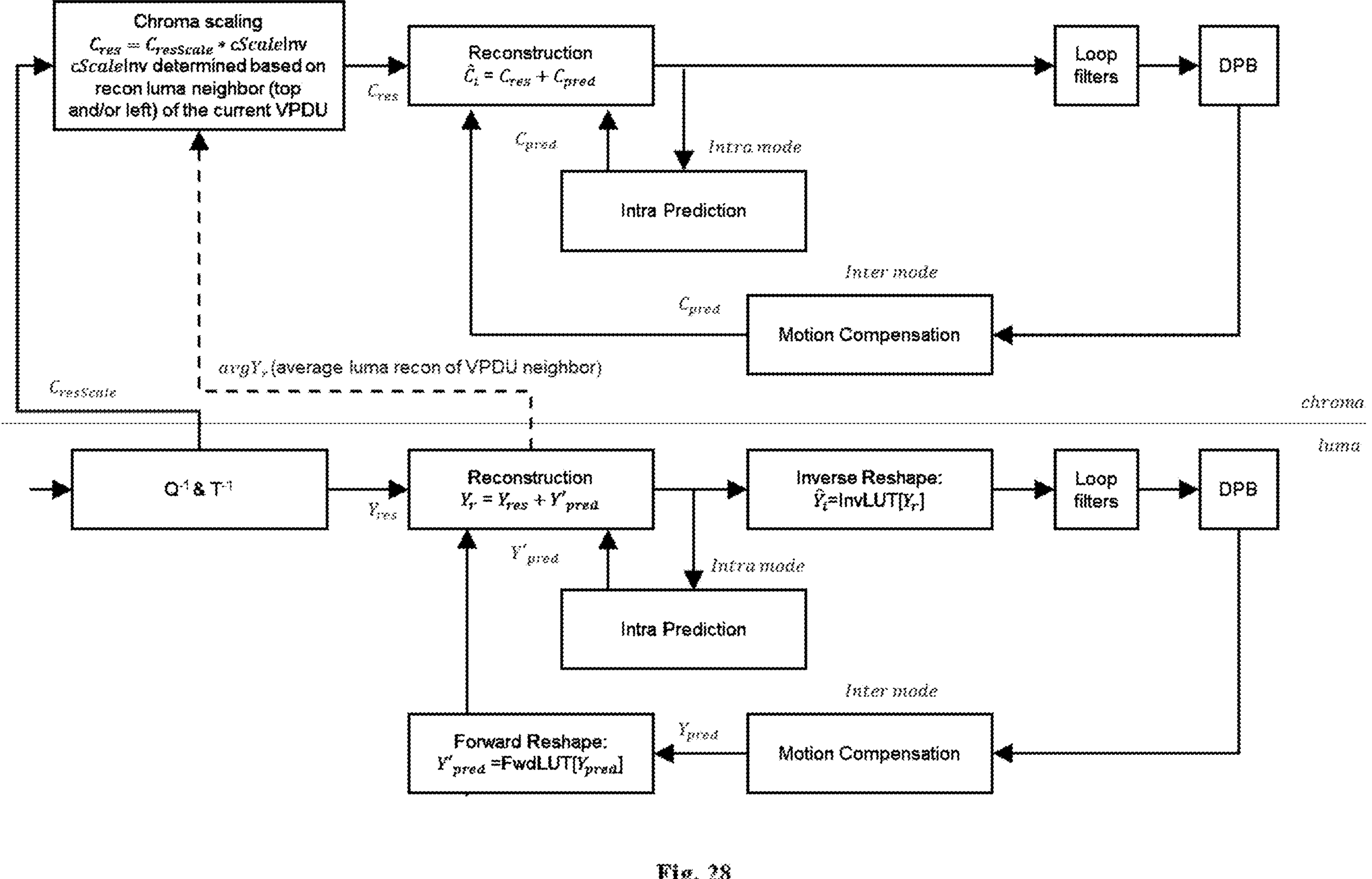
FIG. 28 shows a luma mapping with chroma scaling architecture.

In VVC, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 28 shows the LMCS architecture from decoder's perspective. The light-blue shaded blocks in FIG. 28 indicate where the processing is applied in the mapped domain; and these include the inverse quantization, inverse transform, luma intra prediction and adding of the luma prediction together with the luma residual. The unshaded blocks in FIG. 28 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 28 are the new LMCS functional blocks, including forward and inverse mapping of the luma signal and a luma-dependent chroma scaling process. Like most other tools in VVC, LMCS can be enabled/disabled at the sequence level using an SPS flag.

2.21.1 Luma Mapping with Piecewise Linear Model

The in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. The FwdMap function is signalled using a piecewise linear model with 16 equal pieces. InvMap function does not need to be signalled and is instead derived from the FwdMap function.

The luma mapping model is signalled in the adaptation parameter set (APS) syntax structure with aps_params_type set equal to 1 (LMCS_APS). Up to 4 LMCS APS's can be used in a coded video sequence. Only 1 LMCS APS can be used for a picture. The luma mapping model is signalled using piecewise linear model. The piecewise linear model partitions the input signal's dynamic range into 16 equal pieces, and for each piece, its linear mapping parameters are expressed using the number of codewords assigned to that piece. Take 10-bit input as an example. Each of the 16 pieces will have 64 codewords assigned to it by default. The signalled number of codewords is used to calculate the scaling factor and adjust the mapping function accordingly for that piece. At the slice level, an LMCS enable flag is signalled to indicate if the LMCS process as depicted in FIG. 28 is applied to the current slice. If LMCS is enabled for the current slice, an aps_id is signalled in the slice header to identify the APS that carries the luma mapping parameters.

Each i-th piece, i=0 . . . 15, of the FwdMap piecewise linear model is defined by two input pivot points InputPivot[ ] and two output (mapped) pivot points MappedPivot[ ].

The InputPivot[ ] and MappedPivot[ ] are computed as follows (assuming 10-bit video):

$$1)\ OrgCW = 64$$

$$2)\ \text{For } i = 0{:}16,\ InputPivot[i] = i * OrgCW$$

3) For i=0:16, MappedPivot[i] is calculated as follows:

$$MappedPivot[0] = 0;$$

$$\text{for } (i = 0;\ i < 16;\ i{+}{+})$$

$$MappedPivot[i+1] = MappedPivot[i] + SignalledCW[i]$$

where SignalledCW[i] is the signalled number of codewords for the i-th piece.

As shown in FIG. 28, for an inter-coded block, motion compensated prediction is performed in the mapped domain. In other words, after the motion-compensated prediction block $Y_{pred}$ is calculated based on the reference signals in the DPB, the FwdMap function is applied to map the luma prediction block in the original domain to the mapped domain, $Y'_{pred}$=FwdMap($Y_{pred}$). For an intra-coded block, the FwdMap function is not applied because intra prediction is performed in the mapped domain. After reconstructed block $Y_r$ is calculated, the InvMap function is applied to convert the reconstructed luma values in the mapped domain back to the reconstructed luma values in the original domain ($\hat{Y}_i$=InvMap($Y_r$). The InvMap function is applied to both intra- and inter-coded luma blocks.

The luma mapping process (forward and/or inverse mapping) can be implemented using either look-up-tables (LUT) or using on-the-fly computation. If LUT is used, then FwdMapLUT and InvMapLUT can be pre-calculated and pre-stored for use at the tile group level, and forward and inverse mapping can be simply implemented as FwdMap($Y_{pred}$)=FwdMapLUT[$Y_{pred}$] and InvMap($Y_r$)=InvMapLUT [$Y_r$], respectively. Alternatively, on-the-fly computation may be used. Take forward mapping function FwdMap as an example. In order to figure out the piece to which a luma sample belongs, the sample value is right shifted by 6 bits (which corresponds to 16 equal pieces). Then, the linear model parameters for that piece are retrieved and applied on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function is evaluated as follows:

$$FwdMap(Y_{pred}) = ((b2-b1)/(a2-a1))*(Y_{pred}-a1)+b1$$

The InvMap function can be computed on-the-fly in a similar manner. Generally, the pieces in the mapped domain are not equal sized, therefore the most straightforward inverse mapping process would require comparisons in order to figure out to which piece the current sample value belongs. Such comparisons increase decoder complexity. For this reason, VVC imposes a bitstream constraint on the values of the output pivot points MappedPivot[i] as follows. Assume the range of the mapped domain (for 10-bit video, this range is [0, 1023]) is divided into 32 equal pieces. If MappedPivot[i] is not a multiple of 32, then MappedPivot [i+1] and MappedPivot[i] cannot belong to the same piece of the 32 equal-sized pieces, i.e. MappedPivot[i+1]>>(BitDepth−5) shall not be equal to MappedPivot[i]>>(BitDepth−5). Thanks to such bitstream constraint, the InvMap function can also be carried out using a simple right bit-shift by 5 bits (which corresponds 32 equal-sized pieces) in order to figure out the piece to which the sample value belongs.

2.21.2 Luma-Dependent Chroma Residual Scaling

Chroma residual scaling is designed to compensate for the interaction between the luma signal and its corresponding chroma signals. Whether chroma residual scaling is enabled or not is also signalled at the slice level. If luma mapping is enabled, an additional flag is signalled to indicate if luma-dependent chroma residual scaling is enabled or not. When luma mapping is not used, luma-dependent chroma residual scaling is disabled. Further, luma-dependent chroma residual scaling is always disabled for the chroma blocks whose area is less than or equal to 4.

Chroma residual scaling depends on the average value of top and/or left reconstructed neighbouring luma samples of the current VPDU. If the current CU is inter 128×128, inter 128×64 and inter 64×128, then the chroma residual scaling factor derived for the CU associated with the first VPDU is used for all chroma transform blocks in that CU. Denote avgYr as the average of the reconstructed neighbouring luma samples (see FIG. 28). The value of $C_{ScaleInv}$ is computed in the following steps:

1) Find the index $Y_{Idx}$ of the piecewise linear model to which avgYr belongs based on the InvMap function.
2) $C_{ScaleInv}$=cScaleInv[$Y_{idx}$], where cScaleInv[ ] is a 16-piece LUT pre-computed based on the value of SignalledCW[i] and a offset value sginalled in APS for chroma residual scaling process.

Unlike luma mapping, which is performed on the sample basis, $C_{scaleInv}$ is a constant value for the entire chroma block. With $C_{ScaleIv}$, chroma residual scaling is applied as follows:

$$\text{Encoder side: } C_{ResScale} = C_{Res} * C_{Scale} = C_{Res}/C_{ScaleInv}$$

$$\text{Decoder side: } C_{Res} = C_{ResScale}/C_{Scale} = C_{ResScale} * C_{ScaleInv}$$

2.21.3 Encoder-Side LMCS Parameter Estimation

A non-normative reference implementation is provided in the VTM encoder to estimate the LMCS model parameters. Because VTM anchors handle SDR, HDR PQ and HDR HLG differently, the reference algorithm in VTM13 is designed differently for SDR, HDR PQ and HDR HLG sequences. For SDR and HDR HLG sequences, the encoder algorithm is based on local luma variance and optimized for PSNR metrics. For HDR PQ sequences, the encoder algorithm is based on luma values and optimized for wPSNR (weighted PSNR) metrics.

2.22. On Pairwise Merge Candidate

In this contribution, the pairwise candidate is removed from the regular merge candidate derivation. It is added, when it is not a duplicate, during the adaptive reordering of merge candidates with template matching (ARMC-TM) as depicted in FIG. 29. The pairwise is built with the two first reordered candidates. The number of reordered candidates is the same as in the ECM2.0 implementation as well as the number of the template matching costs computed.

The pairwise candidate is also restricted to use only the average candidate when the reference frames of the first and second reordered candidate are the same.

In addition, each merge candidate, in the non-reordered subgroup, is replaced by a pairwise between the first candidate and this candidate if the created pairwise is not a duplicate.

2.23. IBC Motion Candidates

The detailed embodiments below should be considered as examples to explain general concepts. These embodiments should not be interpreted in a narrow way. Furthermore, these embodiments can be combined in any manner.

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

For an IBC coded block, a block vector (BV) is used to indicate the displacement from the current block to a reference block, which is already reconstructed inside the current picture.

W and H are the width and height of current block (e.g., luma block).

The non-adjacent spatial candidates of current coding block are adjacent spatial candidates of a virtual block in the ith search round (as shown in FIG. 9). The width and height of the virtual block for the ith search round are calculated by: newWidth=i×2×gridX+W, newHeight=i×2×gridY+H. Obviously, the virtual block is the current block if the search round i is 0.

In the following, a BV predictor also is a BV candidate. The skip mode also is the merge mode.

The BV candidates can be divided into several groups according to some criterions. Each group is called a subgroup. For example, we can take adjacent spatial and temporal BV candidates as a first subgroup and take the remaining BV candidates as a second subgroup; In another example, we can also take the first N (N≥2) BV candidates as a first subgroup, take the following M (M≥2) BV candidates as a second subgroup, and take the remaining BV candidates as a third subgroup.

On Usage of a BV Candidate

1. A BV candidate (e.g. BV searching point or BV predictor) is disallowed to be used in the coding/decoding process of a block if it is invalid.
   a. In one example, only if a BV candidate is valid, it may be used in the coding/decoding process of a block.
      i. For example, only if a BV candidate is valid, it may be used for BV search or BV prediction.

b. In one example, whether to use a BV candidate in the coding/decoding process of a block may be dependent on a validation check of the BV candidate.

i. In one example, before inserting a new BV candidate into a BV candidate list, a validation check of the BV candidate needs to be performed.

c. Only if a BV candidate is valid, it may be inserted into an IBC candidate list.

i. In one example, the IBC candidate list may be the IBC merge candidate list.

ii. In one example, the IBC candidate list may be the IBC AMVP candidate list.

iii. In one example, the IBC candidate list may be the IBC template matching candidate list.

iv. In one example, the IBC candidate list may be the intra template matching candidate list.

v. In one example, the IBC candidate list may be the IBC MMVD candidate list.

vi. In one example, the IBC candidate list may be the IBC GPM candidate list.

vii. In one example, the IBC candidate list may be the IBC TPM candidate list.

viii. In one example, the IBC candidate list may be any list related to IBC coded blocks, i.e., the same procedure is applied.

(i) Alternatively, whether to allow an invalid BV candidate to be added to an IBC candidate list may be dependent on the decoded information (e.g., IBC mode).

d. Only if a BV candidate is valid, it may be used for hash-based search for IBC.

e. Only if a BV candidate is valid, it may be used for block matching based local search for IBC.

f. Only if a BV candidate is valid, it may be used for intra template matching.

g. Alternatively, furthermore, the above mentioned BV candidates may be those from specific neighboring blocks (e.g., adjacent or non-adjacent) or HMVP tables or some virtual candidates generated from these BV candidates.

h. Alternatively, furthermore, the above mentioned BV candidates may exclude some default candidates (e.g., the default zero vectors).

i. Alternatively, furthermore, when a BV candidate is marked as invalid, a virtual candidate derived from the invalid BV candidate may be used instead.

i. In one example, the virtual candidate may be derived by adding an offset to the invalid BV candidate.

ii. In one example, the virtual candidate may be derived by applying a clipping function to the invalid BV candidate.

On Validation Check of a BV Candidate

2. In one example, a BV candidate may be determined to be valid when it meets one of or a combination of at least one of the following conditions.

a. The corresponding reference block is already reconstructed inside the current picture.

b. The corresponding reference block is located in the same CTU row as current block.

c. The corresponding reference block is located in the same tile/subpicture as current block.

d. The corresponding reference block is located in the same slice as current block.

e. The BV candidate satisfies the block vector constraints (e.g. which is described in 2.4.2 and 2.4.3)

f. The BV candidate satisfies the IBC virtual buffer conditions (e.g. which is described in 2.4.4).

3. In one example, a BV candidate may be determined to be invalid when it violates one of or a combination of at least one of the conditions in bullet 2.

On BV Candidate List

4. A BV candidate may be derived/obtained from a non-adjacent block.

a. In one example, the distances between non-adjacent spatial candidates and current coding block may be based on the width and height of current coding block (e.g. FIG. 9 or FIG. 10, gridX=W, gridY=H).

i. Alternatively, the distances between non-adjacent spatial candidates and current coding block may be multiple of a constant value.

(i) For example, the multiplication factor is dependent on the search round index (e.g. the multiplication factor is i for the ith search round) and gridX=M, gridY=N (M and N are constant values).

b. In one example, the non-adjacent spatial candidates may be inserted after the TMVP candidate.

i. Alternatively, the non-adjacent spatial candidates may be inserted after the adjacent spatial candidates and before TMVP candidate.

5. A BV candidate may come from a spatial neighboring block, a temporal neighboring block, HMVP, pairwise, and/or STMVP candidates.

a. In one example, the spatial candidates may consist of adjacent and/or non-adjacent spatial candidates.

i. In one example, the adjacent spatial candidates may consist of left and/or above and/or above-right and/or bottom-left and/or above-left spatial candidates (an example is shown in FIG. 30*a*)).

b. In one example, for the TMVP candidate, the position for the temporal candidate is selected between candidates C0 and C1, as depicted in FIG. 30*b*. If CU at position C0 is not available, is intra coded, is outside of the current row of CTUs or its BV is invalid for current block, position C1 is used. Otherwise, position C0 is used in the derivation of the TMVP candidate.

i. Alternatively, for the TMVP candidate, both candidates C0 and C1, as depicted in FIG. 30*b*, can be used.

(i) For example, the order is C0→C1.

(ii) Alternatively, the order is C1→C0.

c. In one example, for the pairwise candidate, pairwise average candidates are generated by averaging predefined pairs of candidates in the existing BV candidate list, and the predefined pairs are defined as {(0, 1), (0, 2), (1, 2), (0, 3), (1, 3), (2, 3)}, where the numbers denote the BV candidate indices to the BV candidate list.

i. In one example, the number of pairwise candidates is P. P is an integer from 0 to 6.

ii. In one example, the pairwise candidates may be inserted after HMVP.

d. In one example, for the STMVP candidate, it is generated by averaging predefined E spatial BV candidates and predefined G temporal BV candidates.

i. In one example, E is less than or equal to the number of spatial candidates (F) inserted into the current BV candidate list before STMVP.

ii. In one example, the predefined E spatial BV candidates may be the first E spatial BV candidates among the F spatial candidates inserted into the current BV candidate list before STMVP.

(i) Alternatively, the predefined E spatial BV candidates may be the selected E spatial BV candidates among the F spatial candidates inserted into the current BV candidate list before STMVP.

iii. In one example, E is 2, G is 1.

iv. In one example, STMVP may be inserted before the above-left spatial BV candidate.

v. In one example, STMVP may be inserted after the pairwise candidate.

e. In one example, the BV candidate inserting order is adjacent spatial→HMVP→pairwise.

f. In one example, the BV candidate inserting order is adjacent spatial→temporal→HMVP→pairwise.

g. In one example, the BV candidate inserting order is adjacent spatial→temporal→non-adjacent spatial→HMVP→pairwise.

h. In one example, the BV candidate inserting order is adjacent spatial→non-adjacent spatial→HMVP→pairwise.

i. In one example, the BV candidate inserting order is adjacent spatial (STMVP is inserted before the above-left spatial BV candidate)→temporal→non-adjacent spatial→HMVP→pairwise.

6. A BV candidate list may also consist of clipped BV candidates.

a. In one example, if a BV candidate is invalid from the sense of the 3rd bullet, it may be converted to a valid BV following a given rule and then inserted into the BV candidate list.

i. In one example, a BV candidate may be converted to the nearest valid BV candidate.

ii. In one example, a BV candidate may be converted to the nearest valid BV candidate from a predefined BV candidate set.

b. In one example, if a non-zero BV candidate is invalid, it may be clipped to the nearest valid BV and then inserted into the BV candidate list.

c. In one example, if a non-zero BV candidate is invalid, it may be clipped to the nearest valid BV from a predefined BV candidate set and then inserted into the BV candidate list.

i. In one example, the predefined BV candidate set may consist of $(-m*W,0)$, $(0,-n*H)$, $(-m*H,0)$, $(0,-n*W)$. m and n are positive values.

d. In one example, the clipped BV candidates may be inserted after the non-clipped BV candidates.

7. The BV candidate list can be used as IBC merge/AMVP candidate list.

a. Alternatively, the BV candidate list can be used to derive IBC merge/AMVP candidate list.

i. In one example, for IBC merge mode, the first R entries of the BV candidate list will be used to construct the IBC merge candidate list; for IBC AMVP mode, the first S entries of the BV candidate list will be used to construct the IBC AMVP candidate list.

(i) In one example, R is 6, S is 2.

Figure 31:
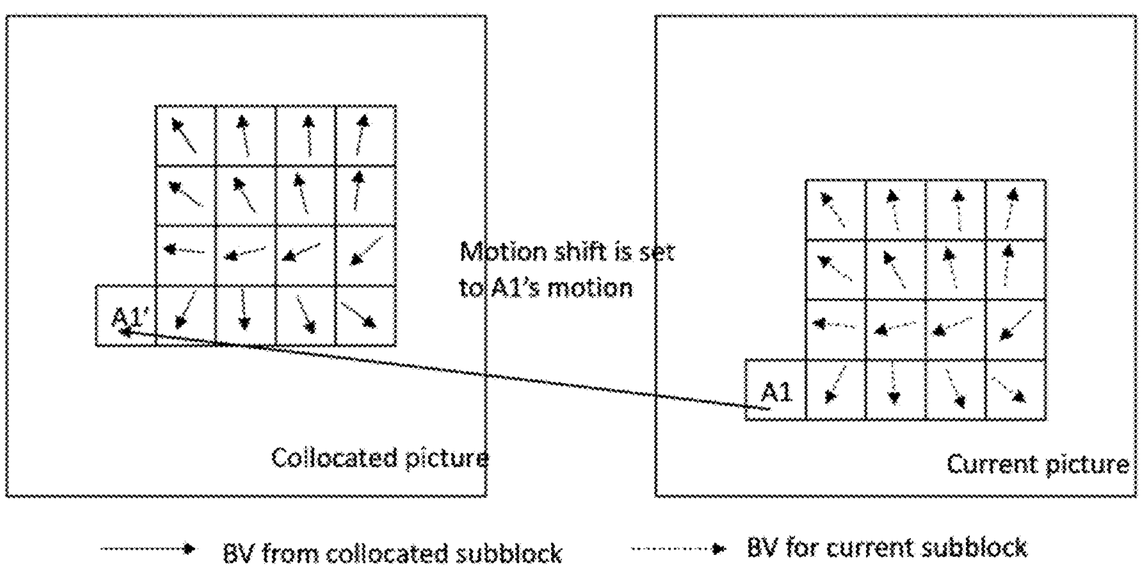
FIG. 31 shows deriving sub-CU bv motion field from the corresponding collocated sub-CUs by applying a motion shift from spatial neighbor.

8. In one example, subblock-based temporal block vector prediction (SbTBVP) may be supported as a BV candidate or a BV prediction mode.

a. Similar to the SbTMVP, SbTBVP uses the BV motion field in the collocated picture to improve block vector prediction and IBC merge mode for CUs in the current picture. The same collocated picture used by TMVP is used for SbTBVP.

b. In one example, SbTBVP applies a motion shift before fetching the temporal BV information from the collocated picture, where the motion shift is obtained from the motion vector from one of the spatial neighboring blocks of the current CU (an example is shown in FIG. 31).

i. In one example, if A1 has a motion vector that uses the collocated picture as its reference picture, this motion vector is selected to be the motion shift to be applied. If no such motion is identified, then the motion shift is set to (0, 0).

ii. In one example, other spatial candidate positions (e.g. A0, B0, B1, B2) can be used to derive the motion shift.

(i) In one example, the checking order may be A1→B1→B0→A0→B2.

(ii) In one example, the checking order may be B1→A1→B0→A0→B2.

(iii) In one example, the checking order may be A0→A1→B0→B1→B2.

c. In one example, after deriving the motion shift, for each sub-CU, the BV information of its corresponding block (the smallest motion grid that covers the center sample) in the collocated picture is used to derive the BV information for the sub-CU (The example in FIG. 31) assumes the motion shift set to block A1's motion).

On Reordering of BV Candidate List

9. An initial BV candidate list may be firstly derived, followed by a reordering/refined process. And the reordered/refined list is utilized in the coding/decoding process of a block.

a. In one example, the BV candidate list may be the IBC merge candidate list.

b. In one example, the BV candidate list may be the IBC AMVP candidate list.

c. In one example, the BV candidate list may be the IBC template matching candidate list.

d. In one example, the BV candidate list may be the intra template matching candidate list.

e. In one example, the BV candidate list may be the IBC MMVD candidate list.

f. In one example, the BV candidate list may be the IBC GPM candidate list.

g. In one example, the BV candidate list may be the IBC TPM candidate list.

h. Alternatively, the reordering/refined process may be not applied to the IBC AMVP candidate list.

i. Alternatively, the reordering/refined process may be not applied to the IBC GPM candidate list.

j. Alternatively, the reordering/refined process may be not applied to the IBC TPM candidate list.

k. In one example, the reordering/refined process may be applied to all kinds of IBC coded blocks, i.e., the same procedure is applied.

i. Alternatively, whether to apply the reordering/refined process may be dependent on the decoded information (e.g., IBC mode).

(i) In one example, it is applied to IBC merge/skip mode, but not applied to IBC AMVP mode.

Figure 33A:
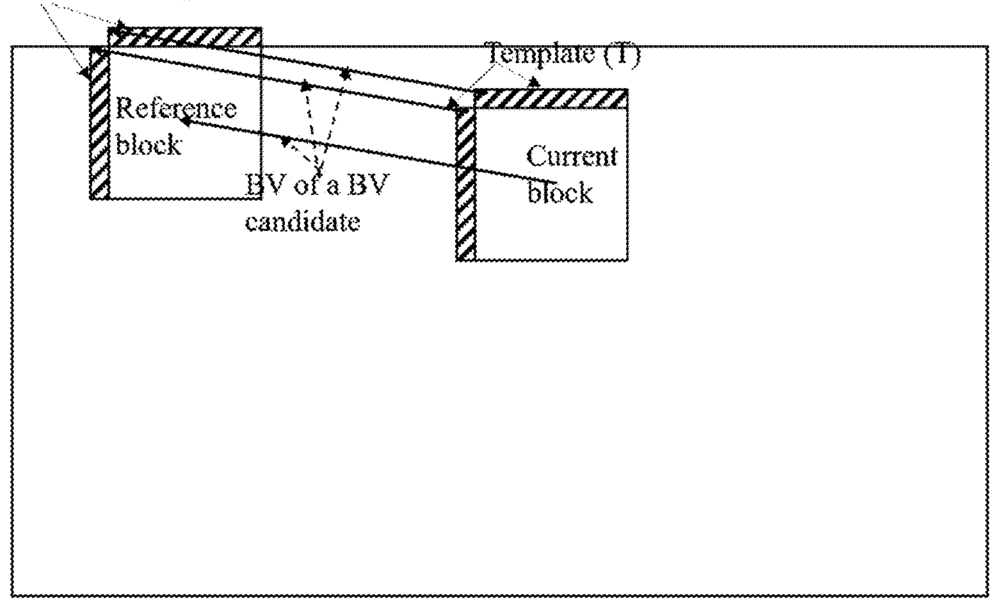
FIG. 33*a* shows the reference template is outside the current picture and FIG. 33*b* clip BV to make the reference template locating inside the current picture shows.
Figure 33B:
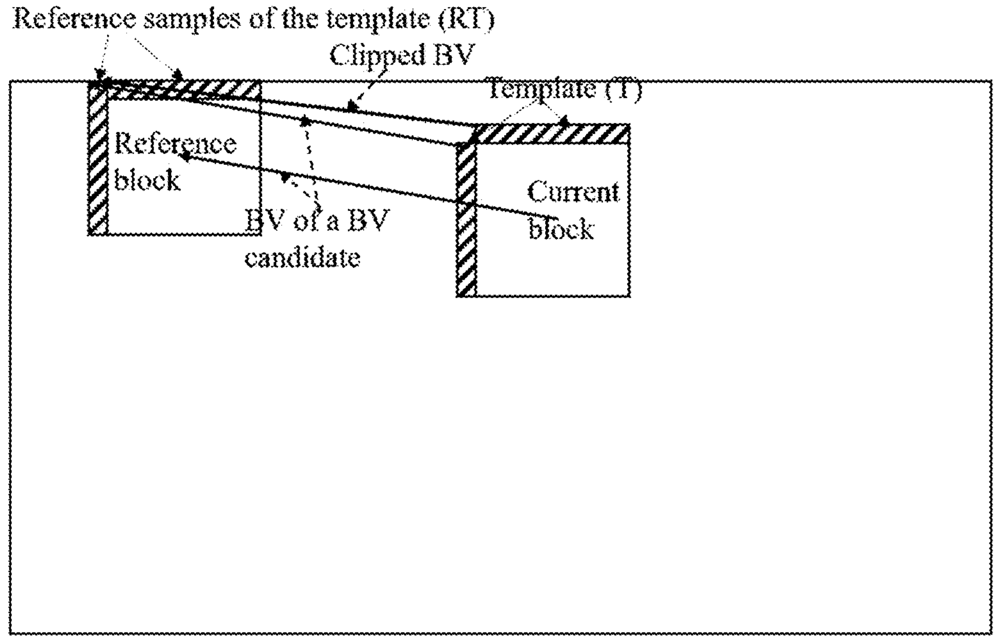

10. The BV candidates can be adaptively rearranged in the final BV candidate list according to one or some criterions.

a. In one example, partial or full process of current BV candidate list construction process is firstly invoked, followed by the reordering of candidates in the list.
   i. Alternatively, candidates in a first subgroup may be reordered and they should be added before those candidates in a second subgroup wherein the first subgroup is added before the second subgroup.
b. In one example, all the BV candidates in the BV candidate list may be reordered together (i.e. no subgroup).
   i. Alternatively, partial of the BV candidates in the BV candidate list may be reordered together (i.e. no subgroup).
      (i) The BV candidates to be reordered may be selected based on coding information or signaling.
c. In one example, the criterion may be based on template matching cost.
   i. In one example, the cost function between current template and reference template may be
      (i) SAD/MR-SAD
      (ii) SATD/MR-SATD
      (iii) SSD/MR-SSD
      (iv) SSE/MR-SSE
      (v) Weighted SAD/weighted MR-SAD
      (vi) Weighted SATD/weighted MR-SATD
      (vii) Weighted SSD/weighted MR-SSD
      (viii) Weighted SSE/weighted MR-SSE
      (ix) Gradient information
   ii. In one example, the current template and reference template may consist of samples in the mapped domain if LMCS is enabled.
      (i) Alternatively, the current template and reference template may consist of samples in the original domain.
   iii. In one example, BV candidates in each subgroup may be reordered ascendingly according to cost values based on template matching.
   iv. In one example, if only above template is available for current block, the template matching reorder can only use the above template.
   v. In one example, if only left template is available for current block, the template matching reorder can only use the left template.
   vi. In one example, if both above and left templates are available for current block, the template matching reorder can use the left template, the above template, or both above and left templates.
   vii. In one example, the template matching procedure may comprise one component such as luma.
      (i) Alternatively, the template matching procedure may comprise multiple components such as luma and chroma.
         a) In one example, the total template matching cost may be calculated as a weighted sum of template matching costs on different color components.
   viii. In one example, the width of the left template and/or the height of the above template may be fixed.
      (i) In one example, the width of the left template may be 1.
      (ii) In one example, the height of the above template may be 1.
   ix. In one example, the BV for locating the reference template may be clipped.
      (i) In one example, if the reference template is outside the current picture (as shown in FIG. 33*a*), the BV for locating the reference template may be clipped to make the reference template locating inside the current picture. The clip operation will not change the BV of the corresponding BV candidate. An example is shown in FIG. 33*b*.
   x. In one example, if the reference template is outside the current picture (as shown in FIG. 33*a*), the corresponding BV candidate can still be reordered.
      (i) In one example, if the reference template is outside the current picture, it can be padded from the nearest samples inside the current picture.
   xi. In one example, the reference template should be already reconstructed inside the current picture.
      (i) In one example, if the reference template is not reconstructed or outside the current picture, the corresponding BV candidate may be not reordered.
   xii. In one example, the samples included in the reference template should be available (e.g., being reconstructed and within the same slice/tile/IBC virtual buffer).
      (i) Alternatively, furthermore, if some or all samples included in the reference template are unavailable, the above methods that handle reference template outside current picture may be applied.
d. In one example, whether to and/or how to reorder the BV candidates may depend on the category of the BV candidates.
e. In one example, the BV candidates to be reordered can be the BV candidates in the final BV candidate list.
   i. Alternatively, the BV candidates to be reordered can be partial/all the adjacent spatial BV candidates even it may not be included in the final BV candidate list.
   ii. Alternatively, the BV candidates to be reordered can be partial/all the non-adjacent spatial BV candidates even it may not be included in the final BV candidate list.
   iii. Alternatively, the BV candidates to be reordered can be partial/all the HMVP BV candidates even it may not be included in the final BV candidate list.
   iv. Alternatively, the BV candidates to be reordered can be partial/all the pairwise average BV candidates even it may not be included in the final BV candidate list.
   v. Alternatively, the BV candidates to be reordered can be partial/all the STMVP BV candidates even it may not be included in the final BV candidate list.

11. The template shape may be adaptive.
   a. In one example, the template may only comprise neighboring samples left to the current block.
   b. In one example, the template may only comprise neighboring samples above to the current block.
   c. In one example, the template shape is selected according to the CU shape.
   d. In one example, the width of the left template is selected according to the CU height.

i. For example, if H<=M, then the left template size is w1×H; otherwise, the left template size is w2×H.

e. In one example, M, w1, and w2 are set equal to 8, 1, and 2, respectively.

f. In one example, the height of the above template is selected according to the CU width.

i. For example, if W<=N, then the above template size is W×h1; otherwise, the above template size is W×h2.

(i) In one example, N, h1, and h2 are set equal to 8, 1, and 2, respectively.

g. In one example, the width of the left template is selected according to the CU width.

i. For example, if W<=N, then the left template size is w1×H; otherwise, the left template size is w2×H.

(i) In one example, N, w1, and w2 are set equal to 8, 1, and 2, respectively.

h. In one example, the height of the above template is selected according to the CU height.

i. For example, if H<=M, then the above template size is W×h1; otherwise, the above template size is W×h2.

(i) In one example, M, h1, and h2 are set equal to 8, 1, and 2, respectively.

i. In one example, samples of the template and the reference samples of the template samples may be subsampled or downsampled before being used to calculate the cost.

i. Whether to and/or how to do subsampling may depend on the CU dimensions.

ii. In one example, no subsampling is performed for the short side of the CU.

12. In one example, the cost disclosed in bullet 10 may be derived for a first BV candidate, which may be or may not be put into a BV candidate list.

a. In one example, whether to put the first BV candidate into the BV candidate list may depend on the cost derived for the first BV candidate.

b. In one example, whether to put the first BV candidate into the BV candidate list may depend on a comparison between a first cost derived for the first BV candidate and a second cost derived for a second BV candidate, which may be or may not be put into a BV candidate list.

Figure 32:
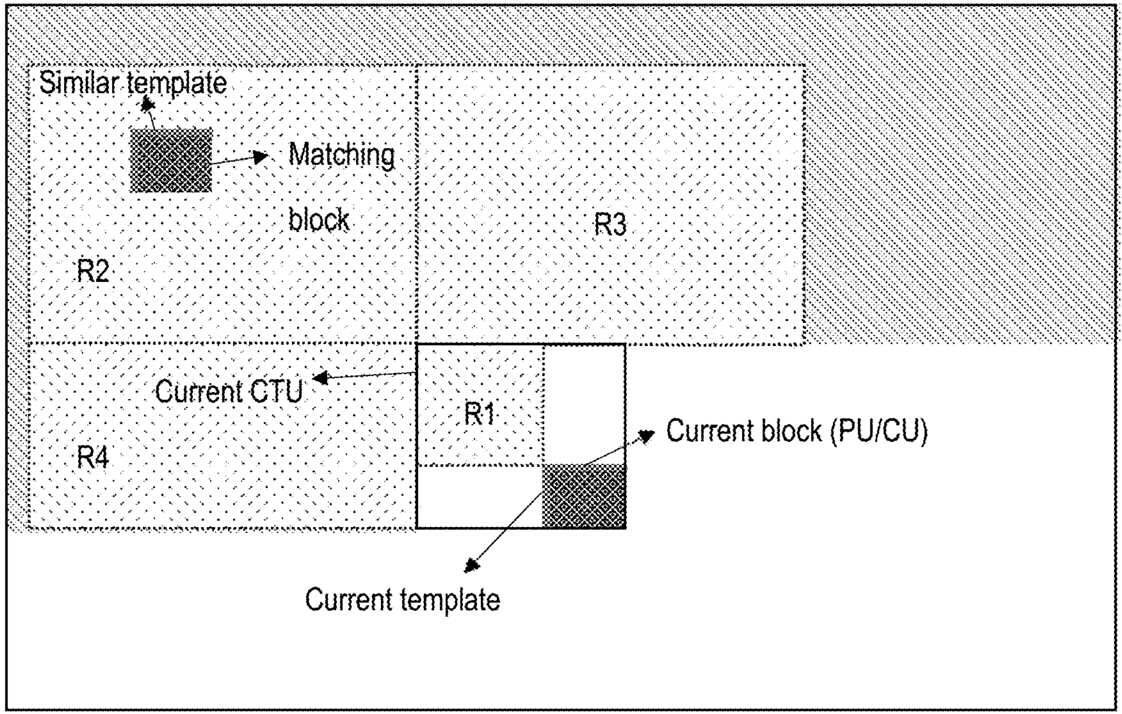
FIG. 32 shows intra template matching.

13. In one example, for the intra TMP, the L-shaped template can be replaced with the above and left templates which excluding the above-left part (an example is shown in FIG. 32).

a. In one example, if only above template is available for current block, the intra TMP can only use the above template.

b. In one example, if only left template is available for current block, the intra TMP can only use the left template.

c. In one example, if both above and left templates are available for current block, the intra TMP can use the left template, the above template, or both above and left templates.

2.24. Template Matching Based Merge Candidate List Construction (TM-MCLC)

Figure 34:
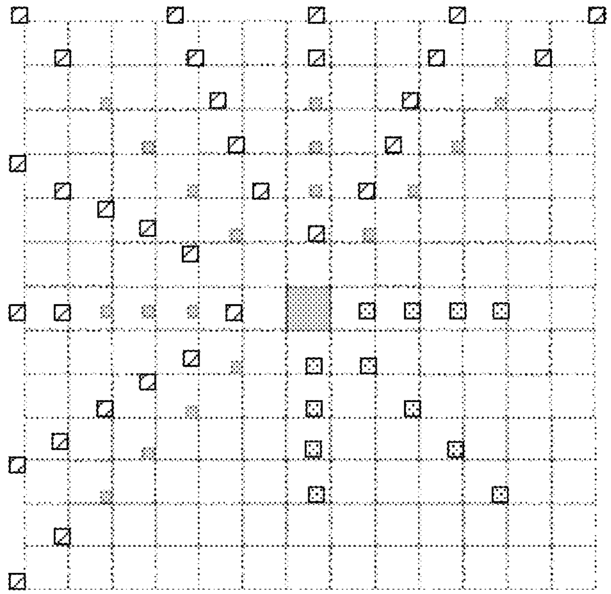
FIG. 34 shows non-adjacent positions used.

In ECM, non-adjacent and HMVP candidates are put into the merge candidate list based on a predefined traversing order after adjacent candidates and TMVP candidates. With TM-MCLC, non-adjacent and HMVP candidates are still put into the merge candidate list after adjacent candidates and TMVP candidates, but in an ascending order of template matching costs. FIG. 34 shows non-adjacent positions used.

More specifically, all available non-adjacent MVP and HMVP are collected in a group. Then TM cost associated with each candidate in the group is derived in a similar way to ARMC. Subsequently, all the candidates in the group are sorted in an ascending order regarding the corresponding TM costs. Finally, non-adjacent and HMVP candidates are put into the merge candidate list in an ascending order of template matching costs.

In this proposal, non-adjacent MVPs in ECM software is further extended with more spatial and non-adjacent temporal positions, as shown in FIG. 34. Besides the 18 positions for non-adjacent spatial MVPs in ECM-2.0, additional 32 spatial positions and 12 non-adjacent temporal positions are introduced, where non-adjacent temporal MVP positions locate in the same reference frame as the adjacent TMVP.

To reduce the complexity, integer precision is used for TM merge mode while 2-tap bilinear filter is used to generate the reference template for regular merge mode.

2.25. Modifications of IBC Merge/AMVP List Construction

In this contribution, the IBC merge/AMVP list construction is modified with the following changes:

1) Only if an IBC merge/AMVP candidate is valid, it can be inserted into the IBC merge/AMVP candidate list.

Figure 35:
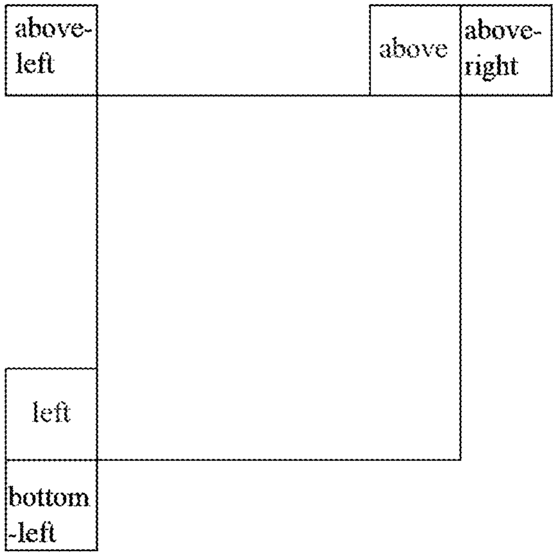
FIG. 35 shows spatial candidates used for IBC merge/AMVP candidate list.

2) Above-right, bottom-left, and above-left spatial candidates (as shown in FIG. 35) and one pairwise average candidate can be added into the IBC merge/AMVP candidate list.

Figure 36:
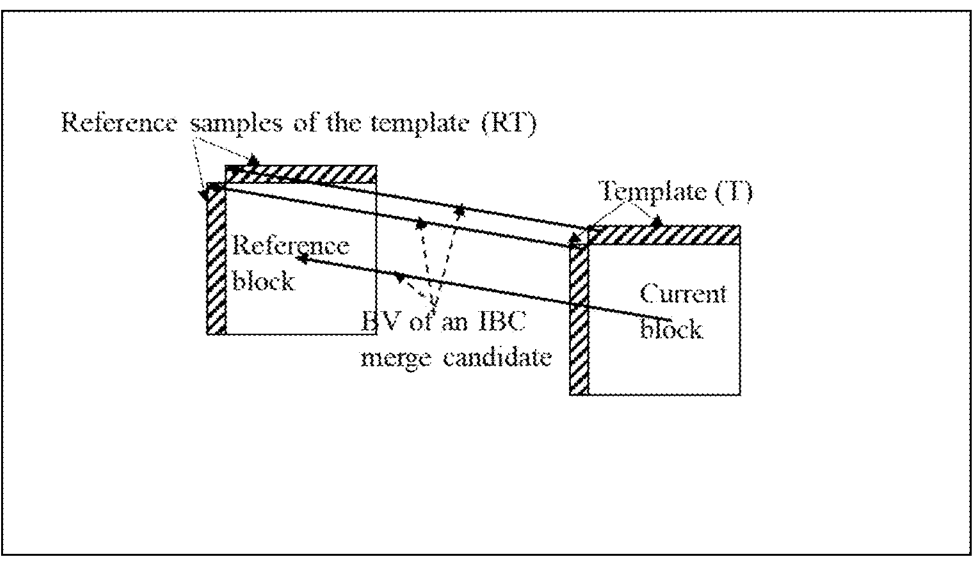
FIG. 36 shows template and reference samples of the template.

3) ARMC-TM is extended to IBC merge list known as adaptive reordering of merge candidates with template matching for IBC (ARMC-TM-IBC). Template and reference samples of the template are shown in FIG. 36.

2.26. MV Candidate Type-Based ARMC

Figure 37:
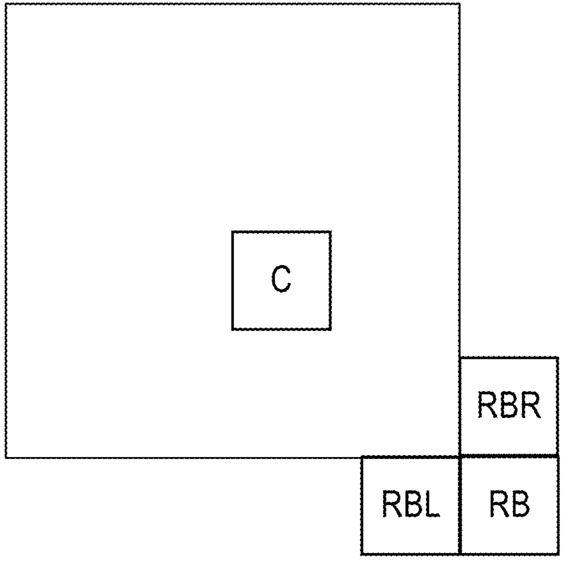
FIG. 37 shows the positions used by TMVP.

The MV candidate type-based ARMC is proposed to reorder the merge candidates in a candidate type, e.g., TMVP, NA-MVP, etc., based on the TM cost values (the same as the ARMC TM cost used in ECM2.0). M candidates are then selected out of the reordered candidates in the candidate type when constructing the merge candidate list, where M varies depending on candidate types (for example, M=1 for TMVP type and M=9 for NA-MVP type). Some candidate types add more merge candidates to perform the reordering and the selection. For example, TMVP candidates derived from different collocated positions as shown in FIG. 37 enabling various prediction reference lists are reordered together. More specifically, the evaluated TMVP candidates are as follows:

TMVP0: List 0-MV from {RB, C}; List 1-MV from {RB, C}

TMVP1: List 0-MV from {RBR, RBL}; List 1-MV from {RBR, RBL}

TMVP2: List 0-MV from {RB, C} (TMVP0 without List 1)

TMVP3: List 1-MV from {RB, C} (TMVP0 without List 0)

TMVP4: List 0-MV from {RBR, RBL} (TMVP1 without List 1)

TMVP5: List 1-MV from {RBR, RBL} (TMVP1 without List 0)

where {Pos1, Pos2} indicates the order of MV availability checking, and only the first available position is selected. Finally, 1 TMVP candidate is selected out of these TMVP candidates based on the TM cost values. Some candidate types may not be reordered by the proposed ARMC.

2.27. Adaptive Decoder Side Motion Vector Refinement (ADMVR)

In ECM-2.0, a multi-pass decoder-side motion vector refinement (DMVR) method is applied in regular merge mode if the selected merge candidate meets the DMVR conditions. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF).

Adaptive decoder side motion vector refinement method consists of the two new merge modes introduced to refine MV only in one direction, either L0 or L1, of the bi prediction for the merge candidates that meet the DMVR conditions. The multi-pass DMVR process is applied for the selected merge candidate to refine the motion vectors, however either MVD0 or MVD1 is set to zero in the 1 st pass (i.e., PU level) DMVR.

Like the regular merge mode, merge candidates for the proposed merge modes are derived from the spatial neighboring coded blocks, TMVPs, non-adjacent blocks, HMVPs, and pair-wise candidate. The difference is that only those meet DMVR conditions are added into the candidate list. The same merge candidate list (i.e., ADMVR merge list) is used by the two proposed merge modes and merge index is coded as in regular merge mode.

2.28. History-Parameter-Based Affine Model Inheritance

A history-parameter table (HPT) is established. An entry of HPT stores a set of affine parameters: a, b, c and d, each of which is represented by a 16-bit signed integer. Entries in HPT is categorized by reference list and reference index. Five reference indices are supported for each reference list in HPT. In a formular way, the category of HPT (denoted as HPTCat) is calculated as $$HPTCat\ (RefList, RefIdx) = 5 \times RefList + \min(RefIdx, 4),$$

wherein RefList and RefIdx represents a reference picture list (0 or 1) and a reference index, respectively. For each category, at most two entries can be stored, resulting in twenty entries totally in HPT. At the beginning of each CTU row, the number of entries for each category is initialized as zero. After decoding an affine-coded CU with reference list RefListcur and RefIdxcur, the affine parameters are utilized to update entries in the category HPTCat(RefListcur, RefIdxcur) in a way similar to HMVP table updating.

Figure 38:
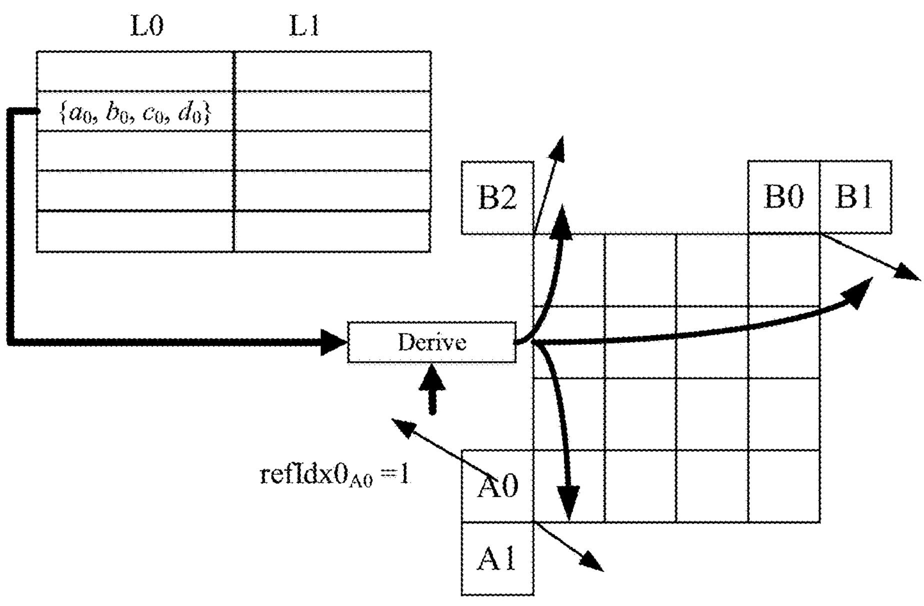
FIG. 38 shows an example of generating HAPC.

A history-affine-parameter-based candidate (HAPC) is derived from a neighbouring 4×4 block denoted as A0, A1, B0, B1 or B2 in FIG. 38 and a set of affine parameters stored in a corresponding entry in HPT. The MV of a neighbouring 4×4 block served as the base MV. In a formulating way, the MV of the current block at position (x, y) is calculated as:

$$\begin{cases} mv^h(x, y) = a(x - x_{base}) + c(y - y_{base}) + mv^h_{base} \\ mv^v(x, y) = b(x - x_{base}) + d(y - y_{base}) + mv^v_{base} \end{cases},$$

where ($mv^h_{base}$, $mv^v_{base}$) represents the MV of the neighbouring 4×4 block, ($x_{base}$, $y_{base}$) represents the center position of the neighbouring 4×4 block. (x, y) can be the top-left, top-right and bottom-left corner of the current block to obtain the corner-position MVs (CPMVs) for the current block, or it can be the center of the current block to obtain a regular MV for the current block.

FIG. 38 shows an example of how to derive an HAPC from block A0. The affine parameters {$a_0$, $b_0$, $c_0$, $d_0$} are directly fetched from one entry of category HPTIdx($RefList_{A0}$, $refIdx0_{A0}$) in HPT. The affine parameters from HPT, with the center position of A0 as the base position, and the MV of block A0 as the base MV, are used together to derive the CPMVs for an affine merge HAPC, or an affine AMVP HAPC. They can also be used to derive MVs located at the center of the current block, as regular merge candidates. A HAPC can be put into the sub-block-based merge candidate list, the affine AMVP candidate list or the regular merge candidate list. As a response to new HAPCs being introduced, the size of sub-block-based merge candidate list is increased from five to nine.

2.29. Non-Adjacent Spatial Neighbors for Affine Merge Mode

Figure 39A:
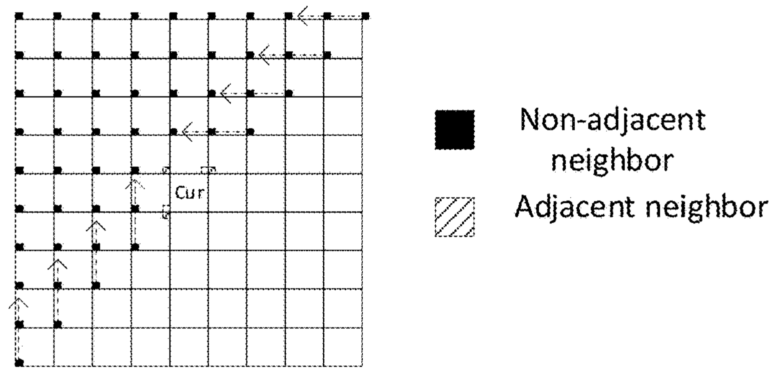
FIG. 39*a* shows spatial neighbors for deriving inherited affine merge candidates and FIG. 39*b* shows spatial neighbors for deriving constructed affine merge candidates.
Figure 39B:
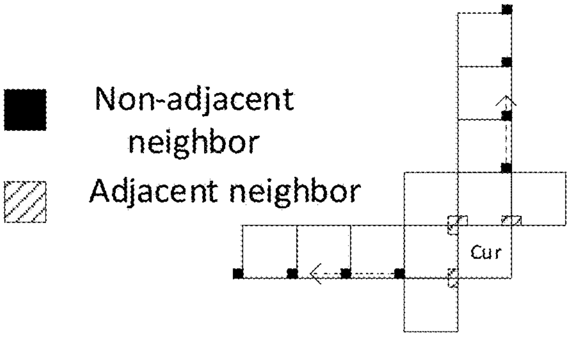

Similar to the enhanced regular merge mode, this contribution proposes to use non-adjacent spatial neighbors for affine merge (NSAM). The pattern of obtaining non-adjacent spatial neighbors is shown in FIG. 39*a* and FIG. 39*b*. Same as the existing non-adjacent regular merge candidates [2], the distances between non-adjacent spatial neighbors and current coding block in the NSAM are also defined based on the width and height of current CU.

The motion information of the non-adjacent spatial neighbors in FIG. 39*a* and FIG. 39*b* is utilized to generate additional inherited and constructed affine merge candidates. Specifically, for inherited candidates, the same derivation process of the inherited affine merge candidates in the VVC is kept unchanged except that the CPMVs are inherited from non-adjacent spatial neighbors. The non-adjacent spatial neighbors are checked based on their distances to the current block, i.e., from near to far. At a specific distance, only the first available neighbor (that is coded with the affine mode) from each side (e.g., the left and above) of the current block is included for inherited candidate derivation. As indicated by the red dash arrows in FIG. 39*a*, the checking orders of the neighbors on the left and above sides are bottom-to-up and right-to-left, respectively. For constructed candidates, as shown in the FIG. 39*b*, the positions of one left and above non-adjacent spatial neighbors are firstly determined independently; After that, the location of the top-left neighbor can be determined accordingly which can enclose a rectangular virtual block together with the left and above non-adjacent neighbors. Then, as shown in the FIG. 40, the motion information of the three non-adjacent neighbors is used to form the CPMVs at the top-left (A), top-right (B) and bottom-left (C) of the virtual block, which is finally projected to the current CU to generate the corresponding constructed candidates.

The non-adjacent spatial merge candidates are inserted into the affine merge candidate list by following below order:

1. SbTMVP candidate, if available
2. Inherited from adjacent neighbors
3. Inherited from non-adjacent neighbors
4. Constructed from adjacent neighbors
5. Constructed from non-adjacent neighbors
6. Zero MVs Due to the inclusion of the additional candidates generated by NSAM, in this contribution, the size of the affine merge candidate list is increased from 5 to 15.

2.30. Affine Motion Compensated Prediction

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIGS. 41*a* and 41*b*, the affine motion field of the block is described by motion information of two control point (4-parameter) as shown in FIG. 41*a* or three control point motion vectors (6-parameter) as shown in FIG. 41*b*.

For 4-parameter affine motion model, motion vector at sample location (x, y) in a block is derived as:

$$\begin{cases} mv_x = \frac{mv_{1x} - mv_{0x}}{W}x + \frac{mv_{0y} - mv_{1y}}{W}y + mv_{0x} \\ mv_y = \frac{mv_{1y} - mv_{0y}}{W}x + \frac{mv_{1x} - mv_{0x}}{W}y + mv_{0y} \end{cases}$$

For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

In order to simplify the motion compensation prediction, block based affine transform prediction is applied. To derive motion vector of each 4×4 luma subblock, the motion vector of the center sample of each subblock, as shown in FIG. 42, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

2.30.1 Affine Merge Prediction

Figure 43:
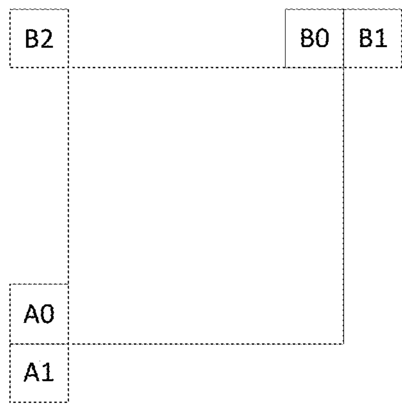
FIG. 43 shows locations of inherited affine motion predictors.
Figure 44:
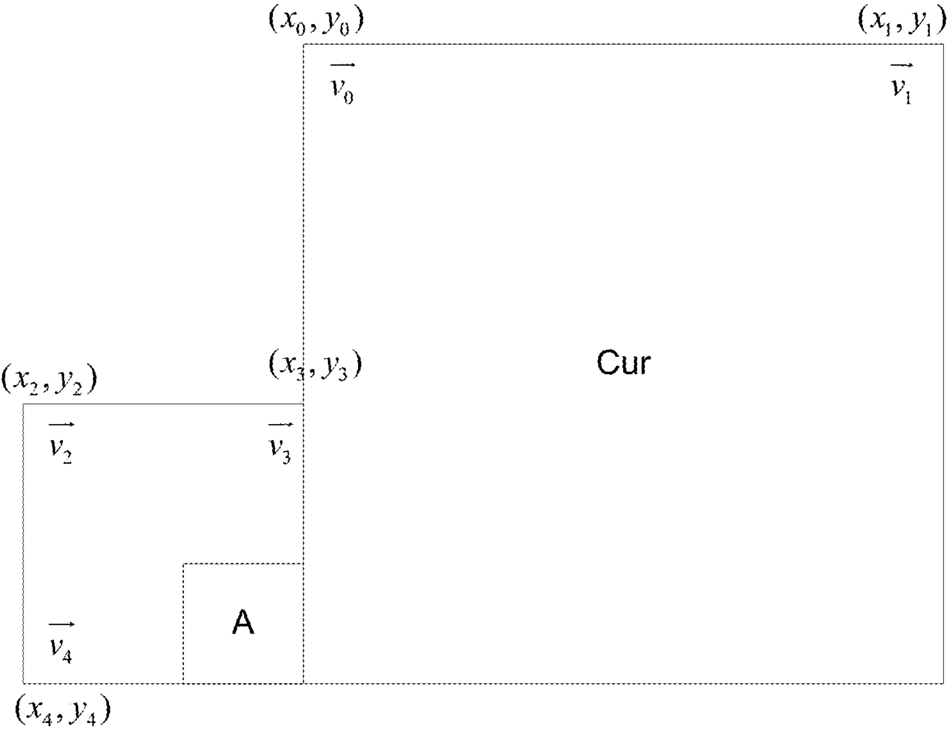
FIG. 44 shows control point motion vector inheritance.

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

- Inherited affine merge candidates that extrapolated from the CPMVs of the neighbour CUs
- Constructed affine merge candidates CPMVPs that are derived using the translational MVs of the neighbour CUs
- Zero MVs In VVC, there are maximum two inherited affine candidates, which are derived from affine motion model of the neighboring blocks, one from left neighboring CUs and one from above neighboring CUs. The candidate blocks are shown in FIG. 43. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. As shown in FIG. 44, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor shown in FIG. 45. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on those motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$},
{$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.30.2 Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

- Inherited affine AMVP candidates that extrapolated from the CPMVs of the neighbour CUs
- Constructed affine AMVP candidates CPMVPs that are derived using the translational MVs of the neighbour CUs
- Translational MVs from neighboring CUs
- Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 45:
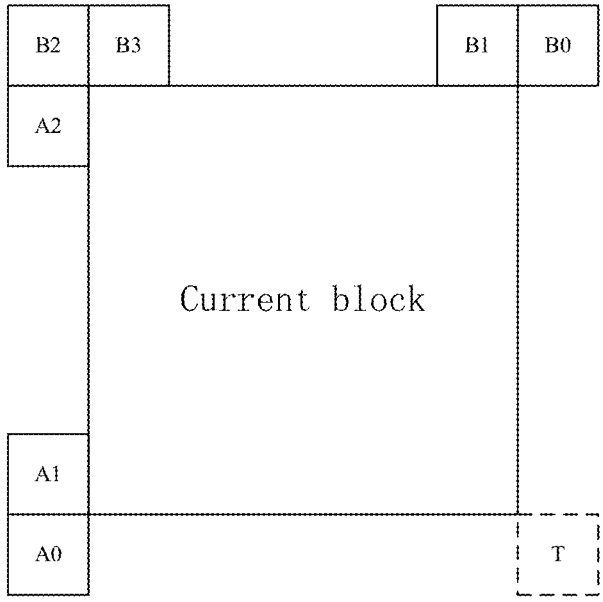
FIG. 45 shows locations of candidates position for constructed affine merge mode.

Constructed AMVP candidate is derived from the specified spatial neighbors shown in FIG. 45. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.30.3 Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and deblocking.

Figure 46:
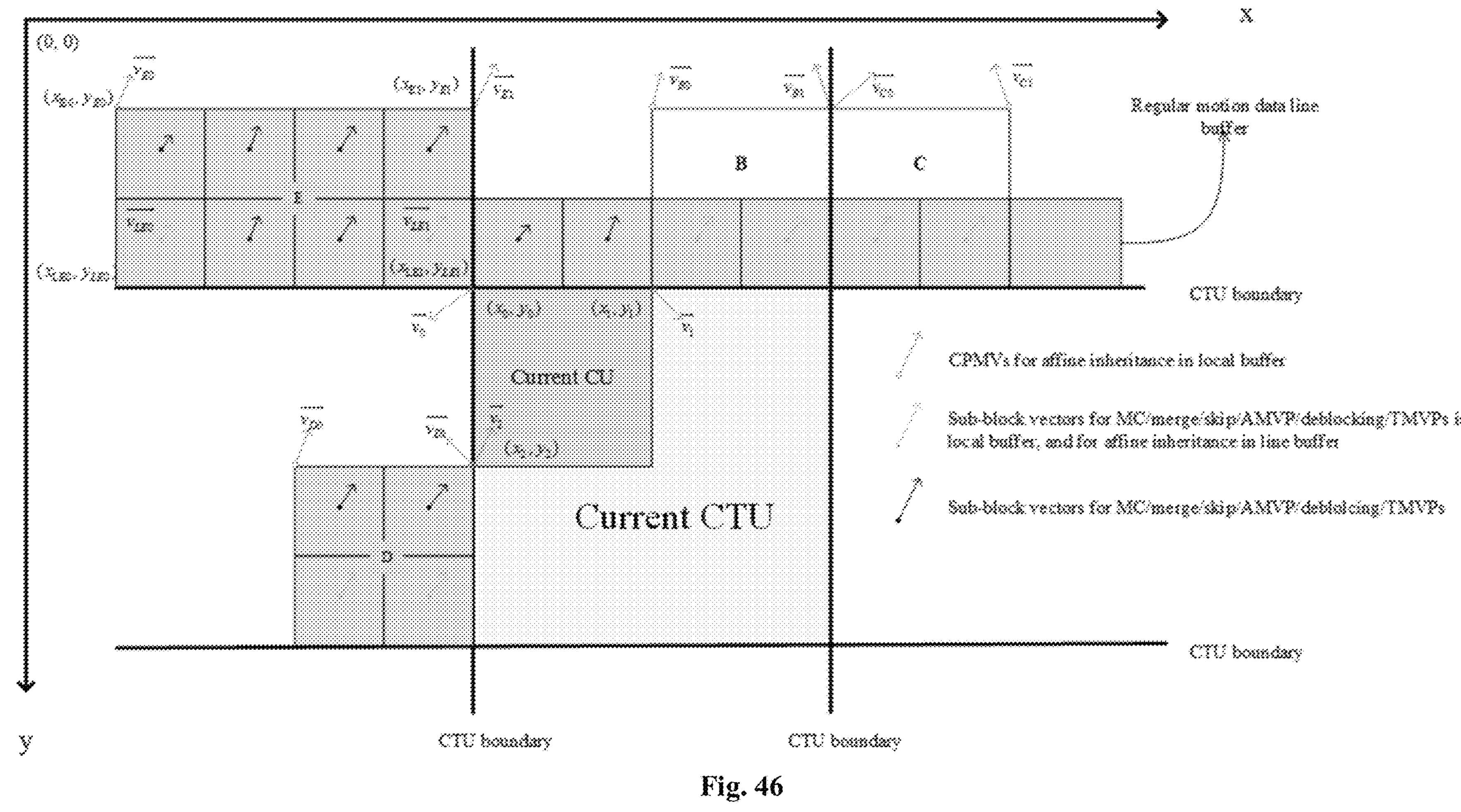
FIG. 46 is an illustration of motion vector usage for proposed combined method.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model. As shown in FIG. 46, along the top CTU boundary, the bottom-left and bottom right subblock motion vectors of a CU are used for affine inheritance of the CUs in bottom CTUs.

2.30.4 Prediction Refinement with Optical Flow for Affine Mode

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i,j).

Step2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i, j) = (I(i+1, j) \gg \text{shift1}) - (I(i-1, j) \gg \text{shift1})$$

$$g_y(i, j) = (I(i, j+1) \gg \text{shift1}) - (I(i, j-1) \gg \text{shift1})$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figures 47, 48:
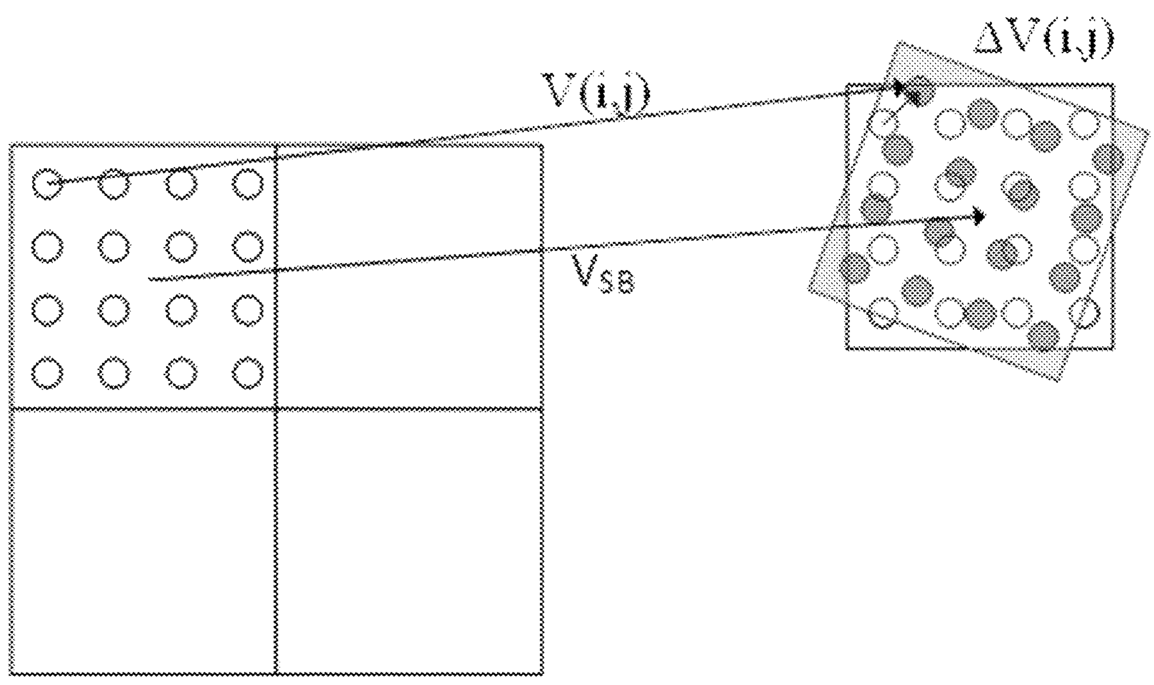
FIG. 47 shows subblock MV $V_{SB}$ and pixel $\Delta v(i,j)$.
FIG. 48 shows neighboring reconstructed block and current prediction block.

Step 3) The luma prediction refinement is calculated by the following optical flow equation.

$$\Delta I(i, j) = g_x(i, j) * \Delta v_x(i, j) + g_y(i, j) * \Delta v_y(i, j)$$

where the Δv(i,j) is the difference between sample MV computed for sample location (i,j), denoted by v(i,j), and the subblock MV of the subblock to which sample (i,j) belongs, as shown in FIG. 47. The Δv(i,j) is quantized in the unit of 1/32 luam sample precision.

Since the affine model parameters and the sample location relative to the subblock center are not changed from subblock to subblock, Δv(i,j) can be calculated for the first subblock, and reused for other subblocks in the same CU. Let dx(i,j) and dy(i,j) be the horizontal and vertical offset from the sample location (i,j) to the center of the subblock ($x_{SB}$, $y_{SB}$), Δv(x, y) can be derived by the following equation, $$\begin{cases} dx(i, j) = i - x_{SB} \\ dy(i, j) = j - y_{SB} \end{cases}$$

$$\begin{cases} \Delta v_x(i, j) = C * dx(i, j) + D * dy(i, j) \\ \Delta v_y(i, j) = E * dx(i, j) + F * dy(i, j) \end{cases}$$

In order to keep accuracy, the enter of the subblock ($x_{SB}$, $y_{SB}$) is calculated as (($W_{SB}$−1)/2, ($H_{SB}$−1)/2), where $W_{SB}$ and $H_{SB}$ are the subblock width and height, respectively.

For 4-parameter affine model, $$\begin{cases} C = F = \dfrac{v_{1x} - v_{0x}}{w} \\ E = -D = \dfrac{v_{1y} - v_{0y}}{w} \end{cases}$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases}$$

where ($v_{0x}$, $v_{0y}$), ($v_{1x}$, $v_{1y}$), ($v_{2x}$, $v_{2y}$) are the top-left, top-right and bottom-left control point motion vectors, w and h are the width and height of the CU.

Step 4) Finally, the luma prediction refinement ΔI(i,j) is added to the subblock prediction I(i,j). The final prediction I' is generated as the following equation.

$$I'(i, j) = I(i, j) + \Delta I(i, j)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.31. Motion Candidate List Construction

The detailed embodiments below should be considered as examples to explain general concepts. These embodiments should not be interpreted in a narrow way. Furthermore, these embodiments can be combined in any manner.

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

For an IBC coded block, a block vector (BV) is used to indicate the displacement from the current block to a reference block, which is already reconstructed inside the current picture.

W and H are the width and height of current block (e.g., luma block).

The non-adjacent spatial candidates of current coding block are adjacent spatial candidates of a virtual block in the ith search round (as shown in FIG. 9). The width and height of the virtual block for the ith search round are calculated by: newWidth=i×2×gridX+W, newHeight=i×2×gridY+H. Obviously, the virtual block is the current block if the search round i is 0.

In the following, a BV predictor also is a BV candidate. The skip mode also is the merge mode.

The motion candidates can be divided into several groups according to some criterions. Each group is called a subgroup. For example, we can take adjacent spatial and temporal motion candidates as a first subgroup and take the remaining motion candidates as a second subgroup; In another example, we can also take the first N (N≥2) motion candidates as a first subgroup, take the following M (M≥2) motion candidates as a second subgroup, and take the remaining motion candidates as a third subgroup. For example, the motion candidates can be divided into several groups according to the motion candidate type.

A BV candidate may be determined to be valid when it meets one of or a combination of at least one of the following conditions.

1) The corresponding reference block is already reconstructed inside the current picture.
2) The corresponding reference block is located in the same CTU row as current block.
3) The corresponding reference block is located in the same tile/subpicture as current block.
4) The corresponding reference block is located in the same slice as current block.
5) The BV candidate satisfies the block vector constraints (e.g. which is described in 2.4.2 and 2.4.3)
6) The BV candidate satisfies the IBC virtual buffer conditions (e.g. which is described in 2.4.4). A BV candidate may be determined to be invalid when it violates one of or a combination of at least one of the above conditions.

If CU at a temporal position is not available or is intra coded or is outside of the current row of CTUs or its BV (if has) is invalid for current block, the temporal position is treated as invalid; otherwise, the temporal position is treated as valid.

Note that the proposed methods may be applied to merge candidate list construction process for inter coded blocks (e.g., translational motion), affine coded blocks, TM coded blocks, GPM coded blocks, ADMVR coded block or IBC coded blocks; or other motion candidate list construction process (e.g., normal AMVP list; affine AMVP list; TM AMVP list; IBC AMVP list; HMVP table).

Note that the proposed methods may be applied to regular merge/AMVP candidate list after the DMVR/multi-pass DMVR process.

Note that the proposed methods may be applied to ADMVR merge candidate list after the DMVR/multi-pass DMVR process.

Note that the proposed methods may be applied to TM merge/AMVP candidate list after block-based bilateral matching refinement and/or template matching refinement and/or subblock-based bilateral matching refinement.

In the following, one motion candidate is a duplicate of another motion candidate may be defined as 1) The two motion candidates are totally the same in the reference directions, reference picture indices, affine model (for affine motion) and motion vectors or block vectors or partial or all CPMVs according to the motion type (inter or IBC or affine).

Or

2) The two motion candidates are totally the same in the reference directions, reference picture indices, affine model (for affine motion). But the difference of motion vectors or block vectors or partial or all CPMVs according to the motion type (inter or IBC or affine) of the two motion candidates may be within a threshold.

The difference of motion vectors may be defined as the absolute horizontal and/or vertical component of the motion vector difference of the two motion candidates in reference list 0 and/or reference list 1.

The difference of block vectors may be defined as the absolute horizontal and/or vertical component of the block vector difference of the two motion candidates in reference list 0.

The difference of one CPMV may be defined as the absolute horizontal and/or vertical component of the motion vector difference of this CPMV of the two motion candidates in reference list 0 and/or reference list 1.

The threshold may be adaptively set according to the coding mode of current block (e.g., TM merge, affine merge, regular merge, etc.), and/or current block size, and/or candidate type (e.g., adjacent spatial, adjacent temporal, non-adjacent spatial, non-adjacent temporal, HMVP, pairwise, or STMVP, etc.), and/or QP, and/or the reference index or the reference POC of current block, and/or other coding information of current block.

On Pairwise Average Motion Candidate

1. In one example, a pairwise average motion candidate may be generated by averaging a predefined pair of reordered candidates in the existing motion candidate list.
   a. In one example, the reordering process may be the adaptive reordering of motion candidates with template matching.

b. In one example, the reordering process may be the adaptive reordering of motion candidates with bilateral matching.

c. In one example, the predefined pair may be defined in a set of {(0, 1), (0, 2), (1, 2), (0, 3), (1, 3), (2, 3)}, where the numbers denote the motion candidate indices in the motion candidate list.

d. In one example, before adding a pairwise average motion candidate into the motion candidate list, partial or all of the following conditions need to be satisfied.

i. The pairwise average motion (e.g., BV) candidate is valid.

ii. The pairwise average motion candidate is not a duplicate of any previous motion candidate in the existing motion candidate list.

iii. A pruning method for the pairwise average motion candidate with an adaptive threshold may be applied.

(i) In one example, the threshold may be based on the current block size.

(ii) In one example, the threshold may be based on the coding mode of current block.

(iii) In one example, the threshold may be based on the QP.

(iv) In one example, the threshold may be based on one of or a combination of at least one of the above conditions.

(v) In one example, the threshold may be based on the reference index or the reference POC of current block.

e. In one example, the number of pairwise average motion candidates may be predefined.

i. In one example, the number of pairwise average motion candidates may be N (e.g., N=1).

ii. In one example, the number of pairwise average motion candidates may be calculated by subtracting the number of existing motion candidates before adding the pairwise average motion candidate from motion candidate list size. That is to say, there is no constraints on the number of pairwise average motion candidates, so the pairwise average motion candidates may be added until the motion candidate list is full.

f. In one example, partial or all of the pairwise average motion candidates may be reordered.

i. Alternatively, the pairwise average motion candidates may not be reordered.

ii. In one example, the pairwise average motion candidates may be reordered together with partial or all of the previous motion candidates in the same motion candidate list.

g. In one example, a non-pairwise motion candidate may be replaced by a pairwise motion candidate from the motion candidate list derivation.

i. In one example, if partial motion candidates are not reordered (i.e., non-reordered subgroup), each motion candidate, in the non-reordered subgroup, may be replaced by a pairwise motion candidate constructed by the first reordered candidate and this candidate if the created pairwise is not a duplicate.

ii. In one example, if partial motion candidates are not reordered (i.e., non-reordered subgroup), partial of the motion candidates, in the non-reordered subgroup, may be replaced by a pairwise motion candidate constructed by the first reordered candidate and the original candidate if the created pairwise is not a duplicate.

iii. In one example, if partial motion candidates are not reordered (i.e., non-reordered subgroup), in the last reordered position, a pairwise motion candidate may be built with the first two reordered motion candidates, if the pairwise motion candidate is not a duplicate and/or is valid, it is added to the motion candidate list in the last reordered position and the last motion candidate in the motion candidate list is removed from the list.

(i) In one example, the pairwise average motion candidate may be not reordered.

(ii) In one example, the pairwise average motion candidate may be reordered together with partial or all of the previous motion candidates in the reordered subgroup.

h. In one example, the motion candidate list may be i. In one example, the motion candidate list may be the TM merge/AMVP list after block-based bilateral matching refinement and/or template matching refinement and/or subblock-based bilateral matching refinement.

ii. In one example, the motion candidate list may be the regular merge/AMVP list after the DMVR/multi-pass DMVR process.

iii. In one example, the motion candidate list may be the ADMVR merge list after the DMVR/multi-pass DMVR process.

iv. In one example, the motion candidate list may be the GPM merge list after the template matching refinement process (e.g., AGPMList, LGPMList, or LAGPMList).

v. In one example, the motion candidate list may be the regular merge/AMVP list.

vi. In one example, the motion candidate list may be the TM merge/AMVP list.

vii. In one example, the motion candidate list may be the affine merge/AMVP list.

viii. In one example, the motion candidate list may be the IBC merge/AMVP list.

ix. In one example, the motion candidate list may be the ADMVR merge list x. In one example, the motion candidate list may be the GPM merge list.

xi. In one example, the motion candidate list may be the TPM merge list.

xii. In one example, the motion candidate list may be the MMVD merge list.

xiii. In one example, the motion candidate list may be the IBC template matching candidate list.

xiv. In one example, the motion candidate list may be the intra template matching candidate list.

xv. In one example, the motion candidate list may be the IBC MMVD candidate list.

xvi. In one example, the motion candidate list may be the IBC GPM candidate list.

xvii. In one example, the motion candidate list may be the IBC TPM candidate list.

xviii. In one example, the motion candidate list may be any other motion candidate list.

On Motion Candidate List

2. The motion candidate list may consist of the spatial candidates, and/or the temporal candidates, and/or the HMVP candidates, and/or the pairwise candidates, and/or the STMVP candidates.

a. In one example, the spatial candidates may consist of adjacent and/or non-adjacent spatial candidates.
  i. In one example, the adjacent spatial candidates may consist of left and/or above and/or above-right and/or bottom-left and/or above-left spatial candidates (an example is shown in FIG. 30*a*).
  ii. In one example, the distances between non-adjacent spatial candidates and current coding block may be based on the width and height of current coding block (e.g., FIG. 9 or FIG. 10 or FIG. 34, gridX=W, gridY=H).
    (i) Alternatively, the distances between non-adjacent spatial candidates and current coding block may be multiple of a constant value.
      a) For example, the multiplication factor is dependent on the search round index (e.g., the multiplication factor is i for the ith search round) and gridX=M, gridY=N (M and N are constant values).

b. In one example, the temporal candidates may consist of adjacent and/or non-adjacent temporal candidates.
  i. In one example, for the adjacent temporal candidates, the positions for the adjacent temporal candidates may be selected among RB and/or C and/or RBR and/or RBL in FIG. 37.
    (i) In one example, the four adjacent temporal candidates (e.g., RB and C and RBR and RBL) may be used.
      a) In one example, the order may be RB→C→RBR→RBL.
    (ii) In one example, the two adjacent temporal candidates may be used.
      a) In one example, one adjacent temporal candidate may be selected between RB and C. If RB is invalid, C will be used; otherwise, RB will be used. And the other adjacent temporal candidate may be selected between RBR and RBL. If RBR is invalid, RBL will be used; otherwise, RBR will be used.
    (iii) In one example, N adjacent temporal candidates may be used.
      a) In one example, the first N valid positions may be used to derive the N adjacent temporal candidates.
      b) In one example, N may be an integer from 0 to 4.
    (iv) In one example, one adjacent temporal candidate may be selected between RB and C. If RB is invalid, C will be used; otherwise, RB will be used.
    (v) In one example, one adjacent temporal candidate may be selected between RBR and RBL. If RBR is invalid, RBL will be used; otherwise, RBR will be used.
  ii. In one example, the distances between non-adjacent temporal candidates and current coding block may be based on the width and height of current coding block (e.g., FIG. 34, gridX=W, gridY=H).
    (i) Alternatively, the distances between non-adjacent temporal candidates and current coding block may be multiple of a constant value.
      a) For example, the multiplication factor is dependent on the search round index (e.g. the multiplication factor is i for the ith search round) and gridX=M, gridY=N (M and N are constant values).

c. In one example, for a pairwise candidate, it may be generated by averaging predefined pairs of candidates in the existing motion candidate list.
  i. In one example, a predefined pair may be defined as a pair in a set such as {(0, 1), (0, 2), (1, 2), (0, 3), (1, 3), (2, 3)}, where the numbers denote the motion candidate indices to the motion candidate list.
  ii. In one example, the number of pairwise average motion candidates may be predefined.
    (i) In one example, the number of pairwise average motion candidates may be N (e.g., N=1).
    (ii) In one example, the number of pairwise average motion candidates may be calculated by subtracting the number of existing motion candidates before adding the pairwise average motion candidate from motion candidate list size. That is to say, the pairwise average motion candidates may be added until the motion candidate list is full.
  iii. In one example, the pairwise candidates may be inserted after HMVP.
  iv. In one example, for the affine pairwise candidate, the average operation may be performed for each CPMV.
    (i) In one example, if the two affine candidates to derive an affine pairwise candidate have different affine models, the combination may be discarded.
    (ii) In one example, if the two affine candidates to derive an affine pairwise candidate have different affine models, the 6-parameter affine model may be degraded to 4-parameter affine model.

d. In one example, for the STMVP candidate, it may be generated by averaging predefined E spatial motion candidates and predefined G temporal motion candidates.
  i. In one example, E may be less than or equal to the number of spatial candidates (F) inserted into the current motion candidate list before STMVP.
  ii. In one example, the predefined E spatial motion candidates may be the first E spatial motion candidates among the F spatial candidates inserted into the current motion candidate list before STMVP.
    (i) Alternatively, the predefined E spatial motion candidates may be the selected E spatial motion candidates among the F spatial candidates inserted into the current motion candidate list before STMVP.
  iii. In one example, E is 2, G is 1.
  iv. In one example, STMVP may be inserted before the above-left spatial motion candidate.
  v. In one example, STMVP may be inserted after the pairwise candidate.
  vi. A STMVP candidate may be involved in the reordering process.
  vii. Alternatively, a STMVP candidate may not be involved in the reordering process.

e. In one example, the motion candidates may consist of
  i. In one example, the motion candidates may consist of adjacent spatial and/or HMVP and/or pairwise.
  ii. In one example, the motion candidates may consist of adjacent spatial and/or adjacent temporal and/or HMVP and/or pairwise.

iii. In one example, the motion candidates may consist of adjacent spatial and/or adjacent temporal and/or non-adjacent spatial and/or HMVP and/or pairwise.
iv. In one example, the motion candidates may consist of adjacent spatial and/or adjacent temporal and/or non-adjacent spatial and/or non-adjacent temporal and/or HMVP and/or pairwise.
v. In one example, the motion candidates may consist of adjacent spatial and/or non-adjacent spatial and/or HMVP and/or pairwise.
vi. In one example, the motion candidates may consist of adjacent spatial (STMVP may be inserted before the above-left spatial motion candidate) and/or adjacent temporal and/or non-adjacent spatial and/or HMVP and/or pairwise.
vii. In one example, the motion candidates may consist of adjacent spatial (STMVP may be inserted before the above-left spatial motion candidate) and/or adjacent temporal and/or non-adjacent spatial and/or non-adjacent temporal and/or HMVP and/or pairwise.
viii. In one example, the motion candidates may be inserted sequentially according to the motion candidate type.
ix. In one example, only if a motion candidate is not a duplicate of any previous motion candidate in the existing motion candidate list, it can be inserted into the motion candidate list.
(i) Alternatively, only if a motion candidate is not a duplicate of partial of the previous motion candidates in the existing motion candidate list, it can be inserted into the motion candidate list.
x. In one example, any other motion candidate type combination or any other motion candidate (type) inserting order are also supported.

f. In one example, the motion candidate list may be
i. In one example, the motion candidate list may be the TM merge/AMVP list after block-based bilateral matching refinement and/or template matching refinement and/or subblock-based bilateral matching refinement.
ii. In one example, the motion candidate list may be the regular merge/AMVP list after the DMVR/multi-pass DMVR process.
iii. In one example, the motion candidate list may be the ADMVR merge list after the DMVR/multi-pass DMVR process.
iv. In one example, the motion candidate list may be the GPM merge list after the template matching refinement process (e.g., AGPMList, LGPMList, or LAGPMList).
v. In one example, the motion candidate list may be the regular merge/AMVP list.
vi. In one example, the motion candidate list may be the TM merge/AMVP list.
vii. In one example, the motion candidate list may be the affine merge/AMVP list.
viii. In one example, the motion candidate list may be the IBC merge/AMVP list.
ix. In one example, the motion candidate list may be the ADMVR merge list
x. In one example, the motion candidate list may be the GPM merge list.
xi. In one example, the motion candidate list may be the TPM merge list.
xii. In one example, the motion candidate list may be the MMVD merge list.
xiii. In one example, the motion candidate list may be the IBC template matching candidate list.
xiv. In one example, the motion candidate list may be the intra template matching candidate list.
xv. In one example, the motion candidate list may be the IBC MMVD candidate list.
xvi. In one example, the motion candidate list may be the IBC GPM candidate list.
xvii. In one example, the motion candidate list may be the IBC TPM candidate list.
xviii. In one example, the motion candidate list may be any other motion candidate list.

3. Problems

The current design of motion candidate list can be further improved.

More motion candidate positions and/or more motion candidate types can be used to improve the coding efficiency.

4. Embodiments of the Present Disclosure

The detailed embodiments below should be considered as examples to explain general concepts. These embodiments should not be interpreted in a narrow way. Furthermore, these embodiments can be combined in any manner.

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

For an IBC coded block, a block vector (BV) is used to indicate the displacement from the current block to a reference block, which is already reconstructed inside the current picture.

W and H are the width and height of current block (e.g., luma block).

The non-adjacent spatial candidates of current coding block are adjacent spatial candidates of a virtual block in the ith search round (as shown in FIG. 9). The width and height of the virtual block for the ith search round are calculated by: $newWidth=i\times2\times gridX+W$, $newHeight=i\times2\times gridY+H$. Obviously, the virtual block is the current block if the search round i is 0.

In the following, a BV predictor also is a BV candidate. The skip mode also is the merge mode.

The motion candidates can be divided into several groups according to some criterions. Each group is called a subgroup. For example, we can take adjacent spatial and temporal motion candidates as a first subgroup and take the remaining motion candidates as a second subgroup; In another example, we can also take the first N ($N\geq2$) motion candidates as a first subgroup, take the following M ($M\geq2$) motion candidates as a second subgroup, and take the remaining motion candidates as a third subgroup.

For example, the motion candidates can be divided into several groups according to the motion candidate type.

A BV candidate may be determined to be valid when it meets one of or a combination of at least one of the following conditions.

1) The corresponding reference block is already reconstructed inside the current picture.
2) The corresponding reference block is located in the same CTU row as current block.
3) The corresponding reference block is located in the same tile/subpicture as current block.
4) The corresponding reference block is located in the same slice as current block.

5) The BV candidate satisfies the block vector constraints (e.g. which is described in 2.4.2 and 2.4.3)

6) The BV candidate satisfies the IBC virtual buffer conditions (e.g. which is described in 2.4.4).

A BV candidate may be determined to be invalid when it violates one of or a combination of at least one of the above conditions.

If CU at a temporal position is not available or is intra coded or is outside of the current row of CTUs or its BV (if has) is invalid for current block, the temporal position is treated as invalid; otherwise, the temporal position is treated as valid.

Note that the proposed methods may be applied to merge candidate list construction process for inter coded blocks (e.g., translational motion), affine coded blocks, TM coded blocks, GPM coded blocks, ADMVR coded block or IBC coded blocks; or other motion candidate list construction process (e.g., normal AMVP list; affine AMVP list; TM AMVP list; IBC AMVP list; HMVP table).

Note that the proposed methods may be applied to regular merge/AMVP candidate list after the DMVR/multi-pass DMVR process.

Note that the proposed methods may be applied to ADMVR merge candidate list after the DMVR/multi-pass DMVR process.

Note that the proposed methods may be applied to TM merge/AMVP candidate list after block-based bilateral matching refinement and/or template matching refinement and/or subblock-based bilateral matching refinement.

In the following, one motion candidate is a duplicate of another motion candidate may be defined as 1) The two motion candidates are totally the same in the reference directions, reference picture indices, affine model (for affine motion) and motion vectors or block vectors or partial or all CPMVs according to the motion type (inter or IBC or affine).

Or

2) The two motion candidates are totally the same in the reference directions, reference picture indices, affine model (for affine motion). But the difference of motion vectors or block vectors or partial or all CPMVs according to the motion type (inter or IBC or affine) of the two motion candidates may be within a threshold.

The difference of motion vectors may be defined as the absolute horizontal and/or vertical component of the motion vector difference of the two motion candidates in reference list 0 and/or reference list 1.

The difference of block vectors may be defined as the absolute horizontal and/or vertical component of the block vector difference of the two motion candidates in reference list 0.

The difference of one CPMV may be defined as the absolute horizontal and/or vertical component of the motion vector difference of this CPMV of the two motion candidates in reference list 0 and/or reference list 1.

The threshold may be adaptively set according to the coding mode of current block (e.g., TM merge, affine merge, regular merge, etc.), and/or current block size, and/or candidate type (e.g., adjacent spatial, adjacent temporal, non-adjacent spatial, non-adjacent temporal, HMVP, pairwise, or STMVP, etc.), and/or QP, and/or the reference index or the reference POC of current block, and/or other coding information of current block.

On Reordering of Motion Candidate List

1. In one example, when constructing a motion candidate list, a reordering/refined process may be performed.
   a. In one example, a motion candidate type based ARMC may be used to reorder the motion candidates in a candidate type according to one or some criterions.
      i. In one example, M candidates with a specific candidate type may be selected out of the reordered candidates in the candidate type when constructing the motion candidate list, where M may vary depending on candidate types and/or coding mode of current block.
      ii. In one example, the candidate type may be adjacent spatial candidates. For an example, M is 4.
      iii. In one example, the candidate type may be adjacent temporal candidates. For an example, M is 1.
      iv. In one example, the candidate type may be non-adjacent spatial candidates. For an example, M is 3.
      v. In one example, the candidate type may be non-adjacent temporal candidates. For an example, M is 1.
      vi. In one example, the candidate type may be HMVP candidates. For an example, M is 2.
      vii. In one example, the candidate type may be pairwise average candidates. For an example, M is 2.
      viii. In one example, the candidate type may be STMVP candidates. For an example, M is 1.
      ix. In one example, the candidate type may be adjacent inherited affine candidates.
      x. In one example, the candidate type may be adjacent constructed affine candidates.
      xi. In one example, the candidate type may be non-adjacent inherited affine candidates.
      xii. In one example, the candidate type may be non-adjacent constructed affine candidates.
      xiii. In one example, the candidate type may be history-based affine candidates.
      xiv. In one example, multiple motion candidate types (i.e., candidate type combination) may be reordered together.
         (i) In one example, M candidates with any of the specific motion candidate types may be selected out of the reordered candidates in the candidate type combination when constructing the motion candidate list, where M may vary depending on candidate type combinations and/or coding mode of current block.
         (ii) In one example, adjacent spatial candidates and/or HMVP candidates and/or pairwise average candidates may be reordered together.
         (iii) In one example, the adjacent spatial candidates and the adjacent temporal candidates may be reordered together.
         (iv) In one example, the non-adjacent spatial candidates and the non-adjacent temporal candidates may be reordered together.
         (v) In one example, the non-adjacent spatial candidates and/or the non-adjacent temporal candidates and/or HMVP candidates may be reordered together.
         (vi) In one example, the non-adjacent spatial candidates and/or the non-adjacent temporal candidates and/or HMVP candidates and/or pairwise average candidates may be reordered together.

(vii) In one example, the adjacent inherited affine candidates and the adjacent constructed affine candidates may be reordered together.

(viii) In one example, the non-adjacent inherited affine candidates and the non-adjacent constructed affine candidates may be reordered together.

(ix) In one example, the non-adjacent inherited affine candidates and/or the non-adjacent constructed affine candidates and/or HMVP affine candidates may be reordered together.

(x) In one example, the non-adjacent inherited affine candidates and/or the non-adjacent constructed affine candidates and/or HMVP affine candidates and/or pairwise average affine candidates may be reordered together.

(xi) In one example, the adjacent inherited affine candidates and the non-adjacent inherited affine candidates may be reordered together.

(xii) In one example, the adjacent constructed affine candidates and the non-adjacent constructed affine candidates may be reordered together.

b. In one example, the motion candidate list may be i. In one example, the motion candidate list may be the TM merge/AMVP list after block-based bilateral matching refinement and/or template matching refinement and/or subblock-based bilateral matching refinement.

ii. In one example, the motion candidate list may be the regular merge/AMVP list after the DMVR/multi-pass DMVR process.

iii. In one example, the motion candidate list may be the ADMVR merge list after the DMVR/multi-pass DMVR process.

iv. In one example, the motion candidate list may be the GPM merge list after the template matching refinement process (e.g., AGPMList, LGPMList, or LAGPMList).

v. In one example, the motion candidate list may be the regular merge/AMVP list.

vi. In one example, the motion candidate list may be the TM merge/AMVP list.

vii. In one example, the motion candidate list may be the affine merge/AMVP list.

viii. In one example, the motion candidate list may be the IBC merge/AMVP list.

ix. In one example, the motion candidate list may be the ADMVR merge list x. In one example, the motion candidate list may be the GPM merge list.

xi. In one example, the motion candidate list may be the TPM merge list.

xii. In one example, the motion candidate list may be the MMVD merge list.

xiii. In one example, the motion candidate list may be the IBC template matching candidate list.

xiv. In one example, the motion candidate list may be the intra template matching candidate list.

xv. In one example, the motion candidate list may be the IBC MMVD candidate list.

xvi. In one example, the motion candidate list may be the IBC GPM candidate list.

xvii. In one example, the motion candidate list may be the IBC TPM candidate list.

xviii. In one example, the motion candidate list may be any other motion candidate list.

2. In one example, an initial motion candidate list may be firstly derived, followed by a reordering/refined process according to one or some criterions. And the reordered/refined list is utilized in the coding/decoding process of a block.

a. In one example, the motion candidate list may be i. In one example, the motion candidate list may be the TM merge/AMVP list after block-based bilateral matching refinement and/or template matching refinement and/or subblock-based bilateral matching refinement.

ii. In one example, the motion candidate list may be the regular merge/AMVP list after the DMVR/multi-pass DMVR process.

iii. In one example, the motion candidate list may be the ADMVR merge list after the DMVR/multi-pass DMVR process.

iv. In one example, the motion candidate list may be the GPM merge list after the template matching refinement process (e.g., AGPMList, LGPMList, or LAGPMList).

v. In one example, the motion candidate list may be the regular merge/AMVP list.

vi. In one example, the motion candidate list may be the TM merge/AMVP list.

vii. In one example, the motion candidate list may be the affine merge/AMVP list.

viii. In one example, the motion candidate list may be the IBC merge/AMVP list.

ix. In one example, the motion candidate list may be the ADMVR merge list x. In one example, the motion candidate list may be the GPM merge list.

xi. In one example, the motion candidate list may be the TPM merge list.

xii. In one example, the motion candidate list may be the MMVD merge list.

xiii. In one example, the motion candidate list may be the IBC template matching candidate list.

xiv. In one example, the motion candidate list may be the intra template matching candidate list.

xv. In one example, the motion candidate list may be the IBC MMVD candidate list.

xvi. In one example, the motion candidate list may be the IBC GPM candidate list.

xvii. In one example, the motion candidate list may be the IBC TPM candidate list.

xviii. In one example, the motion candidate list may be any other motion candidate list.

On reordering criterion of motion candidate list

3. In one example, the reordering/refined process may be based on template matching cost.

a. Alternatively, the reordering/refined process may be based on bilateral matching cost.

b. In one example, the cost function between current template and reference template may be i. SAD/MR-SAD ii. SATD/MR-SATD iii. SSD/MR-SSD iv. SSE/MR-SSE v. Weighted SAD/weighted MR-SAD vi. Weighted SATD/weighted MR-SATD vii. Weighted SSD/weighted MR-SSD viii. Weighted SSE/weighted MR-SSE ix. Gradient information c. In one example, the current template and reference template may consist of samples in the mapped domain if LMCS is enabled.

i. Alternatively, the current template and reference template may consist of samples in the original domain.

d. In one example, motion candidates may be divided into several subgroups and motion candidates in each subgroup may be reordered ascendingly according to cost values based on template/bilateral matching.

e. In one example, the samples of a template may be selected based on a rule.

i. In one example, if only above template is available for current block, the template matching reorder can only use the above template.

ii. In one example, if only left template is available for current block, the template matching reorder can only use the left template.

iii. In one example, if both above and left templates are available for current block, the template matching reorder can use the left template, the above template, or both above and left templates.

f. In one example, the template/bilateral matching procedure may comprise one component such as luma.

i. Alternatively, the template/bilateral matching procedure may comprise multiple components such as luma and chroma.

(i) In one example, the total template/bilateral matching cost may be calculated as a weighted sum of template/bilateral matching costs on different color components.

g. In one example, the width of the left template and/or the height of the above template may be fixed.

i. In one example, the width of the left template may be 1.

ii. In one example, the height of the above template may be 1.

h. In one example, for the BV candidate, some operations need to be performed.

i. The reordering/processing methods may be different for MV candidates and BV candidates.

ii. In one example, the BV for locating the reference template may be clipped.

(i) In one example, if the reference template is outside the current picture (as shown in FIG. 33*a*), the BV for locating the reference template may be clipped to make the reference template locating inside the current picture. The clip operation will not change the BV of the corresponding BV candidate. An example is shown in FIG. 33*b*.

iii. In one example, if the reference template is outside the current picture (as shown in FIG. 33*a*), the corresponding BV candidate can still be reordered.

(i) In one example, if the reference template is outside the current picture, it can be padded from the nearest samples inside the current picture.

iv. In one example, the reference template should be already reconstructed inside the current picture.

(i) In one example, if the reference template is not reconstructed or outside the current picture, the corresponding BV candidate may be not reordered.

v. In one example, the samples included in the reference template should be available (e.g., being reconstructed and within the same slice/tile/IBC virtual buffer).

(i) Alternatively, furthermore, if some or all samples included in the reference template are unavailable, the above methods that handle reference template outside current picture may be applied.

4. The template shape and/or size may be adaptive.

a. In one example, the template may only comprise neighboring samples left to the current block.

b. In one example, the template may only comprise neighboring samples above to the current block.

c. In one example, the template shape and/or size may be selected according to the CU shape and/or size.

d. In one example, the width of the left template may be selected according to the CU height.

i. For example, if $H<=M$, then the left template size is $w1\times H$; otherwise, the left template size is $w2\times H$.

(i) In one example, M, w1, and w2 are set equal to 8, 1, and 2, respectively.

e. In one example, the height of the above template may be selected according to the CU width.

i. For example, if $W<=N$, then the above template size is $W\times h1$; otherwise, the above template size is $W\times h2$.

(i) In one example, N, h1, and h2 are set equal to 8, 1, and 2, respectively.

f. In one example, the width of the left template may be selected according to the CU width.

i. For example, if $W<=N$, then the left template size is $w1\times H$; otherwise, the left template size is $w2\times H$.

(i) In one example, N, w1, and w2 are set equal to 8, 1, and 2, respectively.

g. In one example, the height of the above template may be selected according to the CU height.

i. For example, if $H<=M$, then the above template size is $W\times h1$; otherwise, the above template size is $W\times h2$.

(i) In one example, M, h1, and h2 are set equal to 8, 1, and 2, respectively.

h. In one example, samples of the template and the reference samples of the template samples may be subsampled or downsampled before being used to calculate the cost.

i. Whether to and/or how to do subsampling may depend on the CU dimensions.

ii. In one example, no subsampling may be performed for the short side of the CU.

5. In one example, the reordering/refined process may be based on block boundary discontinuity measure.

a. In one example, the boundary discontinuity measure (e.g., disCost) may be defined as:

$$disCost = \sum_{x=0}^{W} (w1 \times |2P_{x,1} - P_{x,2} - R_{x,0}| + w2 \times |2R_{x,0} - P_{x,1} - R_{x,-1}|) +$$

-continued $$\sum_{y=0}^{H} |w3\times|2P_{1,y}-P_{2,y}-R_{0,y}|+w4\times|2R_{0,y}-P_{1,y}-R_{-1,y}||$$

wherein the P is the prediction of current block and R is the reconstructed samples in the neighboring block. An example is shown in FIG. 48.

i. In one example, w1 is 0 and w3 is 0. w2 is 1 and w4 is 1.

ii. In one example, w1=w2=w3=w4=1.

6. In one example, the reordering/refined process may be based on block boundary discontinuity measure (e.g., disCost) and/or template matching cost (e.g., tmCost).

a. In one example, the reordering/refined process may be based on the weighted average of block boundary discontinuity measure (e.g., disCost) and template matching cost (e.g., tmCost) which may be calculated as $w_{dis}$×disCost+$w_{tm}$×tmCost.

i. In one example, $w_{dis}$ and $w_{tm}$ may be pre-defined, or signaled, or derived according to coding information.

ii. In one example, $w_{dis}$ may be dependent on QP.

(i) In one example, $w_{dis}$ may be set to a smaller value for a higher QP.

b. In one example, one flag may be signaled to indicate whether block boundary discontinuity measure or template matching cost is used.

c. In one example, whether block boundary discontinuity measure or template matching cost is used may be dependent on the coding/decoding information.

i. In one example, for a QP larger than a predefined threshold, the template matching cost may be used.

Embodiments of the present disclosure are related to motion candidate list reordering.

As used herein, the term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular. For an IBC coded block, a block vector (BV) is used to indicate the displacement from the current block to a reference block, which is already reconstructed inside the current picture. Note that embodiments of the present disclosure may be applied to merge candidate list construction process for inter coded blocks (e.g., translational motion), affine coded blocks, TM coded blocks, GPM coded blocks, or IBC coded blocks; or other motion candidate list construction process (e.g., normal AMVP list; affine AMVP list; IBC AMVP list; HMVP table).

Figure 49:
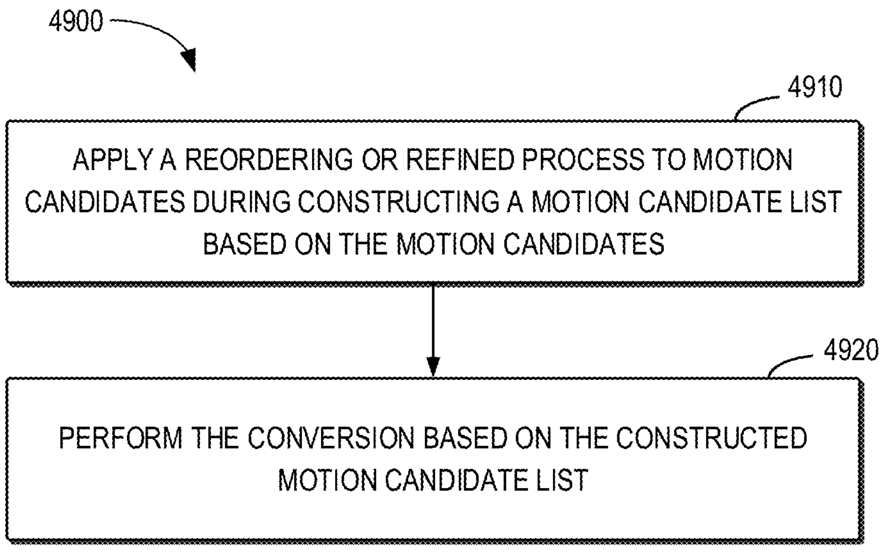
FIG. 49 illustrates a flow chart of a method according to embodiments of the present disclosure.

FIG. 49 illustrates a flowchart of a method 4900 for video processing in accordance with some embodiments of the present disclosure. The method 4900 may be implemented during a conversion between a video unit and a bitstream of the video unit.

As shown in FIG. 49, at block 4910, during a conversion between a target block of a video and a bitstream of the target block, a reordering or refined process is applied to motion candidates during constructing a motion candidate list based on the motion candidates. In one example, when constructing a motion candidate list, a reordering/refined process may be performed.

At block 4920, the conversion is performed based on the constructed motion candidate list. Compared with conventional technologies, a reordering of motion candidates can be improved. Furthermore, coding efficiency can be improved.

In some embodiments, a motion candidate type based adaptive reordering of merge candidates (ARMC) may be used to reorder the motion candidates in a candidate type according to at least one criterion. In some embodiments, M motion candidates with a specific candidate type are selected from the reordered motion candidates in the candidate type during constructing the motion candidate list. In some embodiments, M may be an integer number. In some other embodiments, M may depend on at least one of: the candidate type, or a coding mode of the target block.

In some embodiments, the candidate type is an adjacent spatial candidate type. In this case, in some embodiments, M is 4. In some embodiments, the candidate type is an adjacent temporal candidate type. In this case, in some embodiments, M is 1. In some embodiments, the candidate type is a non-adjacent spatial candidate type. In this case, in some embodiments, M is 3. In some embodiments, the candidate type is a non-adjacent temporal candidate type. In this case, in some embodiments, M is 1. In some embodiments, the candidate type is a history-based motion vector prediction (HMVP) candidate type. In this case, in some embodiments, M is 2. In some embodiments, the candidate type is a pairwise average candidate type. In this case, in some embodiments, M is 2. In some embodiments, the candidate type is a subblock-based temporal motion vector prediction (STMVP) candidate type. In this case, in some embodiments, M is 1.

In some embodiments, the candidate type may be at least one of: an adjacent inherited affine candidate type, an adjacent constructed affine candidate type, a non-adjacent inherited affine candidate type, a non-adjacent constructed affine candidate type, or a history-based affine candidate.

In some embodiments, motion candidates with a plurality of motion candidate types are reordered together. In one example, multiple motion candidate types (i.e., candidate type combination) may be reordered together.

In some embodiments, M motion candidates with any of the specific plurality of motion candidate types are selected from the reordered motion candidates during constructing the motion candidate list, where M is an integer number. In some embodiments, M may depend on at least one of: the plurality of motion candidates types, or a coding mode of the target block.

In some embodiments, at least one of the followings may be reordered together: a set of adjacent spatial candidates, a set of HMVP candidates, or a set of pairwise average candidates. In some embodiments, a set of adjacent spatial candidates and a set of adjacent temporal candidates may be reordered together. In some embodiments, a set of non-adjacent spatial candidates and a set of non-adjacent temporal candidates are reordered together.

In some embodiments, at least one of the followings may be reordered together: a set of non-adjacent spatial candidates, a set of non-adjacent temporal candidates, or a set of HMVP candidates. In some embodiments, at least one of the followings may be reordered together: a set of non-adjacent spatial candidates, a set of non-adjacent temporal candidates, a set of HMVP candidates, or a set of pairwise average candidates. In some embodiments, a set of adjacent inherited affine candidates and a set of adjacent constructed affine candidates may be reordered together.

In some embodiments, a set of non-adjacent inherited affine candidates and a set of non-adjacent constructed affine candidates may be reordered together. In some embodiments, at least one of the followings may be reordered together: a set of non-adjacent inherited affine candidates, a set of non-adjacent constructed affine candidates, or a set of HMVP affine candidates.

In some embodiments, at least one of the followings may be reordered together: a set of non-adjacent inherited affine candidates, a set of non-adjacent constructed affine candidates, a set of HMVP affine candidates, or a set of pairwise average affine candidates.

In some embodiments, a set of adjacent inherited affine candidates and a set of non-adjacent inherited affine candidates may be reordered together. In some embodiments, a set of adjacent constructed affine candidates and a set of non-adjacent constructed affine candidates may be reordered together.

In some embodiments, the motion candidate list comprises at least one of: a template matching (TM) merge list after at least one of: a block-based bilateral matching refinement, a template matching refinement, or a subblock-based bilateral matching refinement, a TM advanced motion vector prediction (AMVP) list after at least one of: the block-based bilateral matching refinement, the template matching refinement, or the subblock-based bilateral matching refinement, a regular merge list after a decoder-side motion vector refinement (DMVR) process or a multi-pass DMVR process, a regular AMVP list after the DMVR process or the multi-pass DMVR process, an adaptive decoder side motion vector refinement (ADMVR) merge list after the DMVR process or the multi-pass DMVR process, a geometric partitioning mode (GPM) merge list after a template matching refinement process (for example, AGPMList, LGPMList, or LAGPMList), a regular merge list, a regular AMVP list, a TM merge list, a TM AMVP list, an affine merge list, an affine AMVP list, an intra block copy (IBC) merge list, an IBC AMVP list, an ADMVR merge list, a GPM merge list, a triangle partition mode (TPM) list, a merge mode with motion vector difference (MMVD) merge list, an IBC template matching candidate list, an intra template matching candidate list, an IBC merge mode with block vector difference (MBVD) candidate list, an IBC GPM candidate list, an IBC TPM candidate list, or a specific motion candidate list.

In some embodiments, the reordering or refined process may be based on at least one of: a template matching cost, a bilateral matching cost, or a block boundary discontinuity measure.

In some embodiments, a cost function between a current template and a reference template is at least one of: a sum of absolute differences (SAD), a mean removal sum of absolute difference (MR-SAD), a sum of absolute transformed differences (SATD), a mean removal sum of absolute transformed differences (MR-SATD), a sum of squared differences (SSD), a mean removal sum of squared differences (MR-SSD), a sum of squared errors (SSE), a mean removal sum of squared errors (MR-SSE), a weighted SAD, a weighted MR-SAD, a weighted SATD, a weighted MR-SATD, a weighted SSD, a weighted MR-SSD, a weighted SSE, a weighted MR-SSE, or gradient information.

In some embodiments, the current template and the reference template may comprise a set of samples in a mapped domain if luma mapping with chroma scaling (LMCS) is enabled. In some embodiments, the current template and the reference template may comprise a set of samples in an original domain.

In some embodiments, motion candidates are divided into a plurality of subgroups, and motion candidates in each subgroup are reordered ascendingly according to a cost value based on a template matching or a bilateral matching. In one example, motion candidates may be divided into several subgroups and motion candidates in each subgroup may be reordered ascendingly according to cost values based on template/bilateral matching.

In some embodiments, a set of samples of a template may be selected based on a rule. In some embodiments, if only above template is available for the target block, a template matching reorder uses the above template. In some embodiments, if only left template is available for the target block, a template matching reorder uses the left template. In some embodiments, if both above and left templates are available for the target block, a template matching reorder uses at least one of: the above template or the left template.

In some embodiments, a template matching procedure or a bilateral matching procedure comprises one component. For example, the component may comprise a luma component.

In some embodiments, a template matching procedure or a bilateral matching procedure comprises a plurality of components. For example, the plurality of components may comprise a luma component and one or two chroma components.

In some embodiments, a total template matching cost may be determined as a weighted sum of template matching costs on different color components. Alternatively, a total bilateral matching cost may be determined as a weighted sum of bilateral matching costs on different color components.

In some embodiments, a width of a left template is fixed. For example, the width of the left template may be 1. In some embodiments, a height of an above template is fixed. For example, the height of the above template may be 1.

In some embodiments, for a block vector (BV) candidate, a set of operations may be performed. In some embodiments, the reordering or refined process may be different for a motion vector (MV) candidate and the BV candidate.

In some embodiments, a BV for locating a reference template may be clipped. In some embodiments, if the reference template is outside a current picture associated with the target block (for example, as shown in FIG. 33*a*), a clipping operation may be applied to the BV for locating the reference template to make the reference template locating inside the current picture. In some embodiments, the BV of corresponding BV candidate is not changed by the clipping operation. The clip operation may not change the BV of the corresponding BV candidate. An example is shown in FIG. 33*b*.

In some embodiments, if a reference template is outside a current picture associated with the target block, a corresponding BV candidate may be reordered. In some embodiments, if the reference template is outside the current picture, the unavailable reference template samples are padded from their corresponding nearest samples inside the current picture. In one example, if the reference template is outside the current picture, it can be padded from the nearest samples inside the current picture.

In some embodiments, a reference template may have already reconstructed inside a current picture associated with the target block. In some embodiments, if a reference template is not reconstructed or outside a current picture associated with the target block, a corresponding BV candidate may not be reordered.

In some embodiments, a set of samples included in a reference template may be available. In one example, the samples included in the reference template may be available (e.g., being reconstructed and within the same slice/tile/IBC virtual buffer). The reference template are available may means that all the reference template samples are reconstructed and within at least one of the same slice, same tile, or same IBC virtual buffer.

In some embodiments, if at least a portion of samples included in a reference template are unavailable, an operation of handling the reference template outside a current picture associated with the target may be is applied. The operation may comprise at least one of: a clipping operation is applied to the BV for locating the reference template to make all the reference template samples available, or padding the unavailable reference template samples from their corresponding available nearest samples. In some embodiments, if some or all samples included in the reference template are unavailable, the above methods that handle reference template outside current picture may be applied.

In some embodiments, the boundary discontinuity measure may be determined as:

$$disCost = \sum_{x=0}^{W} (w1 \times |2P_{x,1} - P_{x,2} - R_{x,0}| + w2 \times |2R_{x,0} - P_{x,1} - R_{x,-1}|) + \sum_{y=0}^{H} |w3 \times |2P_{1,y} - P_{2,y} - R_{0,y}| + w4 \times |2R_{0,y} - P_{1,y} - R_{-1,y}||,$$

where P represents a prediction of the target block, R represents a reconstructed sample in a neighbor block, W represents a width of the target block, and H represents a height of the target bloc, w represents a weight factor, and x and y present variants. In some embodiments, $w_1$ is 0, $w_3$ is 0, $w_2$ is 1 and $w_4$ is 1. In some embodiments, $w_1$ is 1, $w_3$ is 1, $w_2$ is 1 and $w_4$ is 1.

In some embodiments, the reordering or refined process may be based on a weighted average of the block boundary discontinuity measure and the template matching cost. In some embodiments, the weighted average of the block boundary discontinuity measure and the template matching cost may be determined as: $w_{dis}$×disCost+$w_{tm}$×tmCost, where $w_{dis}$ represents a weight factor for the block boundary discontinuity measure, disCost represents the block boundary discontinuity measure, $w_{tm}$ represents a weight factor for the template matching cost, and tmCost represents the template matching cost.

In some embodiments, $w_{dis}$ and $w_{tm}$ may be predefined. In some embodiments, $w_{dis}$ and $w_{tm}$ may be indicated. In some embodiments, $w_{dis}$ and $w_{tm}$ may be derived according to coding information.

In some embodiments, $w_{dis}$ may be dependent on quantization parameter (QP). In some embodiments, $w_{dis}$ for a higher QP may be smaller than that of a smaller QP. In one example, $w_{dis}$ may be set to a smaller value for a higher QP.

In some embodiments, a flag may be indicated for indicating whether the block boundary discontinuity measure or the template matching cost is used. In some embodiments, whether the block boundary discontinuity measure or the template matching cost is used may be dependent on coding information or decoding information. In some embodiments, if a QP is higher than a predefined threshold, the template matching cost may be used.

In some embodiments, at least one of the followings may be adaptive: a template shape of a template, or a template size of the template.

In some embodiments, the template comprises a set of neighboring samples left to the target block. In some embodiments, the template comprises a set of neighboring samples above to the target block. In some embodiments, the template shape is selected according to a coding unit (CU) shape or a CU size. In some embodiments, the template size is selected according to a CU shape or a CU size.

In some embodiments, a width of a left template is selected according to a CU height. In some embodiments, if the CU height is not larger than a threshold, the width of the left template is w1. If the CU height is larger than the threshold, the width of the left template may be w2. In this case, in some embodiments, the height of the left template is equal to the CU height. In some embodiments, the threshold is 8, the w1 is 1 and w2 is 2.

In some embodiments, a height of an above template may be selected according to a CU width. In some embodiments, if the CU width is not larger than a threshold, the height of the above template is h1. In some embodiments, if the CU width is larger than the threshold, the height of the above template may be h2. In this case, in some embodiments, the width of the above template is equal to the CU width. In some embodiments, the h1 is 1 and h2 is 2.

In some embodiments, a width of a left template may be selected according to a CU width. In some embodiments, if the CU width is not larger than a threshold, the width of the left template may be w1. In some embodiments, if the CU width is larger than the threshold, the width of the left template may be w2. In some embodiments, the height of the left template is equal to the CU height. In some embodiments, the threshold is 8, the w1 is 1 and w2 is 2.

In some embodiments, a height of an above template may be selected according to a CU height. In some embodiments, if the CU height is not larger than a threshold, the height of the above template is h1. In some embodiments, if the CU height is larger than the threshold, the height of the above template is h2. In some embodiments, the width of the above template is equal to the CU width. In some embodiments, the threshold is 8, h1 is 1 and h2 is 2.

In some embodiments, samples of the template may be subsampled or down sampled before being used to determine a template matching cost. In some embodiments, reference samples of template samples may be subsampled or down sampled before being used to determine a template matching cost.

In some embodiments, whether to and/or how to subsample may be dependent on CU dimensions. In some embodiments, no subsampling is performed for a short side of a CU.

In some embodiments, a non-transitory computer-readable recording medium stores a bitstream of a video which is generated by a method performed by a video processing apparatus. The method comprises: applying a reordering or refined process to motion candidates during constructing a motion candidate list for a target block of the video based on the motion candidates; and generating a bitstream of the target block based on the constructed motion candidate list.

In some embodiments, a method for storing bitstream of a video, comprises: applying a reordering or refined process to motion candidates during constructing a motion candidate list for a target block of the video based on the motion candidates; generating a bitstream of the target block based on the constructed motion candidate list; and storing the bitstream in a non-transitory computer-readable recording medium.

Figure 50:
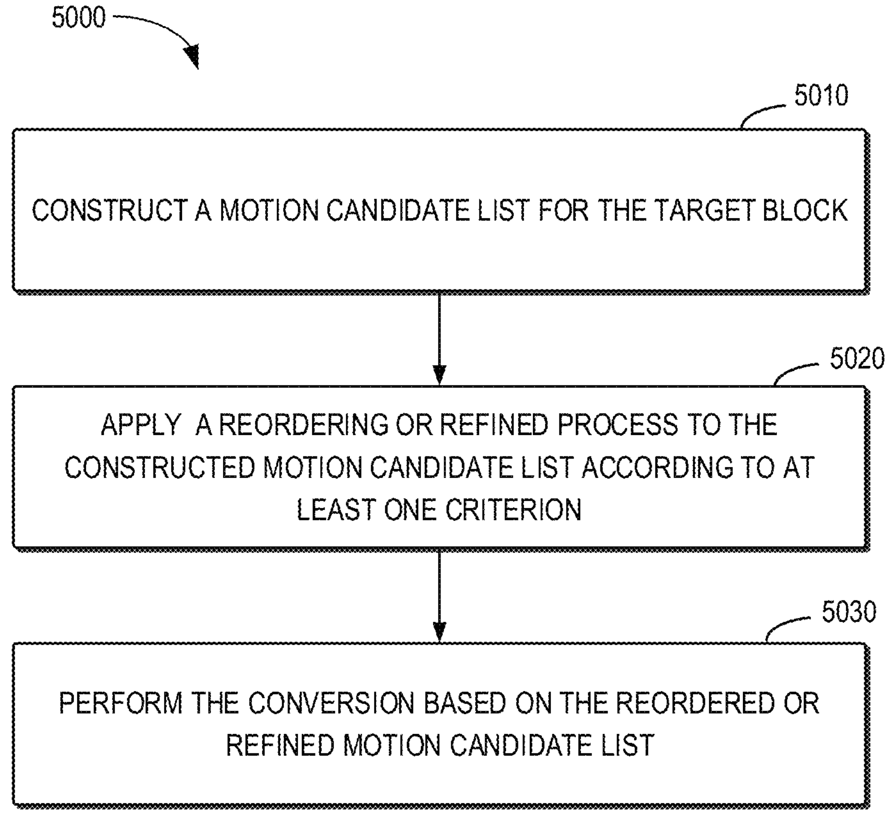
FIG. 50 illustrates a flow chart of a method according to embodiments of the present disclosure.

FIG. 50 illustrates a flowchart of a method 5000 for video processing in accordance with some embodiments of the present disclosure. The method 5000 may be implemented during a conversion between a video unit and a bitstream of the video unit.

As shown in FIG. 50, at block 5010, during a conversion between a target block of a video and a bitstream of the target block, a motion candidate list for the target block is constructed. For example, an initial motion candidate list may be derived for the target block.

At block 5020, a reordering or refined process is applied to the constructed motion candidate list according to at least one criterion. In one example, an initial motion candidate list may be firstly derived, followed by a reordering/refined process according to one or some criterions.

At block 5030, the conversion is performed based on the reordered or refined motion candidate list. The reordered/refined list may be utilized in the coding/decoding process of a block. Compared with conventional technologies, a reordering of motion candidates can be improved. Furthermore, coding efficiency can be improved.

In one example, the motion candidate list may be the TM merge/AMVP list after block-based bilateral matching refinement and/or template matching refinement and/or sub-block-based bilateral matching refinement.

In one example, the motion candidate list may be the regular merge/AMVP list after the DMVR/multi-pass DMVR process. In one example, the motion candidate list may be the ADMVR merge list after the DMVR/multi-pass DMVR process. In one example, the motion candidate list may be the GPM merge list after the template matching refinement process (e.g., AGPMList, LGPMList, or LAGPMList). In one example, the motion candidate list may be the regular merge/AMVP list. In one example, the motion candidate list may be the TM merge/AMVP list. In one example, the motion candidate list may be the affine merge/AMVP list. In one example, the motion candidate list may be the IBC merge/AMVP list. In one example, the motion candidate list may be the ADMVR merge list. In one example, the motion candidate list may be the GPM merge list. In one example, the motion candidate list may be the TPM merge list. In one example, the motion candidate list may be the MMVD merge list. In one example, the motion candidate list may be the IBC template matching candidate list. In one example, the motion candidate list may be the intra template matching candidate list. In one example, the motion candidate list may be the IBC merge mode with block vector difference (MBVD) candidate list. In one example, the motion candidate list may be the IBC GPM candidate list. In one example, the motion candidate list may be the IBC TPM candidate list. In one example, the motion candidate list may be any other motion candidate list.

In some embodiments, the reordering or refined process may be based on at least one of: a template matching cost, a bilateral matching cost, or a block boundary discontinuity measure.

In some embodiments, a cost function between a current template and a reference template is at least one of: a sum of absolute differences (SAD), a mean removal sum of absolute difference (MR-SAD), a sum of absolute transformed differences (SATD), a mean removal sum of absolute transformed differences (MR-SATD), a sum of squared differences (SSD), a mean removal sum of squared differences (MR-SSD), a sum of squared errors (SSE), a mean removal sum of squared errors (MR-SSE), a weighted SAD, a weighted MR-SAD, a weighted SATD, a weighted MR-SATD, a weighted SSD, a weighted MR-SSD, a weighted SSE, a weighted MR-SSE, or gradient information.

In some embodiments, the current template and the reference template may comprise a set of samples in a mapped domain if luma mapping with chroma scaling (LMCS) is enabled. In some embodiments, the current template and the reference template may comprise a set of samples in an original domain.

In some embodiments, motion candidates are divided into a plurality of subgroups, and motion candidates in each subgroup are reordered ascendingly according to a cost value based on a template matching or a bilateral matching. In one example, motion candidates may be divided into several subgroups and motion candidates in each subgroup may be reordered ascendingly according to cost values based on template/bilateral matching.

In some embodiments, a set of samples of a template may be selected based on a rule. In some embodiments, if only above template is available for the target block, a template matching reorder uses the above template. In some embodiments, if only left template is available for the target block, a template matching reorder uses the left template. In some embodiments, if both above and left templates are available for the target block, a template matching reorder uses at least one of: the above template or the left template.

In some embodiments, a template matching procedure or a bilateral matching procedure comprises one component. For example, the component may comprise a luma component.

In some embodiments, a template matching procedure or a bilateral matching procedure comprises a plurality of components. For example, the plurality of components may comprise a luma component and one or two chroma components.

In some embodiments, a total template matching cost may be determined as a weighted sum of template matching costs on different color components. Alternatively, a total bilateral matching cost may be determined as a weighted sum of bilateral matching costs on different color components.

In some embodiments, a width of a left template is fixed. For example, the width of the left template may be 1. In some embodiments, a height of an above template is fixed. For example, the height of the above template may be 1.

In some embodiments, for a block vector (BV) candidate, a set of operations may be performed. In some embodiments, the reordering or refined process may be different for a motion vector (MV) candidate and the BV candidate.

In some embodiments, a BV for locating a reference template may be clipped. In some embodiments, if the reference template is outside a current picture associated with the target block (for example, as shown in FIG. 33*a*), a clipping operation may be applied to the BV for locating the reference template to make the reference template locating inside the current picture. In some embodiments, the BV of corresponding BV candidate is not changed by the clipping operation. The clip operation may not change the BV of the corresponding BV candidate. An example is shown in FIG. 33*b*.

In some embodiments, if a reference template is outside a current picture associated with the target block, a corresponding BV candidate may be reordered. In some embodiments, if the reference template is outside the current picture, the unavailable reference template samples are padded from their corresponding nearest samples inside the current picture. In one example, if the reference template is outside the current picture, it can be padded from the nearest samples inside the current picture.

In some embodiments, a reference template may have already reconstructed inside a current picture associated with the target block. In some embodiments, if a reference template is not reconstructed or outside a current picture associated with the target block, a corresponding BV candidate may not be reordered.

In some embodiments, a set of samples included in a reference template may be available. In one example, the samples included in the reference template may be available (e.g., being reconstructed and within the same slice/tile/IBC virtual buffer). The reference template are available may means that all the reference template samples are reconstructed and within at least one of the same slice, same tile, or same IBC virtual buffer.

In some embodiments, if at least a portion of samples included in a reference template are unavailable, an operation of handling the reference template outside a current picture associated with the target may be is applied. The operation may comprise at least one of: a clipping operation is applied to the BV for locating the reference template to make all the reference template samples available, or padding the unavailable reference template samples from their corresponding available nearest samples. In some embodiments, if some or all samples included in the reference template are unavailable, the above methods that handle reference template outside current picture may be applied.

In some embodiments, the boundary discontinuity measure may be determined as:

$$disCost = \sum_{x=0}^{W} (w1 \times |2P_{x,1} - P_{x,2} - R_{x,0}| + w2 \times |2R_{x,0} - P_{x,1} - R_{x,-1}|) + \sum_{y=0}^{H} |w3 \times |2P_{1,y} - P_{2,y} - R_{0,y}| + w4 \times |2R_{0,y} - P_{1,y} - R_{-1,y}||,$$

where P represents a prediction of the target block, R represents a reconstructed sample in a neighbor block, W represents a width of the target block, and H represents a height of the target bloc, w represents a weight factor, and x and y present variants. In some embodiments, $w_1$ is 0, $w_3$ is 0, $w_2$ is 1 and $w_4$ is 1. In some embodiments, $w_1$ is 1, $w_3$ is 1, $w_2$ is 1 and $w_4$ is 1.

In some embodiments, the reordering or refined process may be based on a weighted average of the block boundary discontinuity measure and the template matching cost. In some embodiments, the weighted average of the block boundary discontinuity measure and the template matching cost may be determined as: $w_{dis} \times disCost + w_{tm} \times tmCost$, where $w_{dis}$ represents a weight factor for the block boundary discontinuity measure, disCost represents the block boundary discontinuity measure, $w_{tm}$ represents a weight factor for the template matching cost, and tmCost represents the template matching cost.

In some embodiments, $W_{dis}$ and $W_{tm}$ may be predefined. In some embodiments, $w_{dis}$ and $w_{tm}$ may be indicated. In some embodiments, $w_{dis}$ and $w_{tm}$ may be derived according to coding information.

In some embodiments, $w_{dis}$ may be dependent on quantization parameter (QP). In some embodiments, $w_{dis}$ for a higher QP may be smaller than that of a smaller QP. In one example, $w_{dis}$ may be set to a smaller value for a higher QP.

In some embodiments, a flag may be indicated for indicating whether the block boundary discontinuity measure or the template matching cost is used. In some embodiments, whether the block boundary discontinuity measure or the template matching cost is used may be dependent on coding information or decoding information. In some embodiments, if a QP is higher than a predefined threshold, the template matching cost may be used.

In some embodiments, at least one of the followings may be adaptive: a template shape of a template, or a template size of the template.

In some embodiments, the template comprises a set of neighboring samples left to the target block. In some embodiments, the template comprises a set of neighboring samples above to the target block. In some embodiments, the template shape is selected according to a coding unit (CU) shape or a CU size. In some embodiments, the template size is selected according to a CU shape or a CU size.

In some embodiments, a width of a left template is selected according to a CU height. In some embodiments, if the CU height is not larger than a threshold, the width of the left template is w1. If the CU height is larger than the threshold, the width of the left template may be w2. In this case, in some embodiments, the height of the left template is equal to the CU height. In some embodiments, the threshold is 8, the w1 is 1 and w2 is 2.

In some embodiments, a height of an above template may be selected according to a CU width. In some embodiments, if the CU width is not larger than a threshold, the height of the above template is h1. In some embodiments, if the CU width is larger than the threshold, the height of the above template may be h2. In this case, in some embodiments, the width of the above template is equal to the CU width. In some embodiments, the h1 is 1 and h2 is 2.

In some embodiments, a width of a left template may be selected according to a CU width. In some embodiments, if the CU width is not larger than a threshold, the width of the left template may be w1. In some embodiments, if the CU width is larger than the threshold, the width of the left template may be w2. In some embodiments, the height of the left template is equal to the CU height. In some embodiments, the threshold is 8, the w1 is 1 and w2 is 2.

In some embodiments, a height of an above template may be selected according to a CU height. In some embodiments, if the CU height is not larger than a threshold, the height of the above template is h1. In some embodiments, if the CU height is larger than the threshold, the height of the above template is h2. In some embodiments, the width of the above template is equal to the CU width. In some embodiments, the threshold is 8, h1 is 1 and h2 is 2.

In some embodiments, samples of the template may be subsampled or down sampled before being used to determine a template matching cost. In some embodiments, reference samples of template samples may be subsampled or down sampled before being used to determine a template matching cost.

In some embodiments, whether to and/or how to subsample may be dependent on CU dimensions. In some embodiments, no subsampling is performed for a short side of a CU.

In some embodiments, a non-transitory computer-readable recording medium stores a bitstream of a video which is generated by a method performed by a video processing apparatus. The method comprises: constructing a motion candidate list for a target block of the video; applying a reordering or refined process to the constructed motion candidate list according to at least one criterion; and generating a bitstream of the target block based on the reordered or refined motion candidate list.

In some embodiments, a method for storing bitstream of a video, comprises: constructing a motion candidate list for a target block of the video; applying a reordering or refined process to the constructed motion candidate list according to at least one criterion; generating a bitstream of the target block based on the reordered or refined motion candidate list; and storing the bitstream in a non-transitory computer-readable recording medium.

Implementations of the present disclosure can be described in view of the following clauses, the features of which can be combined in any reasonable manner.

Clause 1. A method of video processing, comprising: applying, during a conversion between a target block of a video and a bitstream of the target block, a reordering or refined process to motion candidates during constructing a motion candidate list based on the motion candidates; and performing the conversion based on the constructed motion candidate list.

Clause 2. The method of clause 1, wherein a motion candidate type based adaptive reordering of merge candidates (ARMC) is used to reorder the motion candidates in a candidate type according to at least one criterion.

Clause 3. The method of clause 2, wherein M motion candidates with a specific candidate type are selected from the reordered motion candidates in the candidate type during constructing the motion candidate list, and wherein M is an integer number.

Clause 4. The method of clause 3, wherein M depends on at least one of: the candidate type, or a coding mode of the target block.

Clause 5. The method of clause 3, wherein the candidate type is an adjacent spatial candidate type.

Clause 6. The method of clause 5, wherein M is 4.

Clause 7. The method of clause 3, wherein the candidate type is an adjacent temporal candidate type.

Clause 8. The method of clause 7, wherein M is 1.

Clause 9. The method of clause 3, wherein the candidate type is a non-adjacent spatial candidate type.

Clause 10. The method of clause 9, wherein M is 3.

Clause 11. The method of clause 3, wherein the candidate type is a non-adjacent temporal candidate type.

Clause 12. The method of clause 11, wherein M is 1.

Clause 13. The method of clause 3, wherein the candidate type is a history-based motion vector prediction (HMVP) candidate type.

Clause 14. The method of clause 13, wherein M is 2.

Clause 15. The method of clause 3, wherein the candidate type is a pairwise average candidate type.

Clause 16. The method of clause 15, wherein M is 2.

Clause 17. The method of clause 3, wherein the candidate type is a subblock-based temporal motion vector prediction (STMVP) candidate type.

Clause 18. The method of clause 17, wherein M is 1.

Clause 19. The method of clause 2, wherein the candidate type is at least one of: an adjacent inherited affine candidate type, an adjacent constructed affine candidate type, a non-adjacent inherited affine candidate type, a non-adjacent constructed affine candidate type, or a history-based affine candidate.

Clause 20. The method of clause 2, wherein motion candidates with a plurality of motion candidate types are reordered together.

Clause 21. The method of clause 20, wherein M motion candidates with any of the specific plurality of motion candidate types are selected from the reordered motion candidates during constructing the motion candidate list, wherein M is an integer number.

Clause 22. The method of clause 21, wherein M depends on at least one of: the plurality of motion candidate types, or a coding mode of the target block.

Clause 23. The method of clause 20, wherein at least one of the followings are reordered together: a set of adjacent spatial candidates, a set of HMVP candidates, or a set of pairwise average candidates.

Clause 24. The method of clause 20, wherein a set of adjacent spatial candidates and a set of adjacent temporal candidates are reordered together.

Clause 25. The method of clause 20, wherein a set of non-adjacent spatial candidates and a set of non-adjacent temporal candidates are reordered together.

Clause 26. The method of clause 20, wherein at least one of the followings are reordered together: a set of non-adjacent spatial candidates, a set of non-adjacent temporal candidates, or a set of HMVP candidates.

Clause 27. The method of clause 20, wherein at least one of the followings are reordered together: a set of non-adjacent spatial candidates, a set of non-adjacent temporal candidates, a set of HMVP candidates, or a set of pairwise average candidates.

Clause 28. The method of clause 20, wherein a set of adjacent inherited affine candidates and a set of adjacent constructed affine candidates are reordered together.

Clause 29. The method of clause 20, wherein a set of non-adjacent inherited affine candidates and a set of non-adjacent constructed affine candidates are reordered together.

Clause 30. The method of clause 20, wherein at least one of the followings are reordered together: a set of non-adjacent inherited affine candidates, a set of non-adjacent constructed affine candidates, or a set of HMVP affine candidates.

Clause 31. The method of clause 20, wherein at least one of the followings are reordered together: a set of non-adjacent inherited affine candidates, a set of non-adjacent constructed affine candidates, a set of HMVP affine candidates, or a set of pairwise average affine candidates.

Clause 32. The method of clause 20, wherein a set of adjacent inherited affine candidates and a set of non-adjacent inherited affine candidates are reordered together.

Clause 33. The method of clause 20, wherein a set of adjacent constructed affine candidates and a set of non-adjacent constructed affine candidates are reordered together.

Clause 34. The method of clause 1, wherein the motion candidate list comprises at least one of: a template matching (TM) merge list after at least one of: a block-based bilateral matching refinement, a template matching refinement, or a subblock-based bilateral matching refinement, a TM advanced motion vector prediction (AMVP) list after at least one of: the block-based bilateral matching refinement, the template matching refinement, or the subblock-based bilateral matching refinement, a regular merge list after a decoder-side motion vector refinement (DMVR) process or a multi-pass DMVR process, a regular AMVP list after the DMVR process or the multi-pass DMVR process, an adaptive decoder side motion vector refinement (ADMVR) merge list after the DMVR process or the multi-pass DMVR process, a geometric partitioning mode (GPM) merge list after a template matching refinement process, a regular merge list, a regular AMVP list, a TM merge list, a TM AMVP list, an affine merge list, an affine AMVP list, an intra block copy (IBC) merge list, an IBC AMVP list, an ADMVR merge list, a GPM merge list, a triangle partition mode (TPM) list, a merge mode with motion vector difference (MMVD) merge list, an IBC template matching candidate list, an intra template matching candidate list, an IBC merge mode with block vector difference (MBVD) candidate list, an IBC GPM candidate list, an IBC TPM candidate list, or a specific motion candidate list.

Clause 35. A method of video processing, comprising: constructing, during a conversion between a target block of a video and a bitstream of the target block, a motion candidate list for the target block; applying a reordering or refined process to the constructed motion candidate list according to at least one criterion; and performing the conversion based on the reordered or refined motion candidate list.

Clause 36. The method of clause 35, wherein the motion candidate list comprises at least one of: a template matching (TM) merge list after at least one of: a block-based bilateral matching refinement, a template matching refinement, or a subblock-based bilateral matching refinement, a TM advanced motion vector prediction (AMVP) list after at least one of: the block-based bilateral matching refinement, the template matching refinement, or the subblock-based bilateral matching refinement, a regular merge list after a decoder-side motion vector refinement (DMVR) process or a multi-pass DMVR process, a regular AMVP list after the DMVR process or the multi-pass DMVR process, an adaptive decoder side motion vector refinement (ADMVR) merge list after the DMVR process or the multi-pass DMVR process, a geometric partitioning mode (GPM) merge list after a template matching refinement process, a regular merge list, a regular AMVP list, a TM merge list, a TM AMVP list, an affine merge list, an affine AMVP list, an intra block copy (IBC) merge list, an IBC AMVP list, an ADMVR merge list, a GPM merge list, a triangle partition mode (TPM) list, a merge mode with motion vector difference (MMVD) merge list, an IBC template matching candidate list, an intra template matching candidate list, an IBC merge mode with block vector difference (MBVD) candidate list, an IBC GPM candidate list, an IBC TPM candidate list, or a specific motion candidate list.

Clause 37. The method of any of clauses 1-36, wherein the reordering or refined process is based on at least one of: a template matching cost, a bilateral matching cost, or a block boundary discontinuity measure.

Clause 38. The method of clause 37, wherein a cost function between a current template and a reference template is at least one of: a sum of absolute differences (SAD), a mean removal sum of absolute difference (MR-SAD), a sum of absolute transformed differences (SATD), a mean removal sum of absolute transformed differences (MR-SATD), a sum of squared differences (SSD), a mean removal sum of squared differences (MR-SSD), a sum of squared errors (SSE), a mean removal sum of squared errors (MR-SSE), a weighted SAD, a weighted MR-SAD, a weighted SATD, a weighted MR-SATD, a weighted SSD, a weighted MR-SSD, a weighted SSE, a weighted MR-SSE, or gradient information.

Clause 39. The method of clause 38, wherein the current template and the reference template comprises a set of samples in a mapped domain if luma mapping with chroma scaling (LMCS) is enabled.

Clause 40. The method of clause 38, wherein the current template and the reference template comprises a set of samples in an original domain.

Clause 41. The method of clause 37, wherein motion candidates are divided into a plurality of subgroups, and wherein motion candidates in each subgroup are reordered ascendingly according to a cost value based on a template matching or a bilateral matching.

Clause 42. The method of clause 37, wherein a set of samples of a template is selected based on a rule.

Clause 43. The method of clause 42, wherein if only above template is available for the target block, a template matching reorder uses the above template.

Clause 44. The method of clause 42, wherein if only left template is available for the target block, a template matching reorder uses the left template.

Clause 45. The method of clause 42, wherein if both above and left templates are available for the target block, a template matching reorder uses at least one of: the above template or the left template.

Clause 46. The method of clause 37, wherein a template matching procedure or a bilateral matching procedure comprises one component.

Clause 47. The method of clause 46, wherein the component comprises a luma component.

Clause 48. The method of clause 37, wherein a template matching procedure or a bilateral matching procedure comprises a plurality of components.

Clause 49. The method of clause 48, wherein the plurality of components comprises a luma component and one or two chroma components.

Clause 50. The method of clause 49, wherein a total template matching cost is determined as a weighted sum of template matching costs on different color components, or wherein a total bilateral matching cost is determined as a weighted sum of bilateral matching costs on different color components.

Clause 51. The method of clause 37, wherein a width of a left template is fixed.

Clause 52. The method of clause 51, wherein the width of the left template is 1.

Clause 53. The method of clause 37, wherein a height of an above template is fixed.

Clause 54. The method of clause 53, wherein the height of the above template is 1.

Clause 55. The method of clause 37, wherein for a block vector (BV) candidate, a set of operations are performed.

Clause 56. The method of clause 55, wherein the reordering or refined process is different for a motion vector (MV) candidate and the BV candidate.

Clause 57. The method of clause 55, wherein a BV for locating a reference template is clipped.

Clause 58. The method of clause 57, wherein if the reference template is outside a current picture associated with the target block, a clipping operation is applied to the BV for locating the reference template to make the reference template locating inside the current picture.

Clause 59. The method of clause 58, wherein the BV of corresponding BV candidate is not changed by the clipping operation.

Clause 60. The method of clause 55, wherein if a reference template is outside a current picture associated with the target block, a corresponding BV candidate are reordered.

Clause 61. The method of clause 60, wherein if the reference template is outside the current picture, the unavailable reference template samples are padded from their corresponding nearest samples inside the current picture.

Clause 62. The method of clause 55, wherein a reference template has already reconstructed inside a current picture associated with the target block.

Clause 63. The method of clause 55, wherein if a reference template is not reconstructed or outside a current picture associated with the target block, a corresponding BV candidate is not reordered.

Clause 64. The method of clause 55, wherein a set of samples included in a reference template are available, and wherein the reference template are available means that all the reference template samples are reconstructed and within at least one of the same slice, same tile, or same IBC virtual buffer.

Clause 65. The method of clause 55, wherein if at least a portion of samples included in a reference template are unavailable, an operation of handling the reference template outside a current picture associated with the target block is applied, and wherein the operation comprises at least one of: a clipping operation is applied to the BV for locating the reference template to make all the reference template samples available, or padding the unavailable reference template samples from their corresponding available nearest samples.

Clause 66. The method of clause 37, wherein the boundary discontinuity measure is determined as:

$$disCost = \sum_{x=0}^{W} (w1 \times |2P_{x,1} - P_{x,2} - R_{x,0}| + w2 \times |2R_{x,0} - P_{x,1} - R_{x,-1}|) + \sum_{y=0}^{H} |w3 \times |2P_{1,y} - P_{2,y} - R_{0,y}| + w4 \times |2R_{0,y} - P_{1,y} - R_{-1,y}||,$$

wherein P represents a prediction of the target block, R represents a reconstructed sample in a neighbor block, W represents a width of the target block, and H represents a height of the target bloc, w represents a weight factor, and x and y present variants.

Clause 67. The method of clause 66, wherein $w_1$ is 0, $w_3$ is 0, $w_2$ is 1 and $w_4$ is 1.

Clause 68. The method of clause 66, wherein $w_1$ is 1, $w_3$ is 1, $w_2$ is 1 and $w_4$ is 1.

Clause 69. The method of clause 37, wherein the reordering or refined process is based on a weighted average of the block boundary discontinuity measure and the template matching cost.

Clause 70. The method of clause 69, wherein the weighted average of the block boundary discontinuity measure and the template matching cost is determined as: $w_{dis}$×disCost+$w_{tm}$×tmCost, where $w_{dis}$ represents a weight factor for the block boundary discontinuity measure, disCost represents the block boundary discontinuity measure, $w_{tm}$ represents a weight factor for the template matching cost, and tmCost represents the template matching cost.

Clause 71. The method of clause 70, wherein $w_{dis}$ and $w_{tm}$ are predefined, or wherein $W_{dis}$ and $w_{tm}$ are indicated, or wherein $W_{dis}$ and $w_{tm}$ are derived according to coding information.

Clause 72. The method of clause 70, wherein $W_{dis}$ are dependent on quantization parameter (QP).

Clause 73. The method of clause 72, wherein $w_{dis}$ for a higher QP is smaller than that of a smaller QP.

Clause 74. The method of clause 37, wherein a flag is indicated for indicating whether the block boundary discontinuity measure or the template matching cost is used.

Clause 75. The method of clause 37, wherein whether the block boundary discontinuity measure or the template matching cost is used is dependent on coding information or decoding information.

Clause 76. The method of clause 37, wherein if a QP is higher than a predefined threshold, the template matching cost is used.

Clause 77. The method of any of clauses 1-36, wherein at least one of the followings is adaptive: a template shape of a template, or a template size of the template.

Clause 78. The method of clause 77, wherein the template comprises a set of neighboring samples left to the target block.

Clause 79. The method of clause 77, wherein the template comprises a set of neighboring samples above to the target block.

Clause 80. The method of clause 77, wherein the template shape is selected according to a coding unit (CU) shape or a CU size.

Clause 81. The method of clause 77, wherein the template size is selected according to a CU shape or a CU size.

Clause 82. The method of clause 77, wherein a width of a left template is selected according to a CU height.

Clause 83. The method of clause 82, wherein if the CU height is not larger than a threshold, the width of the left template is w1, or wherein if the CU height is larger than the threshold, the width of the left template is w2, and wherein the height of the left template is equal to the CU height.

Clause 84. The method of clause 83, wherein the threshold is 8, the w1 is 1 and w2 is 2.

Clause 85. The method of clause 77, wherein a height of an above template is selected according to a CU width.

Clause 86. The method of clause 85, wherein if the CU width is not larger than a threshold, the height of the above template is h1, or wherein if the CU width is larger than the threshold, the height of the above template is h2, and wherein the width of the above template is equal to the CU width.

Clause 87. The method of clause 86, wherein the threshold is 8, the h1 is 1 and h2 is 2.

Clause 88. The method of clause 77, wherein a width of a left template is selected according to a CU width.

Clause 89. The method of clause 88, wherein if the CU width is not larger than a threshold, the width of the left template is w1, or wherein if the CU width is larger than the threshold, the width of the left template is w2, and wherein the height of the left template is equal to the CU height.

Clause 90. The method of clause 89, wherein the threshold is 8, the wlis 1 and w2 is 2.

Clause 91. The method of clause 77, wherein a height of an above template is selected according to a CU height.

Clause 92. The method of clause 91, wherein if the CU height is not larger than a threshold, the height of the above template ish1, or wherein if the CU height is larger than the threshold, the height of the above template is h2, and wherein the width of the above template is equal to the CU width.

Clause 93. The method of clause 92, wherein the threshold is 8, h1 is 1 and h2 is 2.

Clause 94. The method of clause 77, wherein samples of the template are subsampled or down sampled before being used to determine a template matching cost.

Clause 95. The method of clause 77, wherein reference samples of template samples are subsampled or down sampled before being used to determine a template matching cost.

Clause 96. The method of clause 94 or 95, wherein whether to and/or how to subsample is dependent on CU dimensions.

Clause 97. The method of clause 94 or 95, wherein no subsampling is performed for a short side of a CU.

Clause 98. The method of any of clauses 1-97, wherein the conversion includes encoding the target block into the bitstream.

Clause 99. The method of any of clauses 1-97, wherein the conversion includes decoding the target block from the bitstream.

Clause 100. An apparatus for processing video data comprising a processor and a non-transitory memory with instructions thereon, wherein the instructions upon execution by the processor, cause the processor to perform a method in accordance with any of clauses 1-97.

Clause 101. A non-transitory computer-readable storage medium storing instructions that cause a processor to perform a method in accordance with any of clauses 1-97.

Clause 102. A non-transitory computer-readable recording medium storing a bitstream of a video which is generated by a method performed by a video processing apparatus, wherein the method comprises: applying a reordering or refined process to motion candidates during constructing a motion candidate list for a target block of the video based on the motion candidates; and generating a bitstream of the target block based on the constructed motion candidate list.

Clause 103. A method for storing bitstream of a video, comprising: applying a reordering or refined process to motion candidates during constructing a motion candidate list for a target block of the video based on the motion candidates; generating a bitstream of the target block based on the constructed motion candidate list; and storing the bitstream in a non-transitory computer-readable recording medium.

Clause 104. A non-transitory computer-readable recording medium storing a bitstream of a video which is generated by a method performed by a video processing apparatus, wherein the method comprises: constructing a motion candidate list for a target block of the video; applying a reordering or refined process to the constructed motion candidate list according to at least one criterion; and generating a bitstream of the target block based on the reordered or refined motion candidate list.

Clause 105. A method for storing bitstream of a video, comprising: constructing a motion candidate list for a target block of the video; applying a reordering or refined process to the constructed motion candidate list according to at least one criterion; generating a bitstream of the target block based on the reordered or refined motion candidate list; and storing the bitstream in a non-transitory computer-readable recording medium.

Example Device

Figure 51:
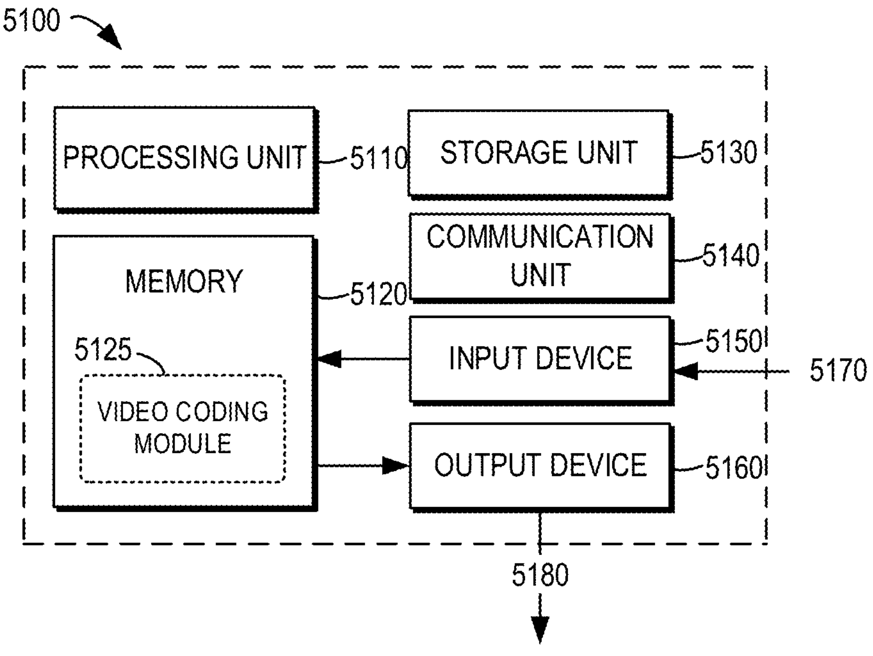
FIG. 51 illustrates a block diagram of a computing device in which various embodiments of the present disclosure can be implemented.

FIG. 51 illustrates a block diagram of a computing device 5100 in which various embodiments of the present disclosure can be implemented. The computing device 5100 may be implemented as or included in the source device 110 (or the video encoder 114 or 200) or the destination device 120 (or the video decoder 124 or 300).

It would be appreciated that the computing device 5100 shown in FIG. 51 is merely for purpose of illustration, without suggesting any limitation to the functions and scopes of the embodiments of the present disclosure in any manner.

As shown in FIG. 51, the computing device 5100 includes a general-purpose computing device 5100. The computing device 5100 may at least comprise one or more processors or processing units 5110, a memory 5120, a storage unit 5130, one or more communication units 5140, one or more input devices 5150, and one or more output devices 5160.

In some embodiments, the computing device 5100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 5100 can support any type of interface to a user (such as “wearable” circuitry and the like).

The processing unit 5110 may be a physical or virtual processor and can implement various processes based on programs stored in the memory 5120. In a multi-processor system, multiple processing units execute computer executable instructions in parallel so as to improve the parallel processing capability of the computing device 5100. The processing unit 5110 may also be referred to as a central processing unit (CPU), a microprocessor, a controller or a microcontroller.

The computing device 5100 typically includes various computer storage medium. Such medium can be any medium accessible by the computing device 5100, including, but not limited to, volatile and non-volatile medium, or detachable and non-detachable medium. The memory 5120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 5130 may be any detachable or non-detachable medium and may include a machine-readable medium such as a memory, flash memory drive, magnetic disk or another other media, which can be used for storing information and/or data and can be accessed in the computing device 5100.

The computing device 5100 may further include additional detachable/non-detachable, volatile/non-volatile memory medium. Although not shown in FIG. 51, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 5140 communicates with a further computing device via the communication medium. In addition, the functions of the components in the computing device 5100 can be implemented by a single computing cluster or multiple computing machines that can communicate via communication connections. Therefore, the computing device 5100 can operate in a networked environment using a logical connection with one or more other servers, networked personal computers (PCs) or further general network nodes.

The input device 5150 may be one or more of a variety of input devices, such as a mouse, keyboard, tracking ball, voice-input device, and the like. The output device 5160 may be one or more of a variety of output devices, such as a display, loudspeaker, printer, and the like. By means of the communication unit 5140, the computing device 5100 can further communicate with one or more external devices (not shown) such as the storage devices and display device, with one or more devices enabling the user to interact with the computing device 5100, or any devices (such as a network card, a modem and the like) enabling the computing device 5100 to communicate with one or more other computing devices, if required. Such communication can be performed via input/output (I/O) interfaces (not shown).

In some embodiments, instead of being integrated in a single device, some or all components of the computing device 5100 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 5100 may be used to implement video encoding/decoding in embodiments of the present disclosure. The memory 5120 may include one or more video coding modules 5125 having one or more program instructions. These modules are accessible and executable by the processing unit 5110 to perform the functionalities of the various embodiments described herein.

In the example embodiments of performing video encoding, the input device 5150 may receive video data as an input 5170 to be encoded. The video data may be processed, for example, by the video coding module 5125, to generate an encoded bitstream. The encoded bitstream may be provided via the output device 5160 as an output 5180.

In the example embodiments of performing video decoding, the input device 5150 may receive an encoded bitstream as the input 5170. The encoded bitstream may be processed, for example, by the video coding module 5125, to generate decoded video data. The decoded video data may be provided via the output device 5160 as the output 5180.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising:

constructing, during a conversion between a target block of a video and a bitstream of the video, a motion candidate list for the target block;

applying a reordering or refined process to the constructed motion candidate list according to at least one criterion, wherein the reordering or refined process is based on at least one of: a template matching cost or a block boundary discontinuity measure, and wherein whether the template matching cost or the block boundary discontinuity measure is used in the reordering or refined process is based on at least one of: a flag or coding information and decoding information; and performing the conversion based on the reordered or refined motion candidate list.

2. The method of claim 1, wherein the motion candidate list comprises at least one of:

a template matching (TM) merge list after at least one of: a block-based bilateral matching refinement, a template matching refinement, or a subblock-based bilateral matching refinement, a TM advanced motion vector prediction (AMVP) list after at least one of: the block-based bilateral matching refinement, the template matching refinement, or the subblock-based bilateral matching refinement, a regular merge list after a decoder-side motion vector refinement (DMVR) process or a multi-pass DMVR process, a regular AMVP list after the DMVR process or the multi-pass DMVR process, an adaptive decoder side motion vector refinement (ADMVR) merge list after the DMVR process or the multi-pass DMVR process, a geometric partitioning mode (GPM) merge list after a template matching refinement process, a regular merge list, a regular AMVP list, a TM merge list, a TM AMVP list, an affine merge list, an affine AMVP list, an intra block copy (IBC) merge list, an IBC AMVP list, an ADMVR merge list, a GPM merge list, a triangle partition mode (TPM) list, a merge mode with motion vector difference (MMVD) merge list, an IBC template matching candidate list, an intra template matching candidate list, an IBC merge mode with block vector difference (MBVD) candidate list, an IBC GPM candidate list, an IBC TPM candidate list, or a specific motion candidate list.

3. The method of claim 1, wherein for a block vector (BV) candidate, a set of operations are performed.

4. The method of claim 3, wherein a set of samples included in a reference template are available, and wherein the reference template are available means that all the reference template samples are reconstructed and within at least one of the same slice, same tile, or same IBC virtual buffer.

5. The method of claim 3, wherein if at least a portion of samples included in a reference template are unavailable, an operation of handling the reference template outside a current picture associated with the target block is applied, and wherein the operation comprises at least one of:

a clipping operation is applied to the BV for locating the reference template to make all the reference template samples available, or padding the unavailable reference template samples from their corresponding available nearest samples.

6. The method of claim 1, wherein the boundary discontinuity measure is determined as:

$$disCost = \sum_{x=0}^{W} (w1 \times |2P_{x,1} - P_{x,2} - R_{x,0}| + w2 \times |2R_{x,0} - P_{x,1} - R_{x,-1}|) +$$

-continued $$\sum_{y=0}^{H} |w3 \times |2P_{1,y} - P_{2,y} - R_{0,y}| + w4 \times |2R_{0,y} - P_{1,y} - R_{-1,y}||,$$

wherein P represents a prediction of the target block, R represents a reconstructed sample in a neighbor block, W represents a width of the target block, and H represents a height of the target bloc, w represents a weight factor, and x and y present variants.

7. The method of claim 6, wherein w1 is 0, w3 is 0, w2 is 1 and w4 is 1.

8. The method of claim 6, wherein w1 is 1, w3 is 1, w2 is 1 and w4 is 1.

9. The method of claim 1, wherein the reordering or refined process is based on a weighted average of the block boundary discontinuity measure and the template matching cost; or wherein the weighted average of the block boundary discontinuity measure and the template matching cost is determined as:

$$w_{dis} \times disCost + w_{tm} \times tmCost,$$

wherein $w_{dis}$ represents a weight factor for the block boundary discontinuity measure, disCost represents the block boundary discontinuity measure, $w_{tm}$ represents a weight factor for the template matching cost, and tmCost represents the template matching cost.

10. The method of claim 9, wherein $w_{dis}$ and $w_{tm}$ are predefined, or wherein $w_{dis}$ and $w_{tm}$ are indicated, or wherein $w_{dis}$ and $w_{tm}$ are derived according to coding information.

11. The method of claim 9, wherein $w_{dis}$ are dependent on quantization parameter (QP).

12. The method of claim 11, wherein $w_{dis}$ for a higher QP is smaller than that of a smaller QP.

13. The method of claim 1, wherein if a QP is higher than a predefined threshold, the template matching cost is used.

14. The method of claim 1, wherein the conversion includes encoding the target block into the bitstream, or wherein the conversion includes decoding the target block from the bitstream.

15. An apparatus for processing video data comprising a processor and a non-transitory memory with instructions thereon, wherein the instructions upon execution by the processor, cause the processor to perform acts comprising:

applying, during a conversion between a target block of a video and a bitstream of the video, a reordering or refined process to motion candidates during constructing a motion candidate list based on the motion candidates, wherein the reordering or refined process is based on at least one of: a template matching cost or a block boundary discontinuity measure, and wherein whether the template matching cost or the block boundary discontinuity measure is used in the reordering or refined process is based on at least one of: a flag or coding information and decoding information; and performing the conversion based on the constructed motion candidate list.

16. A non-transitory computer-readable storage medium storing instructions that cause a processor to perform acts comprising:

applying, during a conversion between a target block of a video and a bitstream of the video, a reordering or refined process to motion candidates during constructing a motion candidate list based on the motion candidates, wherein the reordering or refined process is based on at least one of: a template matching cost or a block boundary discontinuity measure, and wherein whether the template matching cost or the block boundary discontinuity measure is used in the reordering or refined process is based on at least one of: a flag or coding information and decoding information; and performing the conversion based on the constructed motion candidate list.

17. A method for storing a bitstream of a video, comprising:

applying a reordering or refined process to motion candidates during constructing a motion candidate list for a target block of the video based on the motion candidates, wherein the reordering or refined process is based on at least one of: a template matching cost or a block boundary discontinuity measure, and wherein whether the template matching cost or the block boundary discontinuity measure is used in the reordering or refined process is based on at least one of: a flag or coding information and decoding information;

generating a bitstream of the video based on the constructed motion candidate list; and storing the bitstream in a non-transitory computer-readable recording medium.

* * * * *